Oct. 11, 1949.  N. D. PRESTON ET AL  2,484,462
AIRWAY TRAFFIC CONTROL SYSTEM
Filed May 25, 1944  18 Sheets-Sheet 4

Inventors
N.D.Preston and F.B.Hitchcock
By Neil D. Preston
Their Attorney

Oct. 11, 1949.
N. D. PRESTON ET AL
2,484,462
AIRWAY TRAFFIC CONTROL SYSTEM
Filed May 25, 1944
18 Sheets-Sheet 6
FIG. 7.
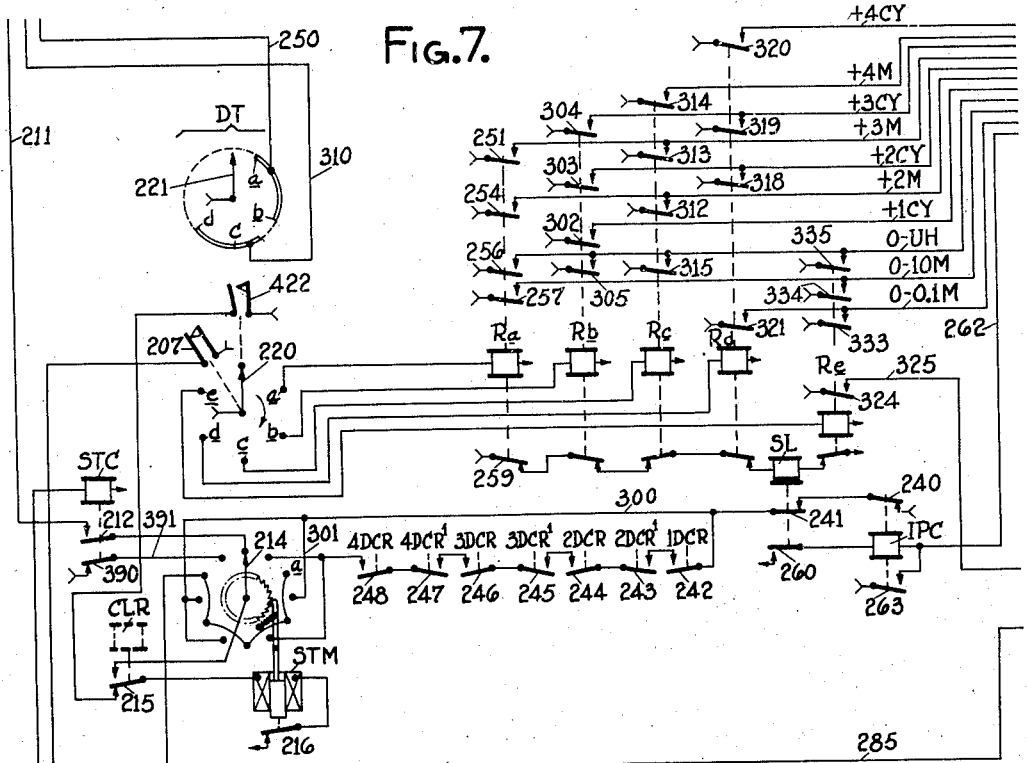
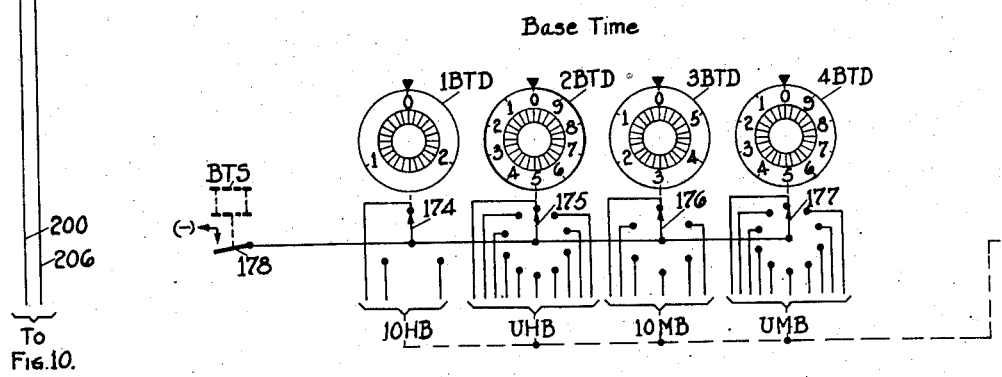
Inventors
N.D.Preston and F.B.Hitchcock
By
Neil D. Preston,
Their Attorney

Fig. 9.

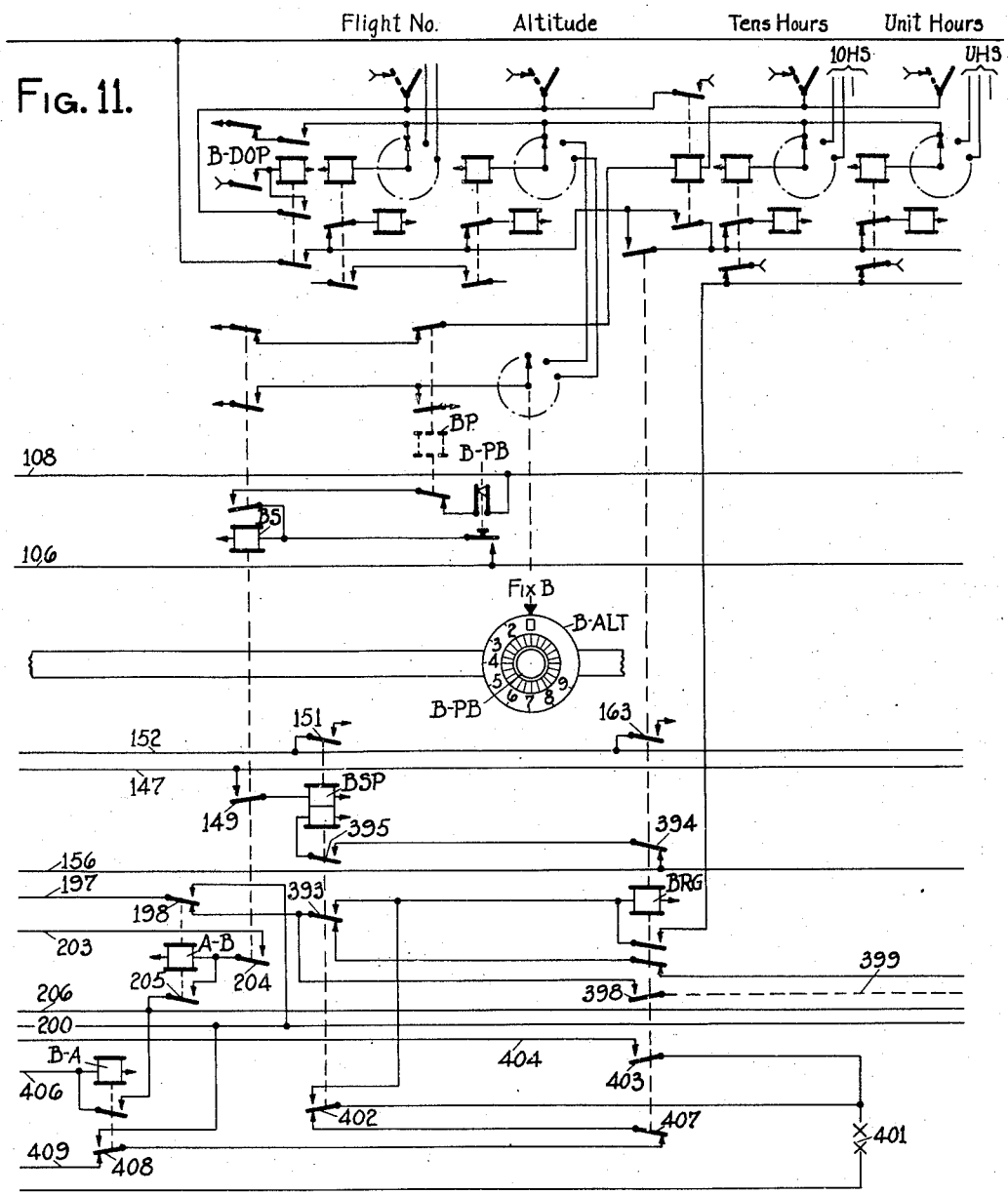

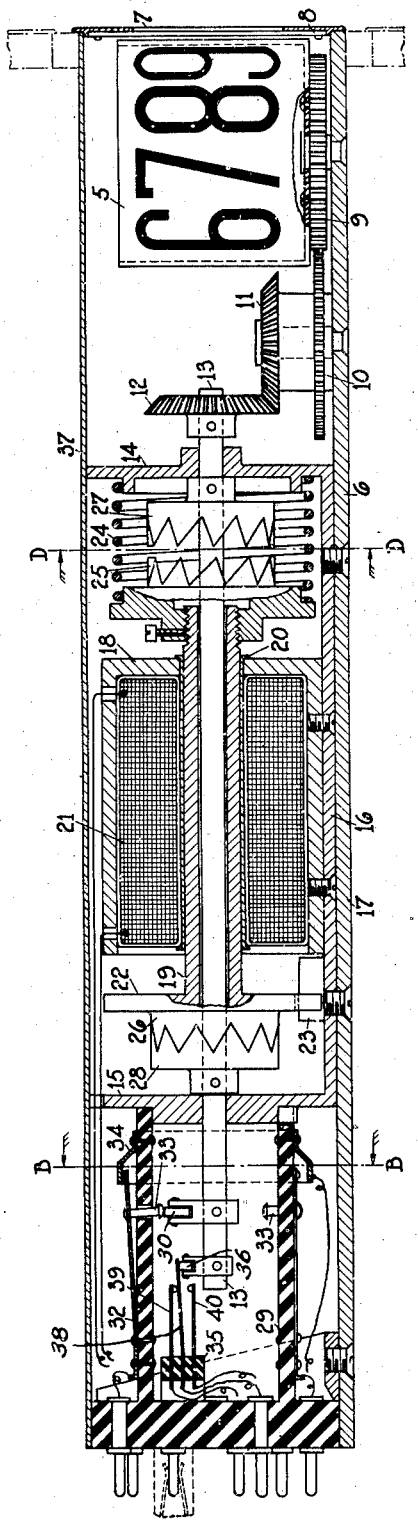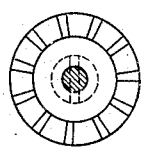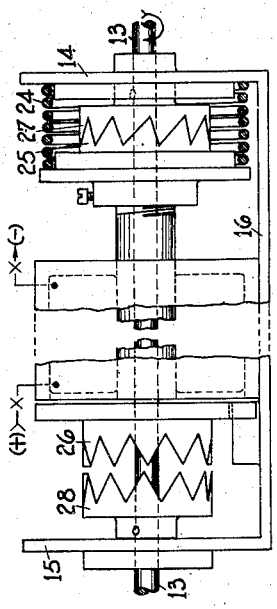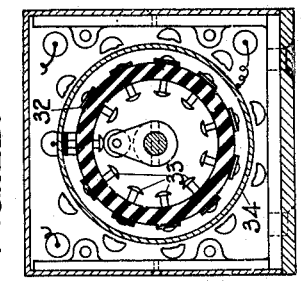

Oct. 11, 1949.   N. D. PRESTON ET AL   2,484,462
AIRWAY TRAFFIC CONTROL SYSTEM
Filed May 25, 1944   18 Sheets-Sheet 12

Inventors
N.D. Preston and F.B. Hitchcock
By Neil D. Preston,
Their Attorney

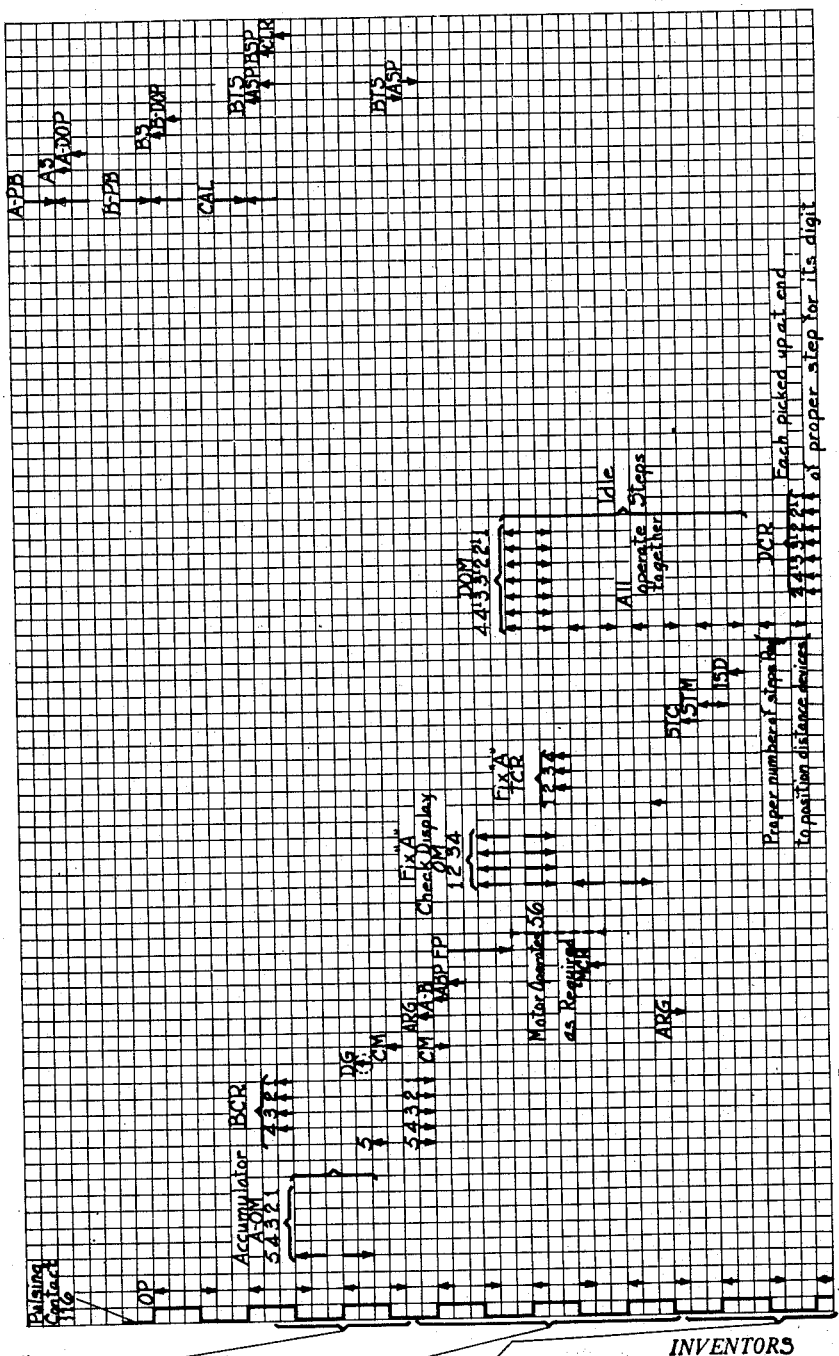

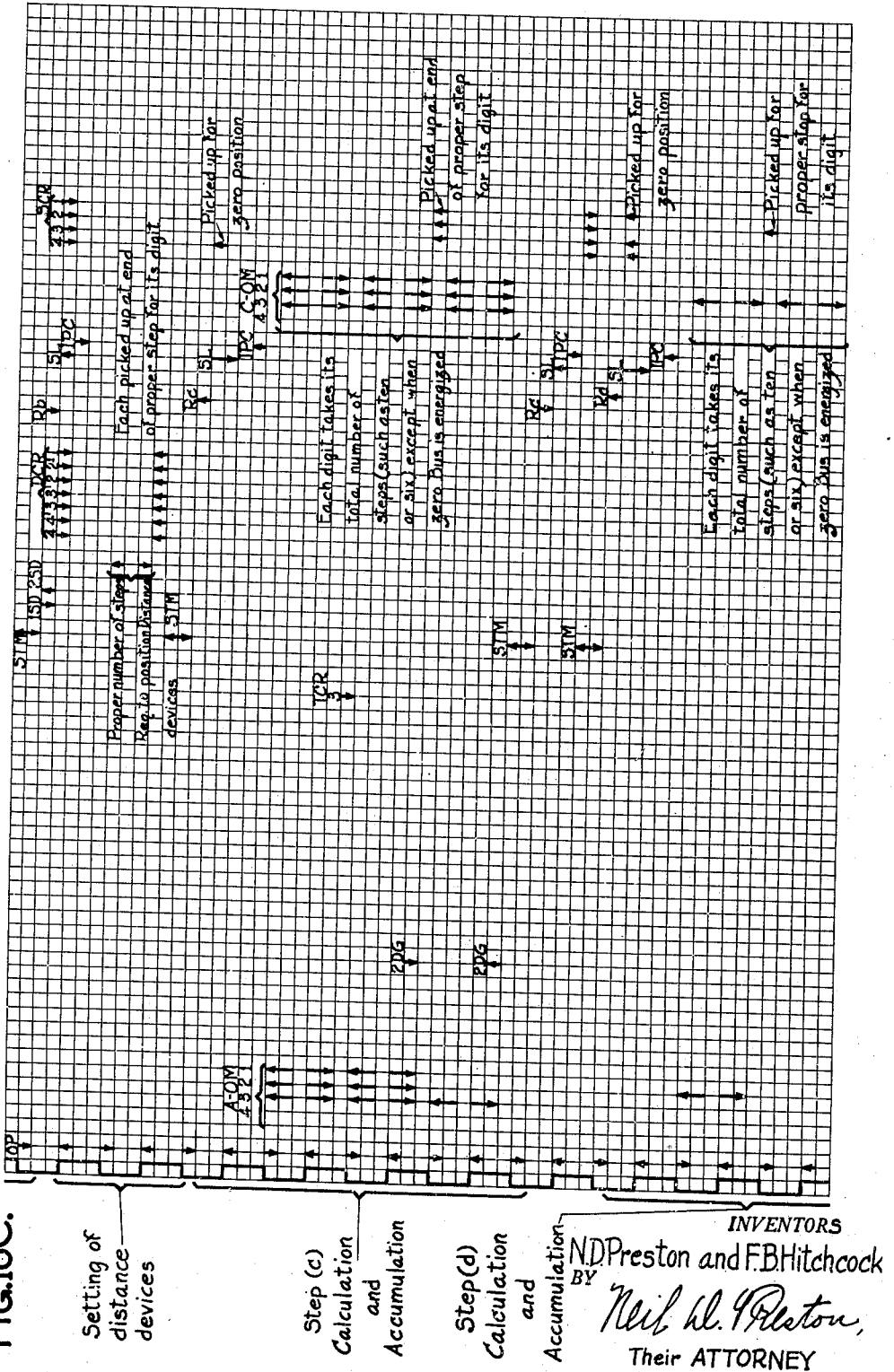

(54 minutes added to accumulator setting of 01:57)

(55 minutes added to accumulator setting of 23:10)

Patented Oct. 11, 1949

2,484,462

UNITED STATES PATENT OFFICE

2,484,462

AIRWAY TRAFFIC CONTROL SYSTEM

Neil D. Preston and Forest B. Hitchcock, Rochester, N. Y., assignors to General Railway Signal Company, Rochester, N. Y.

Application May 25, 1944, Serial No. 537,312

54 Claims. (Cl. 235—61)

This invention relates to systems for controlling traffic on airways, and more particularly to an organization of means in an airway traffic control system for automatically calculating and posting on a display panel the arrival times for a proposed flight at the various radio fixes or markers of the route for such flight over the airways of a control area, for the purpose of providing a tentative flight plan or schedule for use in connection with the advance planning and scheduling of flights.

In the airway traffic control system of the type contemplated in connection with this invention, it is assumed that every plane operating on the regular airways defined by radio ranges or the like, except perhaps for certain excluded low altitudes, will need an appropriate authorization or clearance from a central traffic controlling center for the control area, in order to be entitled to use these airways, and that such clearance will specify the altitudes and the particular times at which the flight may pass over the fixes in its route in accordance with a prescribed time schedule. In connection with issuing such clearances, it is assumed that a tentative time schedule will be made up for the new proposed flight and checked visually or automatically with the uncompleted schedules for all prior authorized flights, so as to carry out an advance planning procedure which will not only serve to avoid undue congestion at terminals, and the like, but will also maintain a suitable time or space separation between the various flights at and between the fixes in the interests of safety.

In an airway traffic control system of this character, such as disclosed for example in our prior application, Ser. No. 528,926, filed March 31, 1944, now Patent No. 2,439,862, it is desirable to determine quickly and accurately the arrival times at the various fixes in the route for a proposed flight, and post or register such arrival times in suitable time indicators relating to these fixes, as a preliminary step in making the desired check against prior flight schedules.

The primary purpose of this invention is to provide a suitable and effective organization of parts and electric circuits for automatically determining accurately and quickly by a process of numerical calculation and accumulation the various arrival times for a proposed flight at the respective fixes involved in the route for this flight, and for registering such times in suitable time indicating means associated with these fixes, such as the so-called check display units associated with the respective fix panels of the flight progress board disclosed in our prior application above mentioned.

Various factors need to be taken into consideration in determining the arrival times for a proposed flight, such as its starting or base departure time, the fixes involved in its route, the relative direction of its movement over such route, its normal or rated cruising speed, and the direction and intensity of the wind modifying its cruising speed to give a resultant ground speed.

It is an object of this invention to provide an automatic calculating organization which will take into consideration these various factors, so as to give the times for a tentative flight schedule which a plane can readily follow with the desired safety and efficient operation of its propelling power plant.

The further object of this invention is to perform these desired functions by ordinary relays and other electrical equipment of conventional design so controlled and operated by electric circuits that faulty or improper operations are at once manifested.

A still further object of the invention is to employ a plan of calculation which involves the positive actuation of movable elements to definite active positions in a step-by-step fashion, so as to attain any desired degree of accuracy in the computation of the arrival times independently of the relative motions of mechanical parts through small distances, such as by cams or gear trains.

Various other objects, attributes and characteristic features of the invention will be pointed out in connection with the description of the specific embodiment of the invention illustrated, and will also be apparent as this description progresses.

Generally speaking, and without attempting to define the nature and scope of the invention, it is proposed to provide a master calculator and accumulator mechanism for determining the arrival times of a proposed flight at any desired number of spaced fixes in any desired route in the control area, and for either relative direction of movement over such route, as may be designated by the actuation of suitable means for identifying the particular fixes for the desired route and the relative direction of the flight. More specifically, it is proposed to employ manually operable fix identifying push buttons and a direction key, preferably associated with a digram of a geographic layout of the airways, for the purpose of designating the route and direction of the proposed flight for which the master calculator and accumulator will be effective.

The rated cruising speed for the proposed flight is designated by a suitable speed setting means, such as a manually operable cruising speed dial; and the speed correction factors to be applied to any designated cruising speed to give the ground speed for the various fix intervals are also defined by manually operable dials, one for each direction of movement over each fix interval, these speed correction factor dials being set on the basis of the latest information to provide an overall adjustment for variations in the direction and intensity of the wind or other conditions effecting the true ground speed under existing flying conditions with respect to the total length of the associated fix interval. Provision is also preferably made to add to the flying time for a given fix interval, which has been calculated on the basis of the ground speed and distance, any desired additional time as may be designated by the flight operator by setting a time correction dial belonging to this fix interval, for the purpose of compensating for the additional time required for a plane to take off and climb to a cruising altitude or make other changes in altitude.

The flying times for the various fix intervals in the designated route for the proposed flight, as thus determined by the master calculator and accumulator, are utilized in connection with any desired base departure time at the first fix in this route to give the arrival times at succeeding fixes, by setting the master accumulator to conform with such departure time at the beginning of the operation and prior to the calculation of the flying time for the first fix interval and its addition into the accumulator. Similarly, the additional climb time for take-off or change in altitude is added into the accumulator in addition to the calculated flying times. Consequently, the times shown by the accumulator, after its initial setting, and after operation of calculating and accumulating the flying times and time correction factors for each of the fix intervals in turn, correspond with the designated departure time and the proper estimated arrival times for the successive fixes in the route.

After each of the significant stages in the operation of the master calculator and accumulator with respect to the successive fix intervals in the designated route, the time then represented by the existing condition of the accumulator is automatically registered in suitable time indicating means belonging to the successive fixes.

The general plan of the calculating operation may be said to involve the multiplication of a numerical quantity representing time for a unit of distance at the established ground speed, and another quantity corresponding with the number of distance units in the fix interval for which the flying time is being calculated. This multiplication is carried out successively for the respective digit places of the time and distance quantities involved, with automatic carrying of digits as required; and the various partial products resulting from the successive multiplying operations are added into the master accumulator to supplement the time determined for the preceding fix by some previous setting or accumulating operation of said accumulator.

One important characteristic of this invention is that the calculation and accumulation of flying times for the various fix intervals are accomplished by the positive actuation of electrically operated devices to predetermined definite positions in accordance with the selective energization of buses, as distinctive from the gradual displacement of parts to indefinite positions in accordance with some prescribed relative motion of mechanical elements. The operation of these electrically operated devices is governed by relays and circuits organized as a whole to conform with the principle of failure on the side of safety, so that broken wires, bad contacts and ordinary mechanical failures are automatically manifested by failure of the system to complete a prescribed operating cycle. More specifically, the calculating and accumulator operation with respect to each of the designated fixes is carried out in a series of successive steps, and the various circuit controlling devices, movable elements and control circuits involved in each step must operate properly and assume a stabilized condition in order to initiate the next step, so that apparatus and circuit failures are immediately manifested by the stalling of the system.

There are various other desirable attributes and advantages of the organization of means constituting this invention, which are more conveniently discussed as the structure and operation of the specific embodiment of the invention disclosed are hereinafter explained.

The accompanying drawings illustrate diagrammatically and in accordance with certain conventions one specific organization of parts and circuits constituting one embodiment of the invention, the various parts and circuits having been illustrated in a manner to facilitate an explanation and understanding of the functions and mode of operation of the system, rather than for the purpose of showing in detail the particular structures and arrangements of parts that might be best suited for practicing the invention.

In the accompanying drawings, Fig. 1 illustrates schematically portions of a flight progress board for displaying the flight data for proposed and scheduled flights by positioning electrically operable changeable indicators, this flight progress board being assumed to be of the same type and construction disclosed in our prior application, Ser. No. 528,926 previously mentioned.

Fig. 2 illustrates generally one arrangement of manually operable push buttons, various setting dials, and a direction key on a control panel for actuation by a flight operator or controller.

Figs. 3 to 11, inclusive, when arranged in the relative positions indicated in Fig. 13, illustrate diagrammatically and conventionally one specific organization of relays, circuits and other devices in accordance with this invention, this group of figures relating to various parts of the system as follows:

Fig. 7 illustrates the distributor and control relays employed for governing the positioning and bus energization of the multiplier and carrier contactors of Figs. 4 and 5 in the proper order during the successive steps of the multiplying process;

Figs. 8 and 9 illustrate the accumulator units and associated impulse counting or control units, together with the various circuit conections involved, for performing the function of adding together, and to a designated base departure time, the intervals of flying time calculated by operation of the multiplier and carrier contactors of Figs. 4 and 5;

Figs. 10 and 11 show diagrammatically the parts and circuits involved in a sequence relay group for two fixes, together with the parts and circuits for some of the indicators of the check display units relating to these fixes;

Figs. 12A to 12D illustrate the structural organization of one type of changeable indicator disclosed in our prior application above mentioned, and suitable for use in connection with the embodiment of the invention illustrated;

Fig. 13 is a diagram of the relationship of Figs. 3 to 11, inclusive;

Figures 14, 15:
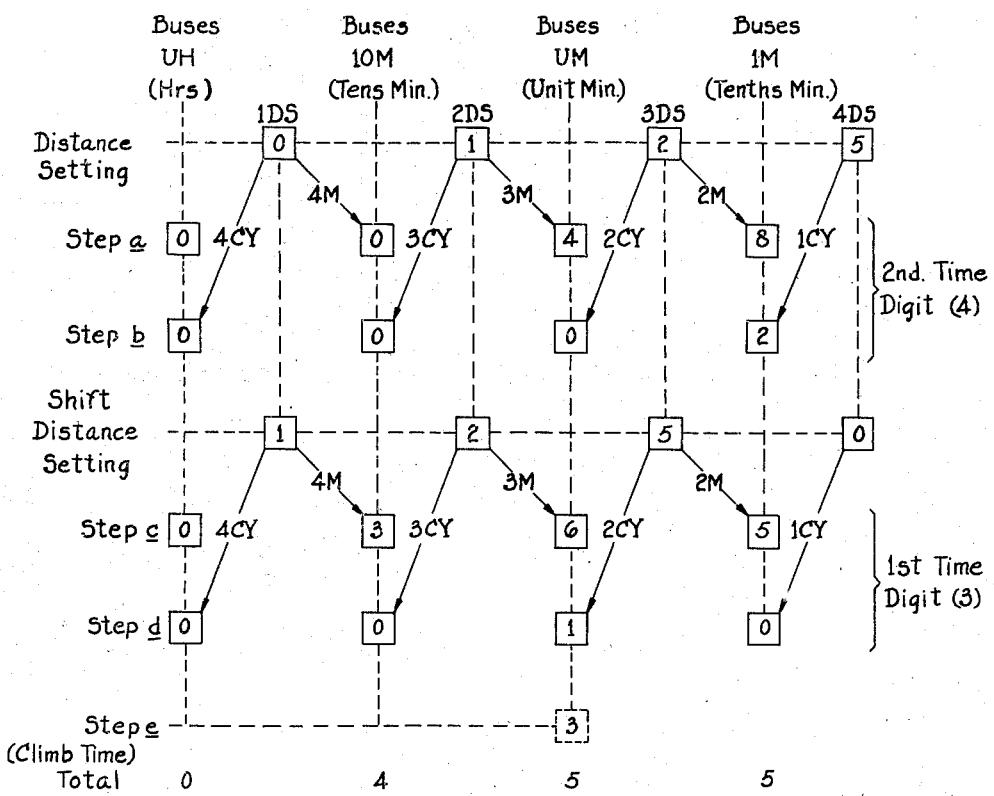
Figure 16B:
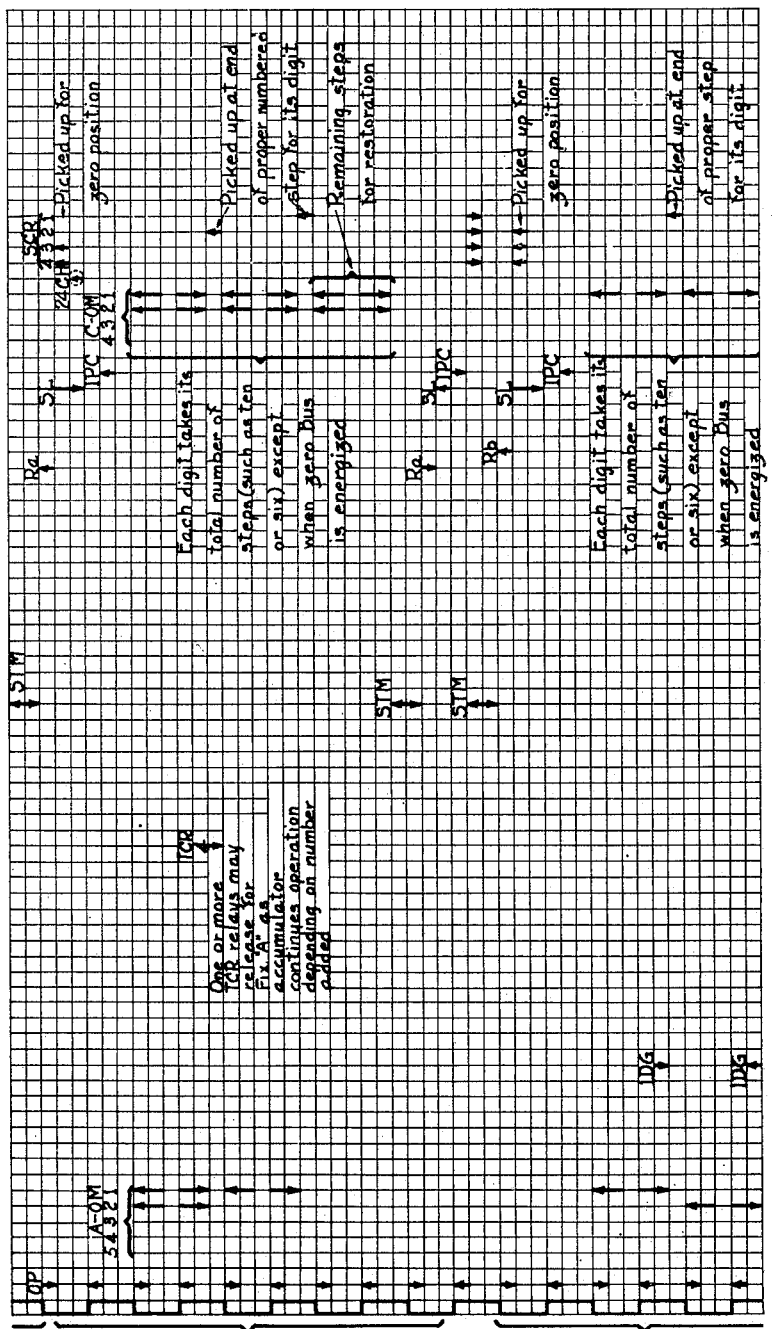
Figure 16D:
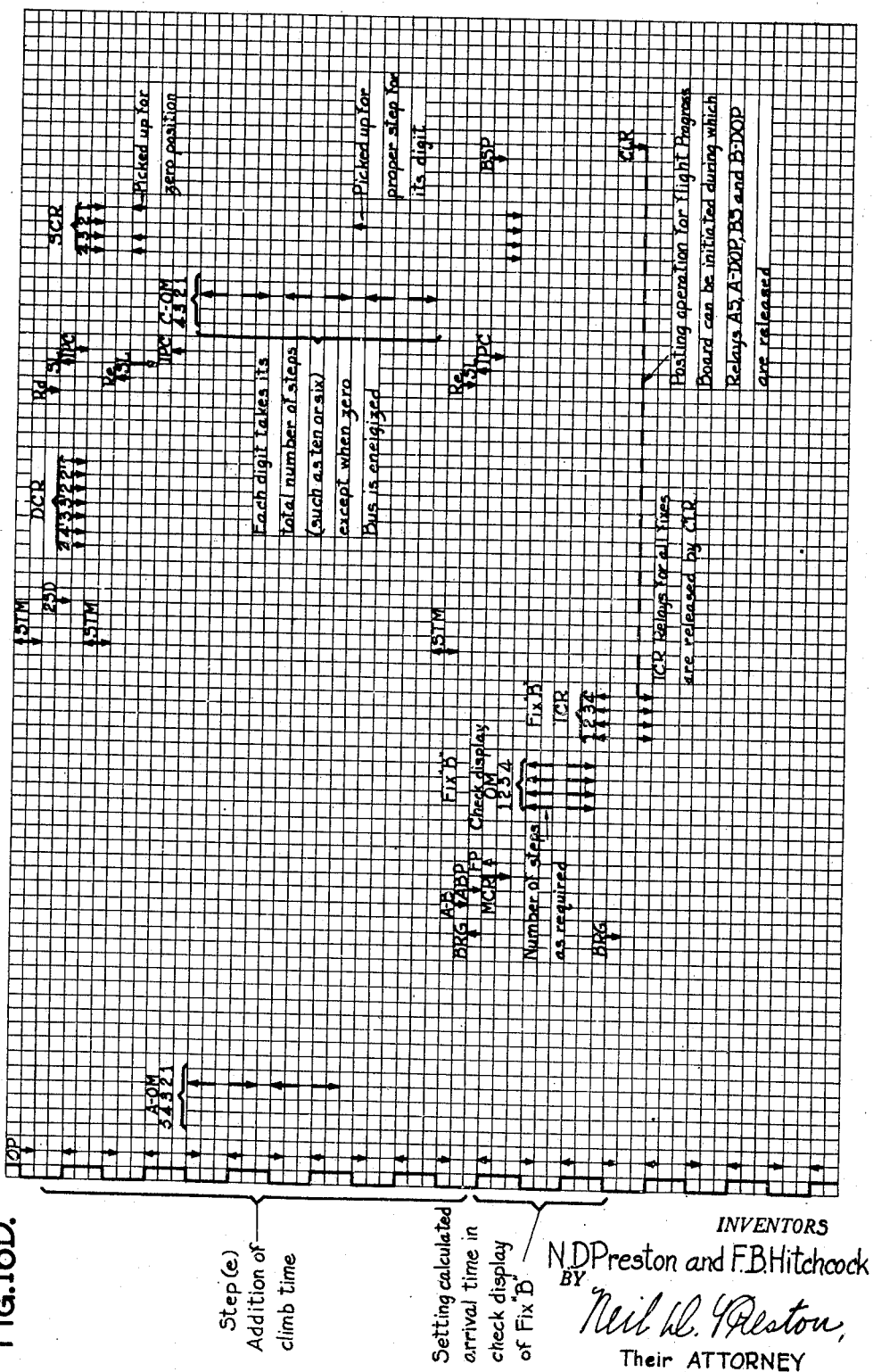
Figure 17:
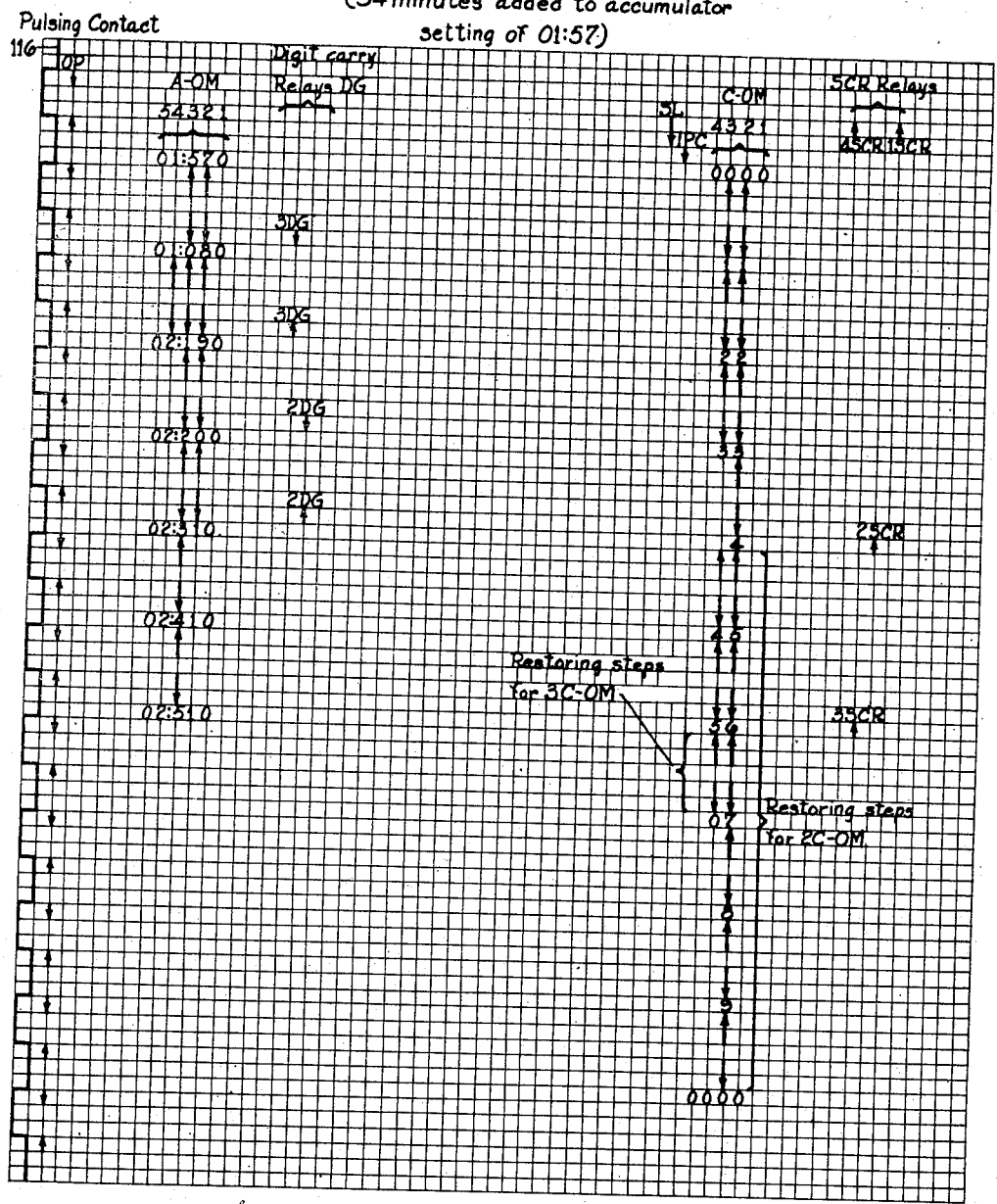
Figure 18:
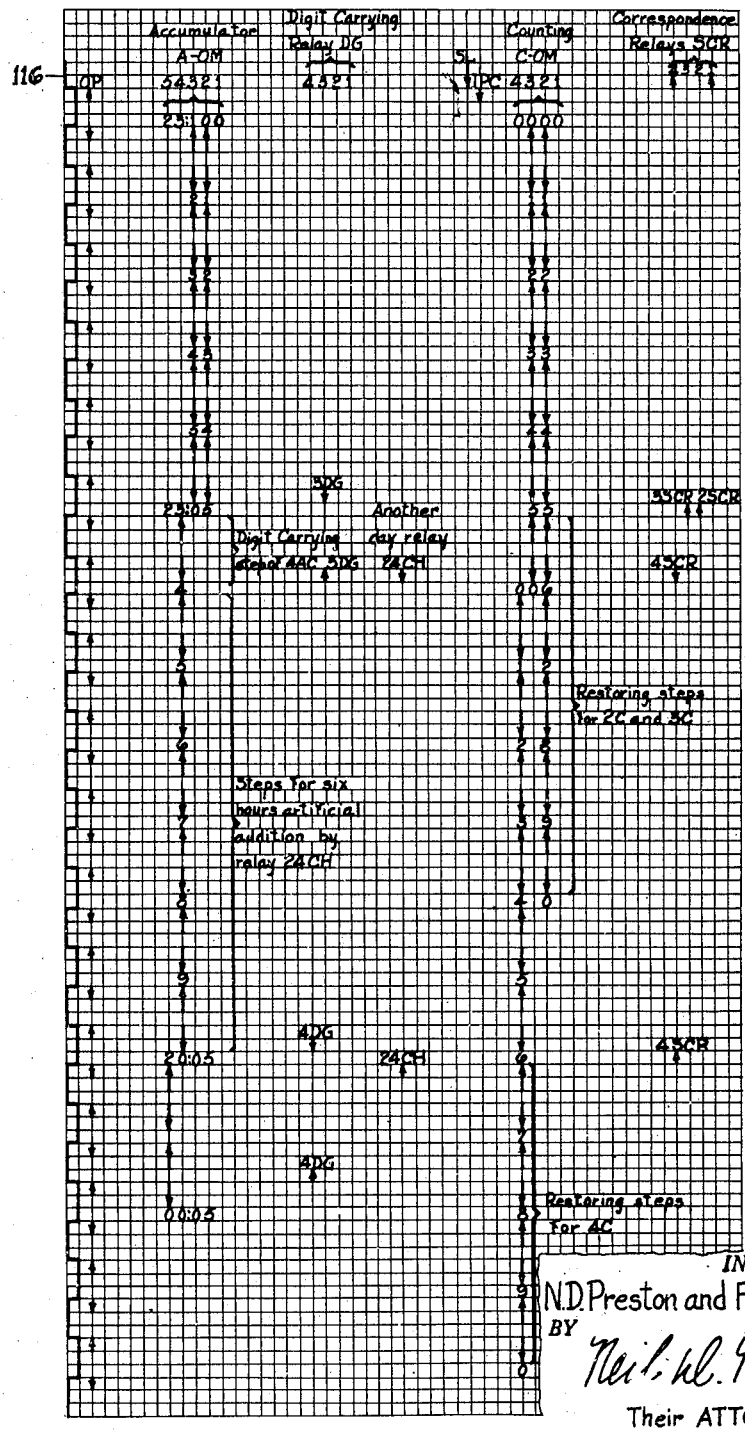

Fig. 14 indicates the character of the multiplying process characterizing this invention for one typical example of assumed speed and distance quantities;

Fig. 15 is a schematic representation for explanatory purposes of the functional relationship and operating sequence of the parts and circuits for carrying out the multiplication process for the typical assumed example indicated in Fig. 14;

Figs. 16A, 16B, 16C and 16D, when placed one below the other in the order named, form a sequence chart of various operations of the devices involved in the system of the present invention;

Fig. 17 is an abbreviated sequence chart relating more particularly to the operation of the accumulator when such operation involves the carrying of digits;

Fig. 18 is an abbreviated sequence chart relating more particularly to the operation of the accumulator for any calculating step when such operation involves the carrying of digits and the shifting of the accumulator with respect to another day.

The sequence charts designate the relays or contacts at the top of each chart which are to be indicated as having operations occurring during the complete cycle of operation of the system; while time is considered to elapse as progress is made downwardly upon the chart. On these charts, the movement or operation of a device is indicated by a solid line arrow, the extent of the arrow indicating the extent of time required for the operation, while the direction of the arrow indicates whether the relay is picked up or released i. e. an upwardly pointing arrow indicates a relay being picked up and a downwardly pointing arrow indicates a relay being released. The actual consummation of the act is considered to occur at the lowermost portion of the arrow while the initiation of such an act or function occurs at the beginning or uppermost portion of the arrow. These arrows include as a part of the operating time indicated both the magnetic characteristics of the device as well as the actual travel time of its associated armature and contacts.

In the accompanying drawings, the various relays, contactors, circuit controlling devices and associated circuits have been illustrated in a diagrammatic and conventional manner. The interconnections between these devices and circuits illustrated on the different sheets of the drawings are shown in some instances by the relative locations of such connecting wires, and in all cases by the use of like designating reference characters. In the interests of simplifying the disclosure, the various relays and their associated contacts are shown conventionally with the contact fingers and associated contacts shown either above or below the representation of the relay coil or winding in accordance with the limitations of space, the contacts belonging to a given relay being indicated by a dotted line. In order to facilitate an understanding of the operation involving the energization and deenergization of relays and closure of contacts, the contact fingers of the various relays are assumed to be in a horizontal or raised position when a relay is energized, and in a lower or inclined position when a relay is deenergized, regardless of the relationship of the contact finger to the relay coil; and the contact fingers for the relays are also shown in the attracted or retracted position as the case may be to conform with the normal conditions of the circuits prior to an operation of the system. The front and back contacts engaged by the movable contact fingers of the relays are indicated by arrows in the usual way. Further, in order to simplify the illustration of the circuits, the permanent connections to the opposite terminals of a battery or other suitable source of current are omitted and these connections are merely indicated by arrows at the ends of wires or conductors pointing either toward or away from such end, the same as if current could be considered as flowing into the end of a wire or conductor, thence through the circuit, and out at the other end of the wire.

*General organization of the system*

Before considering certain structural features and describing the contemplated operation of the system in detail, it would appear to be expedient to make a brief survey of general organization and the component parts of the system.

Although the automatic calculation and posting of arrival times for proposed flights at the various designated fixes of a route in accordance with this invention may be utilized in various ways, it is assumed that this invention will be used in connection with the airway traffic control system of our prior application, Ser. No. 528,926, filed March 31, 1944, and that the arrival times determined in accordance with this invention will be registered or posted in the check display units of the corresponding fix panels of the flight progress board shown and described in this prior application.

Figure 1:
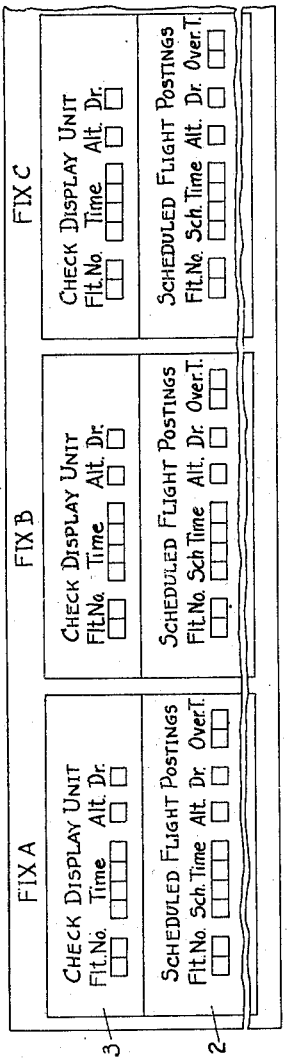

*Flight progress board.*—The flight progress board contemplated in connection with the present invention and illustrated and described more in detail in the prior application above mentioned, comprises in general a fix panel for each of the various fixes in the control area under the jurisdiction of the flight controller or operator, three such fix panels for fixes A, B and C being partly shown in Fig. 1. Each of these fix panels comprises a flight schedule posting portion, designated 2 and including any desired number of rows of changeable indicators adapted to display the flight identification number, scheduled time, altitude, direction, overtime, and such other flight data as may be desired, only one of these rows of indicators being shown for each panel.

Associated with each fix panel is a so-called check display unit, preferably located at the top of the panel; and this check display unit designated 3, includes a group of similar changeable indicators, omitting those for registering overtime. The schedule for a proposed flight, including the calculated arrival times and assigned altitudes, is displayed by the indicators of the check display units for the fixes in the route designated for such flight. Such tentative flight schedule, as set up in the appropriate check display units, can then be checked visually or automatically in the manner disclosed in our prior application with respect to scheduled times and altitudes for all uncompleted flight schedules previously adopted and posted in the various posting spaces in the fix panel below. The schedule for a proposed flight, after such check and approval, is then automatically transferred or posted from the check display units into a vacant posting space in each of the corresponding fix panels.

The present invention deals more particularly with the calculation of the arrival times for a proposed flight at the fixes of a designated route and the control of the time indicators in the check display units relating to such designated route, so as to register and display these calculated arrival times for detection of conflict and approval of the flight.

*Changeable indicators.*—The time indicators for each check display unit, one for each denomination of time for a twenty-four hour day, are assumed to be of the same type employed in the system of the prior application above mentioned. It is proposed to use devices of a similar type for the time accumulator although the indicator drum may be omitted, since the accumulator is not intended to display the times for visual inspection. For convenience and to facilitate an understanding of the invention, Figs. 12A to 12D of the accompanying drawings illustrate the structure of such a changeable indicator.

Referring to Figs. 12A to 12D, this type of self-propelled indicator comprises an indicator drum 5, which is mounted on a suitable stud fixed to a lower frame member 6, so as to turn on a vertical axis and bring any one of the various figures or other insignia on this drum 5 in position to be viewed through an opening 7 in a suitable mask 8 attached to the front end of the unit. A gear 9, fixed to this indicator drum 5, meshes with a gear 10 supported on a suitable stud fixed to the frame member 6; and a bevel gear 11 connected to or integral with the gear 10 meshes with a bevel gear 12 to drive a horizontal operating shaft 13. This shaft 13 extends longitudinally of the unit, and is supported in suitable bearings in the transverse end members 14 and 15 of the supporting frame 16 for the operating element, which is secured to the main frame member 6 by suitable screws as clearly shown.

The operating shaft 13, and in turn the indicating drum 5, is actuated in a step-by-step fashion from a normal bank position to any one of its active indicating positions by the intermittent energization of an operating magnet or solenoid 18, preferably of the iron-clad type, which is fastened to the frame member 16 by suitable screws. The movable core 19 of this operating magnet 18, which is slidably supported in the usual sleeve 20 of suitable non-magnetic material, is loosely mounted on the operating shaft 13. One end of this core 19 has integral therewith, as shown, a disc armature 22, which is held against turning by the engagement of a notch or slot in this armature with a fix stop 23.

The core 19 and armature 22 are biased to the deenergized position, i. e. to the left as shown in Fig. 12A, by a compression coil spring 24 located between the transverse end member 14 and a toothed disc 25 fastened to the end of the core 19 by a detachable connection for assembly purposes, such as by a screw threaded connection and a locking screw as shown. A similar toothed disc 26 is integral with or attached to the armature 22 at the other end of the core 19. Collars 27 and 28 fastened to the operating shaft 13 by pins or the like in the proper space relation have teeth which co-operate with the teeth on the discs 25 and 26 attached to the movable core 19 of the operating magnet, in such a manner that the reciprocation of the core 19 in response to the intermittent energization of the operating magnet 18 will drive the operating shaft 13 in a predetermined direction step-by-step and move the indicating drum 5 to its different positions.

The arrangement of teeth illustrated in Figs. 12A and 12D assumes that the indicator has a blank position and ten active positions, so that there are eleven teeth and eleven spaces on the discs 25 and 26 and collars 27 and 28. With the parts in the normally deenergized position illustrated, it can be seen that when the operating magnet 18 is energized and its armature 22 and core 19 are attracted toward the right, the teeth on the disc 25 engage the teeth on the collar 27 fixed to the shaft 13, and act to turn this shaft through an angle sufficient to bring the points of the teeth on the collar 28 on this shaft beyond the points of the teeth on the disc 26 in the direction of rotation. The deenergization of the operating magnet and the return movement of the core 19 by the spring 24 to the normal position shown, causes the teeth on the disc 26 to co-operate with the teeth on the collar 28 to turn the shaft 13 through an additional angle, and bring the indicator drum to its next active position.

This type of changeable indicator may be readily operated to any desired indicating position by the intermittent energization of its operating magnet from a pulsing bus or the like; and the indicator is retained in its set position against accidental displacement by vibration or movement of the exposed indicator drum. Also, this type of device has definite positions accurately defined by the engagement of the teeth on the discs 25, 26, with the teeth on the collars 27 and 28.

The indicator unit is provided with one or more sets of position contacts, which are selectively closed in accordance with the position of the indicator. Suitable contacts, conveniently termed empty-full contacts, are also actuated as the indicating drum is moved into and out of its blank position.

In the arrangement illustrated, the position contacts comprise contact fingers 32 which are disposed around the operating shaft 13 like staves of a barrel, and are operated from the inside by a roller 30 carried by an arm fixed to the operating shaft 13. Referring particularly to Fig. 12A, it can be seen that each of these contact fingers 32 is fastened at one end to the outer face of a cylindrical portion of a support member 29 of suitable insulating material, which is fastened by a screw or the like to main frame member 6 at the rear end of the indicator casing, with the inner end of this cylindrical portion supported by the end member 15 for the frame 16 of the operating element. Each of the contact fingers 32 has fastened thereto near its free end a pusher pin 33, which extends through a hole in said cylindrical portion of the insulated support member 29 into position to be engaged by the roller 30. As the indicator drum 5, and the operating shaft 13 directly geared thereto, move to a different indicating position, the engagement of the roller 30 on the shaft 13 with the pusher pin 33 of the contact finger 32 belonging to this particular indicating position moves the free end of this contact finger outwardly to cause a contact point thereon to engage a contact ring 34 fastened to said insulated support member 29.

The empty-full contacts in the arrangement illustrated comprise a middle movable contact finger 38 engageable with stationary contact fingers 39 and 40, and spring biased downward. These contact fingers 38, 39 and 40 are suitably secured to an extending lug or bracket 35 on the insulated support member 29. A roller 36 on an arm fixed to the operating shaft 13 acts to shift the movable contact finger 38 against its spring bias to the upper position shown into engagement with the stationary contact 39, when the operating shaft 13 and the indicator drum 5 are in the blank position shown. When the indicator drum 5 is moved out of this blank position to any indicating position, the turning of the operating shaft 13 shifts the roller 36 out of engagement with the contact finger 38, which is then moved to its lower position by its spring bias into engagement with the other stationary contact 40.

The same type of indicator unit just described is used for displaying flight data in the check display units and posting portions of the various fix panels, the figures or other insignia on the indicating drum 5 being, of course, different for the different indicators to conform with the nature and range of the display of data desired. These various indicator units, which are alike except for the number of indicating positions and figures on the indicating dials, are supported horizontally in a suitable mounting structure (not shown) providing in effect cells into which the indicator units may be inserted from the front of the flight progress board; and to facilitate replacement and substitution, each of the indicator units is preferably made quickly detachable as a whole by employing a suitable multiple contact plug coupler for providing the necessary interconnections between the wiring of the indicator unit and the external buses and wires of the system. In the arrangement illustrated, the various wires leading to the terminals of the operating magnet, position contacts, and empty-full contacts are soldered to coupler pins rigidly moulded or fastened in the outer end of the insulated supporting member 29, and arranged to co-operate with suitable resilient plug receptacle contacts, such as diagrammatically indicated by dotted lines in Fig. 12A.

Although only one set of position contacts are illustrated in Fig. 12A for the indicator unit, it can be readily understood how the same organization and type of construction may be employed to provide two or more similar sets of position contacts. Similarly, any desired number of contacts arranged like the empty-full contacts 38—39 and 38—40 may be arranged to be held either opened or closed as desired for any indicating position or positions. Such a modified construction or arrangement of parts, including if desired the omission of the indicating drum 5, affords a counter or register device suitable for the accumulator units and associated control units of the system of this invention; and to simplify the disclosure it is assumed that such indicator structures are used in this connection.

*Control panel for flight controller.*—In accordance with this invention, it is contemplated that the designation of fixes, rated cruising speed, base departure time and other variable factors relating to the tentative schedule or flight plan for a proposed flight shall be selected or designated by the manual actuation by a flight controller of suitable push buttons, rotary dials, knobs, or similar setting devices. One specific organization suitable for this purpose is illustrated in Fig. 2.

Figure 2:
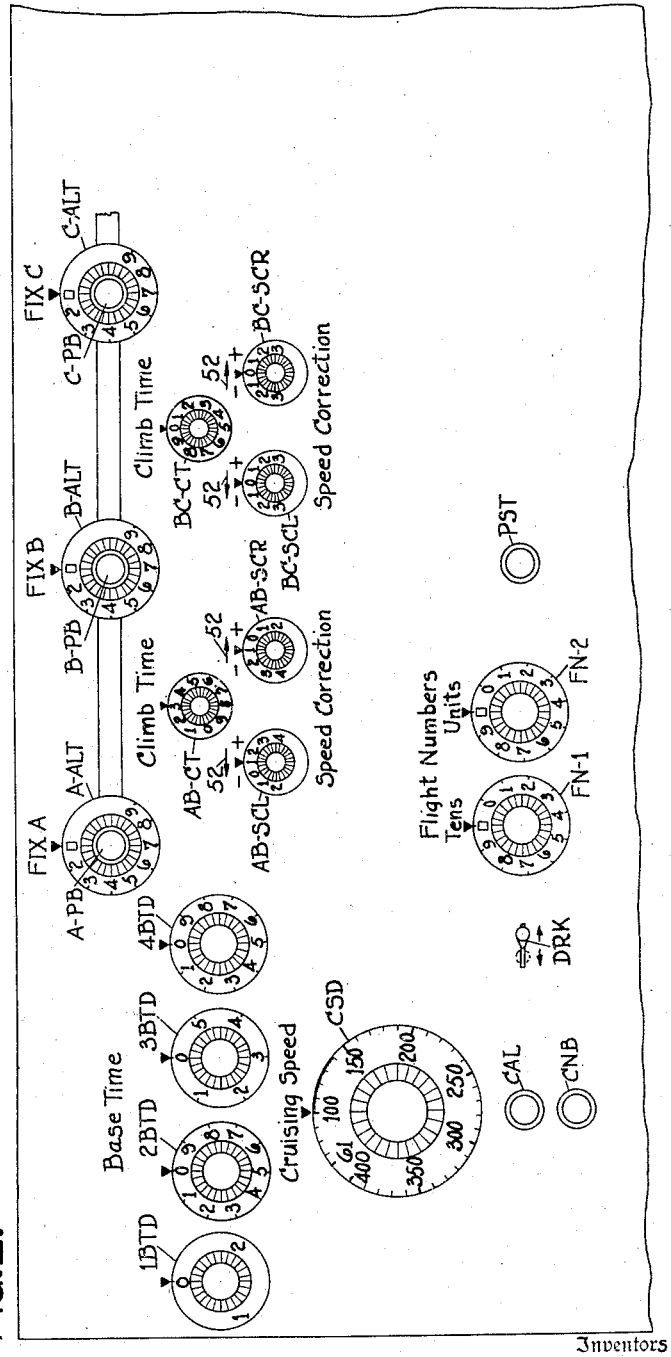

In the particular arrangement shown in Fig. 2, it is proposed to provide a layout diagram in miniature of the airways and established fixes under the jurisdiction of one operator or flight controller; and the particular fixes involved in the desired route for a proposed flight are designated by manual actuation of fix identification push buttons A—PB, B—PB, etc. preferably located at the points on this airway diagram corresponding with the location of such fixes. Each of these fix identification buttons A—PB, B—PB is provided with normally open contacts 45 (see Fig. 10) for governing the energization of an associated fix relay, and normally closed contacts 46 opened when the button is pulled out for restoration purposes as later described.

The altitude allocated to the proposed flight at each of these fixes involved is determined by positioning an altitude dial A—ALT, B—ALT, etc., which is preferably associated with the airway diagram and may be conveniently disposed around the associated fix identification push button, each altitude dial being provided with suitable graduations and an index point, and being held by friction or suitable locking means in its set position until changed.

The flight identification number is designated by the positioning of rotary knobs, such as FN—1 and FN—2, with suitable graduations and symbols relating to the different figures or letters for flight identification purposes; and a similar set of setting dials 1BTD, 2BTD, 3BTD, 4BTD, is provided for defining the four denominations of time for a twenty-four hour day to correspond with the desired base departure time for the proposed flight. The relative direction of the flight over the proposed route is selected by shifting a direction key DRK to the right or left.

The normal or rated cruising speed for the proposed flight is designated by manually positioning a cruising speed dial CSD on the control panel shown in Fig. 2, this speed setting dial CSD being preferably provided with equally spaced graduations for the various cruising speeds for a desired range, such as 61 to 400 miles per hour. This cruising speed setting dial CSD is provided with suitable manually releasable means for holding it against movement in its set position. In the simplified arrangement illustrated in Fig. 3, the pointed end of a fixed stop member 48 engages with notches in a collar 49 fixed to the dial CSD and connected to a cruising speed shaft CS by a pin and slot connection 50 or the like. Inward endwise movement of the dial CSD against the opposition of a compression coil spring 51 acts to disengage the stop member 48 from the collar 49 and free the dial for turning the cruising speed shaft CS to any desired position. The spring 51 acts when the dial is released to restore it and the collar 49 to engage the stop member 48 and lock them in the nearest active position.

While the cruising speed, at which a given plane for a proposed flight may be most efficiently and safely operated, is readily determinable and may be set on the cruising speed dial CSD, the actual rate of movement of such plane relative to the ground, i. e. its ground speed, depends upon the existing flying conditions, particularly the intensity and direction of the wind. Generally speaking, a wind helping or retarding the movement of a plane represents a mass movement of air relative to the earth; and once the value of the compensating speed quantity has been determined to give the average air speed for a given distance between fixes, such speed correction factor may be used for all other cruising speeds.

In view of these considerations, it is proposed to provide speed correction factor setting dials for the various fix intervals which may be manually positioned from time to time to represent the over all speed correction for such fix interval under prevailing flying conditions, as determined on the basis of the latest weather reports or in accordance with the actual performance of the flights as last reported, or such other information and data as may be useful for this purpose. As shown in Fig. 2, there are two of these speed correction factor setting dials for each fix interval, such as the dials designated AB—SCL and AB—SCR for the fix interval between fixes A and B. These dials relate respectively to the opposite directions of flying over this fix interval, conveniently considered as right or left in the sense of the relationship of the fixes as they appear on the miniature layout of the air way on the control panel. The direction of flight to which these speed correction factor dials relate may be indicated on the control panel by arrows 52 or other suitable symbols.

Each of these speed correcting dials is movable from a middle or a zero position in either direction to define (+) or (—) correction miles per hour to be added to or subtracted from the cruising speed, as the case may be, to give the over-all average ground speed for the corresponding fix interval and direction of flight. These speed correction factor dials AB—SCL, AB—SCR, etc. govern the energization of circuits for providing the desired speed correction as later explained.

Although these speed correcting dials are shown in Fig. 2 as being located on the control panel in relation to the associated fix intervals on the airways diagram, it is contemplated that these dials may be located in any convenient place under the control of a separate operator who may manipulate these dials from time to time as reports of plane performance or change in weather conditions may make necessary a change in the over-all speed correction factor for a fix interval.

In connection with the determination of time schedules for flights, it is sometimes desirable to provide a time correction to the elapsed flying time calculated on the basis of ground speed and distance, in order to take care of variations in flying time between fixes due to change in altitude. When a plane takes off from the ground and climbs to a cruising altitude, its actual ground speed for a time is necessarily somewhat less than its ground speed for level flight, due to power limitations and the like. The same is true when a plane is required to climb to a higher cruising altitude between fixes.

In view of these considerations, it is proposed to make provisions in the system of this invention for adding to the flying time, which is calculated for any given fix interval on the basis of ground speed for level flight and distance, any desired additional time as the flight controller may desire and determine by the setting of an associated climb time dial, so as to compensate for the additional time required for a flight to take off and climb to a cruising altitude, or make a change in altitude between fixes. These climb time dials AB—CT, BC—CT are preferably located as shown in Fig. 2 in a spatial relation to the push buttons APB, BPB designating the fixes, so as to be readily identifiable with its associated fix interval. Each of these climb time dials is operable from a normal zero position to add the desired time in minutes for either direction of flight then established by the direction key DRK.

When a plane descends to a lower altitude for the purpose of landing or otherwise, its actual speed relative to the ground may be higher for a time than its ground speed for a level flight; but in the embodiment of the invention illustrated, no provision is made for reducing the calculated time between the fixes on this account, because it is considered that such change in speed is under the control of the pilot, and also is generally limited by the restrictions upon the rate of descent imposed for the comfort of passengers, so that such possible gain of time need not be considered in formulating a time schedule for the pilot to follow.

The control panel of Fig. 2 also includes various other manually operable dials and buttons for carrying out the desired functions of the system as disclosed in our prior application above mentioned, including a push button PST for initiating the operation of posting flight data from check display units into the posting portions of the corresponding panels, a cancel button CNB for cancelling or clearing out routes or calculated times appearing in the check display units, and a calculation button CAL for initiating the automatic calculating operation when the desired settings for cruising speed, departure time, and the like have been made.

Figure 9:
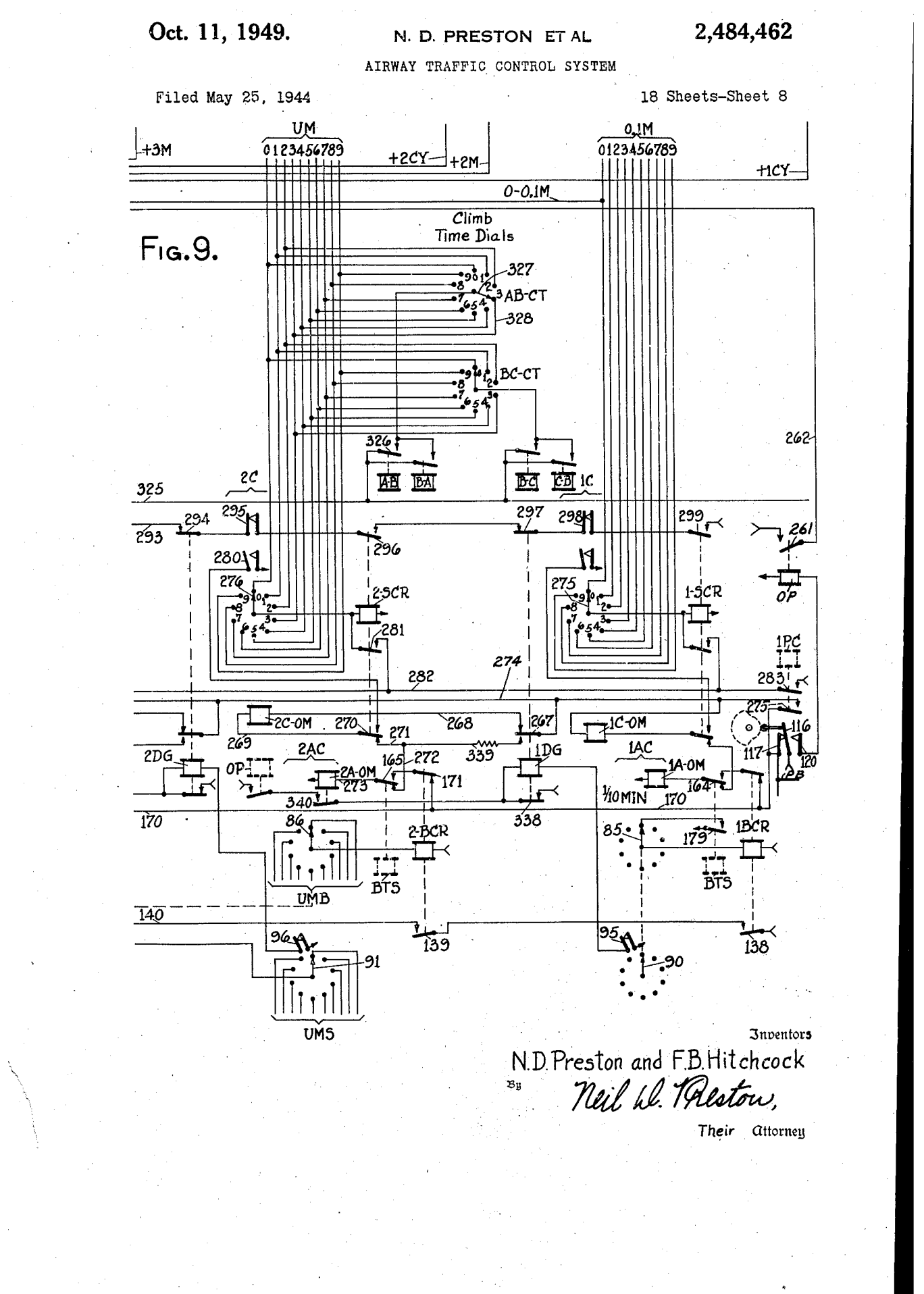
Figure 10:
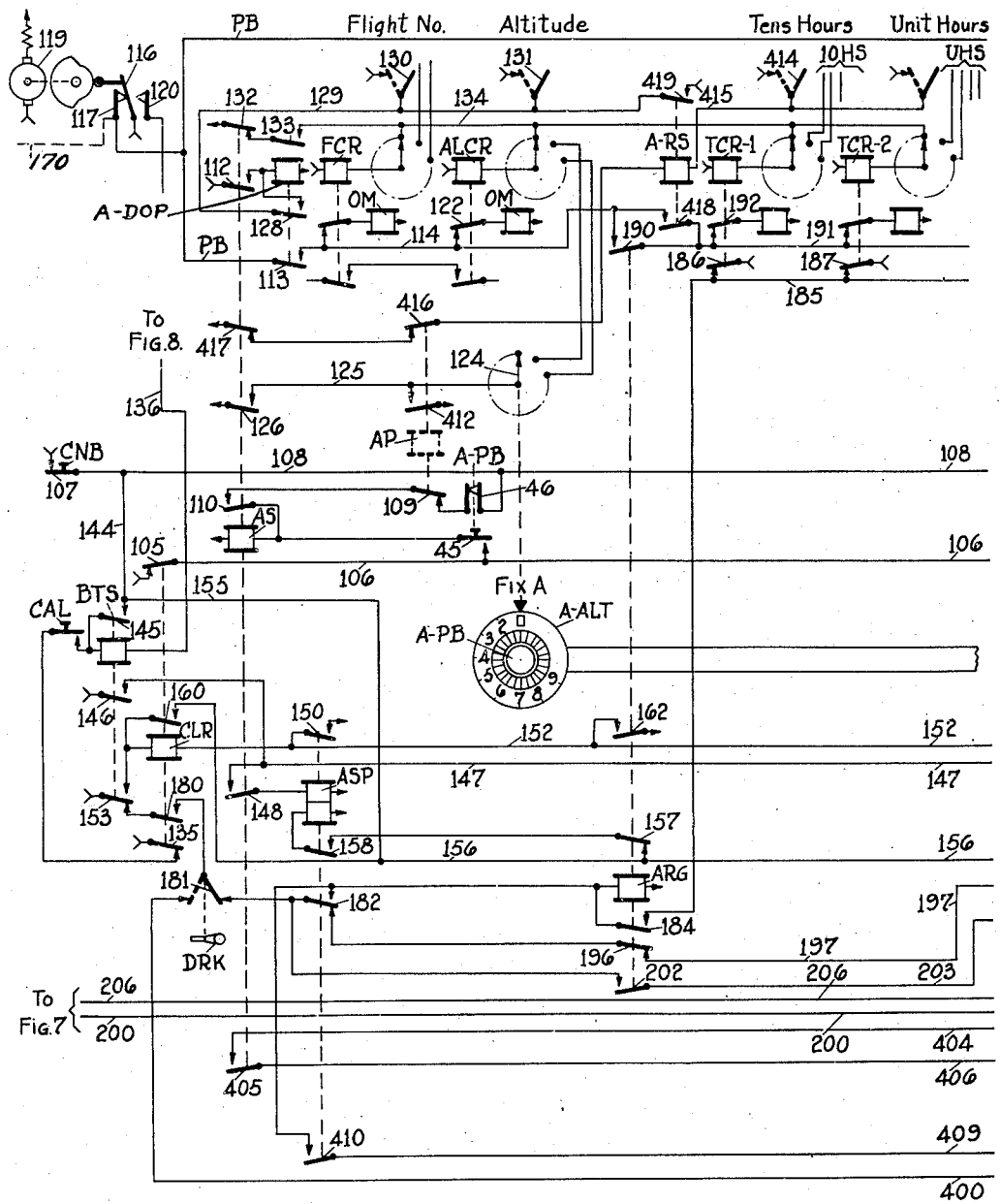

*Sequence relay group.*—The fix identifying buttons A—PB, B—PB and the direction key DRK serve to govern the operation of an organization of relays and circuits illustrated in Figs. 10 and 11, and conveniently designated the sequence relay group, so as to cause the energization of fix interval relays, such as A—B or B—A, to conform with the fixes designated by the actuation of the fix identification push buttons and the direction of flight defined by the direction key. These fix interval relays A—B, B—C, etc. for the proposed route are energized successively at the proper times to govern the operation of a master calculator of Figs. 4 and 5, and a master accumulator of Figs. 8 and 9 in accordance with the ground speed, distance and time factors relating to these fix intervals in turn. Also, this sequence relay group of Figs. 10 and 11 governs the energization of register relays, such as ARG for fix A, for the purpose of posting the arrival times in the check display units for the associated fixes in turn as these times are determined and set up in the master accumulator. These operations and the circuits involved are more conveniently explained later in connection with the description of typical operations.

Figure 3:
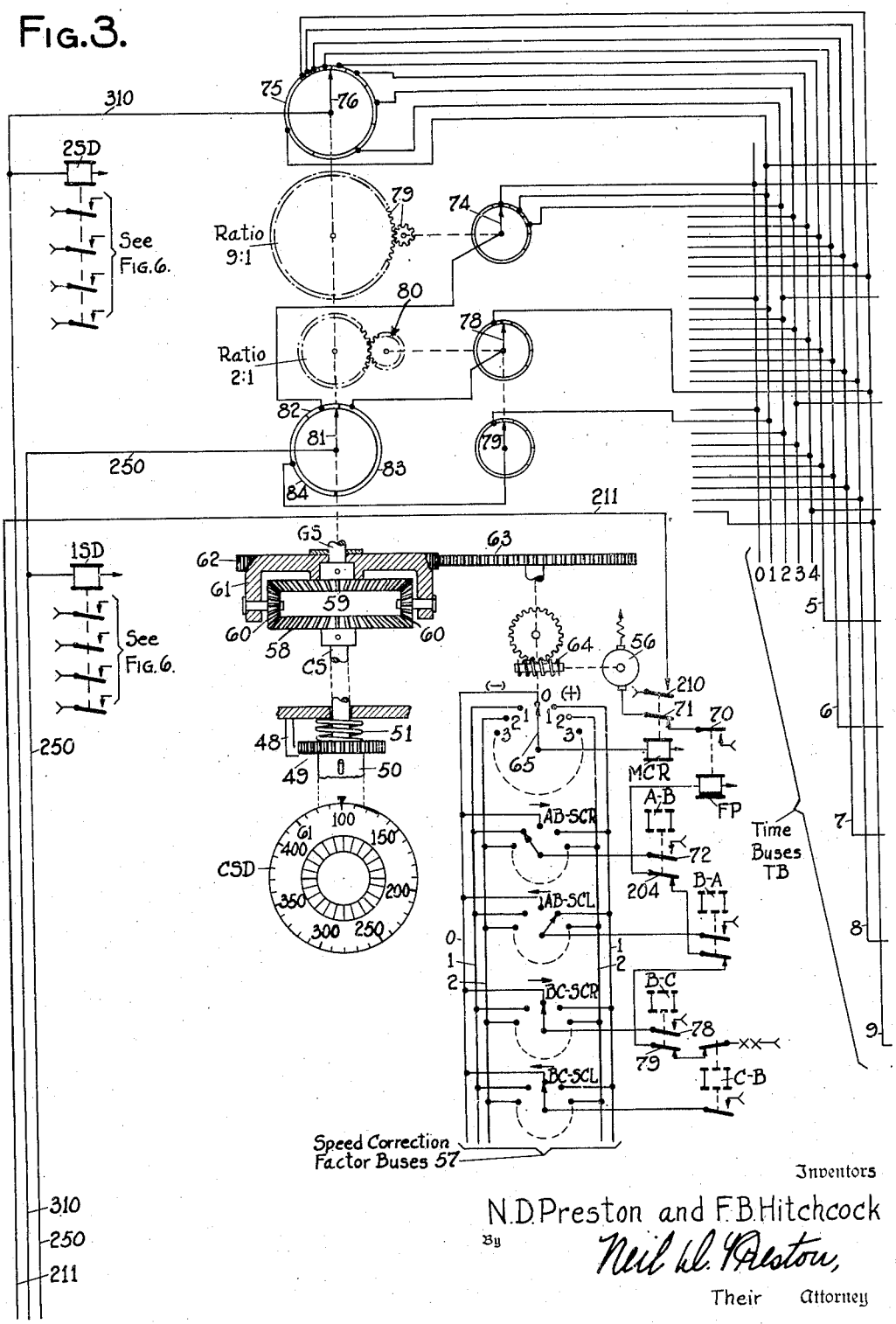
Fig. 3 shows the means for changing the designated cruising speed in accordance with speed correction factors for the various fix intervals so as to obtain the correct average ground speed for these fix intervals.

*Speed conversion mechanism.*—The cruising speed for a proposed flight is designated by the position of the cruising speed shaft CS set manually by the cruising speed dial CSD, and the speed correction factors for the respective fixes are defined by the existing position of the speed correction factor dials AB—SCL, AB—SCR, etc. for the various fix intervals. A speed conversion mechanism diagrammatically illustrated in Fig. 3 is provided to energize at the proper time one selected bus of a group of time buses TB in accordance with the respective digits of a numerical quantity representing a selected unit of time for a unit of distance at the particular ground speed corresponding with the setting of the cruising speed dial CSD and the speed correction factor dial AB—SCL, AB—SCR, etc. then effective. Although the significance and method of utilizing such selective energization of time buses TB are more conveniently considered later in connection with typical examples of the operation, it is expedient to at this time describe the structure and operation of this speed conversion means.

Referring to Fig. 3, the cruising speed shaft CS is connected to a ground speed shaft GS by suitable planetary or epicyclical gearing shifted by an electric motor 56 under the control of buses 57 selectively energized in accordance with the speed correction factor then effective. In the particular structure illustrated, the cruising speed shaft CS and the ground speed shaft GS are connected to bevel gears 58 and 59 respectively, which are interconnected by freely rotatable beveled pinions 60 supported on a gear carrier 61. This carrier 61 is mounted on a suitable bearing co-axial with the shaft GS and has a gear 62 fixed thereto meshing with a gear 63 which is connected by a non-reversible worm gear drive 64 to the armature of the operating motor 56.

A contact arm 65 connected to and moving with the gear 63 which is driven by the motor 56, engages in its different positions stationary contacts connected with the buses 57 relating to the various speeds throughout a desired range to be added to, or subtracted from, the cruising speed represented by the setting of the cruising speed dial CSD, in accordance with the existing position of a (+) or (—) speed correction factor dial AB—SCL, AB—SCR, etc.

When a calculation of flying time is to be made for a given fix interval and direction, say from fix B to fix C, the energization of the corresponding fix interval relay B—C closes a front contact 78 to render effective the associated speed correction factor dial BC—SCR for the fix interval and direction in question, and at the same time the back contact 79 of relay B—C opens a normally closed energizing circuit for a slow-release relay FP, this circuit for relay FP including in series similar back contacts of all of the fix interval relays A—B, B—A, etc., and being readily traced in Fig. 3. If the operating gear 63 and associated contact arm 65 are in a position for the same relationship between the cruising speed shaft CS and the ground speed shaft GS as called for by the speed correction factor dial thus rendered effective, a correspondence relay MCR is energized before the relay FP is released.

For example, if the gear carrier 61 is in the position shown, in which there is zero correction to the cruising speed, so that the cruising speed shaft CS and ground speed shaft GS have the relative relationship for a ground speed the same as the cruising speed, then the contact arm 65 connected to the gear 63 is in the zero position shown and connected to 0 bus. If the fix interval relay B—C is now energized, an energizing circuit for the correspondence relay MCR is completed from (+), through front contact 78 of relay B—C, associated speed correction factor dial BC—SCR in the zero position shown, the 0 bus of group 57, arm 65 in the zero position, and correspondence relay MCR to (—).

If, however, the existing position of the gear carrier 61 represents a speed correction factor different than called for by the speed correction factor dial rendered effective, there is no energizing circuit for the correspondence relay MCR, and as soon as the relay FP releases, the operating circuit for the motor 56 which is readily traced on the drawings is closed through back contacts 70 and 71 in series of relays FP and MCR. The motor 56 starts to turn the gears 62 and 63 and the gear carrier 61 in a chosen direction. This turning movement of the carrier 61, since the beveled gear 58 connected to the cruising speed shaft CS is held stationary, causes turning of the beveled gear 59 connected to the ground speed shaft GS, thereby rotating the ground speed shaft GS relative to the cruising speed shaft CS until they assume that relative position corresponding with the number of miles per hour to be added to, or subtracted from, the cruising speed dependent upon the existing position of the speed correction factor dial.

Assume, for example, that while the gear carrier 61 is in the position shown for a zero speed correction factor, the fix interval relay A—B is energized at a time when the associated speed correction dial AB—SCR is in the (—1) position as shown. Under these conditions, when the fix interval relay A—B is energized, there is no circuit for energizing the correspondence relay MCR, and the motor 56 is energized to cause turning of the ground speed shaft GS until it assumes a position relative to the cruising speed shaft CS corresponding with the desired correction of (—1) miles per hour.

In the interests of avoiding the need for reversing the direction of rotation of the operating motor 56, and thus simplifying its control circuits, the gears 62, 63, and the gear carrier 61 are preferably rotated in the same relative directions for both (+) and (—) corrections.

If, as assumed in the example just given, the correction calls for a change of the ground speed shaft GS to a lower speed position, and if the direction chosen for the rotation of this shaft by the epicyclic gearing and operating motor should be toward higher speed positions, then the gear carrier 61 has to make almost a complete revolution to bring the parts into the desired relationship; whereas only a small portion of a revolution is required for making speed corrections in the opposite sense. In either case, when the ground speed shaft GS assumes the proper relationship to the cruising speed shaft CS, an energizing circuit for the correspondence relay MCR is closed by a circuit including contact arm 65 and the speed correction factor dial AB—SCR under consideration in the same relative positions, whereupon the operating circuit for the motor is broken at the back contact 71 of the relay MCR to stop and hold the ground speed shaft GS in this position.

Since the ground speed shaft GS is thus automatically positioned from time to time to conform with the corrected cruising speed for the various fix intervals, suitable means in the speed conversion mechanism can be operated by this shaft GS for energizing the time buses TB selectively in accordance with a suitable unit of time per unit of distance for the various speed positions of said shaft. Although various units and arrangements may be utilized for this purpose, it is contemplated that the buses TB will be selectively energized in accordance with the first two significant digits of the decimal fraction representing the minutes per mile for each of the various speed positions of the ground speed shaft GS.

Expressed in another way, the quantities corresponding to the reciprocal of speed in miles per hour multiplied by sixty are determined by ordinary calculation for the range of speeds for which the apparatus is designed, including the maximum positive and negative correction factors, and these quantities are then embodied in apparatus for selectively energizing buses to represent such quantities.

In the partciular arrangement illustrated a contact arm 76 is connected to the ground speed shaft GS so as to be rotated thereby for contacting the various segments of a contact ring 75, which is divided by suitable thin pieces of insulation into arcuate strips, or segments, of appropriate lengths to correspond with the different digits of the first decimal place of the time quantities for the different speed positions of the ground speed shaft, these arcuate strips, or segments, being respectively connected to the different time buses TB. The lengths of the various arcuate strips 1 to 9 engaged by the contact arm 75 (and preferably covering approximately one complete revolution) are determined so that with the arm 75 in a given speed position, such as 100 miles per hour as shown, this arm engages with a contact strip belonging to the digit of the first decimal place of the reciprocal of this speed multiplied by sixty, i. e. with the strip connected to the time bus 6.

For the purpose of simplifying the circuits involved in connection with the flying time calculator, the time buses TB are selectively governed both by the digits of the first decimal place of the time quantity and by the digits of the second decimal place of the time quantity, but this selective control is effective at different times in the sequence of operation of the automatic flying time calculator, as will be later explained in detail.

To accomplish the selective energization of the time buses TB in accordance with the various digits of the second decimal place of the decimal fraction representing minutes per mile, another arm might be located on the shaft GS similar to the arm 75 to cooperate with contact strips or segments of the proper lengths so as to provide the desired selective energization of the time buses. It can be appreciated, however, that the digits for the second decimal place will vary from 0 to 9 in an irregular fashion for each of the digits of the first decimal place. For example, the second decimal place of the time quantity of minutes per mile under consideration is zero for several speeds such as 66, 75, 85, 100, 120, 150, 200 and so on. Consequently, one contact arm for the second decimal place in question to cover the entire range of the speeds would involve a division of the associated contact ring into such a large number of arcuate strips or segments, that such a ring would be difficult to be provided with the reasonably small dimensions usually desired in such devices.

Accordingly, it is proposed to use a plurality of auxiliary contact arms connected to the ground speed shaft GS by suitable gear ratios so that each of several portions of a complete revolution of the shaft GS may have its controlling segments distributed over 360 degrees of rotation of an auxiliary contact arm. The gear ratios are so selected that each auxiliary contact arm will assume a particular predetermined relationship with respect to its allotted portion of the revolution of the shaft GS, as well as providing a more convenient spacing for the contact segments at the lower speed ranges.

More specifically it is proposed to use a plurality of auxiliary contact arms, such as arms 74, 78 and 79, connected to the ground speed shaft GS by suitable gearing 79 and 80. The gearing 79 has a ratio of 9 to 1 so that the auxiliary arm 74 makes nine complete revolutions during one revolution of the shaft GS. Since one revolution of the auxiliary arm 74 therefore represents forty degrees of the revolution of the shaft GS, it has been assigned the digits of the second decimal place for the time quantities for the most crowded portion of the range of speeds including 61 to 100 miles per hour. The gearing 80 has a ratio of 2 to 1 so as to cause the auxiliary arms 78 and 79 to make two complete revolutions for one revolution of the shaft GS. The auxiliary contact arm 78 has been assigned the digits for the second decimal place of the time quantities for the range of speeds including 101 to 280 miles per hour; while the auxiliary contact arm 79 has been assigned the different digits of the second decimal place of the time quantities for the range of speeds including 181 to 420 miles per hour. The different arcuate strips or segments of these auxiliary contact arms are of course of appropriate lengths to correspond with the different digits of the second decimal place of the time quantities for the different speed positions allotted to the respective contact arms, and these different segments are connected to their respective time buses TB.

A supplemental contact arm 81 on the shaft GS engages contact strips 82, 83 and 84 of the proper length for the particular portion of the revolution of this shaft relating to these auxiliary arms, so as to render the auxiliary arms 74, 78 and 79 effective one at a time to govern the energization of the time buses TB.

By way of an example, it can be seen that with the ground speed shaft GS in the 100 mile per hour position in correspondence with the 100 mile per hour position of the cruising speed dial CSD (assuming that there has been no correction factor inserted), the supplemental contact arm 81 engages the contact strip 82 connected to the auxiliary arm 74, which in turn is in a position to energize the 0 bus, since the time quantity in question for 100 miles per hour is .60 minute per mile and the second decimal place includes a zero.

It is noted that the segments of the various contact arms are separated by suitable thin strips of insulation which should be placed in what may be termed half degree positions with respect to the full degree positions used for the different mile per hour positions of the shaft GS. This is so that the positioning of the cruising speed dial CSD in any mile per hour position for which it is designed, will cause the various contact arms to be located in contacting positions.

Since the calculating portion of the system is organized to multiply a decimal fraction of minutes per mile by a distance in miles, the lowest calibration of the dial CSD is 61 miles per hour, while the other calibrations are made on the even ten mile per hour divisions. Employing the full 360 degrees of the dial, the highest speed calibration position then becomes 420 miles per hour using one degree of the dial for each mile per hour. On this basis, the successive segments of contact ring 75 have degree lengths of 6, 8, 11, 15, 20, 30, 50, 100 and 120 for the digits 9 to 1 for the first decimal place of the minutes per mile positions of shaft GS, disregarding for the moment the thin insulating spacers between the segments. From this, it can be seen that the lengths and connections of the segments is a matter of calculation and calibration, the principles of which can be readily applied to the auxiliary contact arms.

*Multiplier and carrier contactors.*—In accordance with this invention, the operation of determining the arrival times for a proposed flight at any number of fixes in a desired route and direction is carried out by a master calculator and accumulator on the basis of a numerical computation, which involves in effect, with respect to each fix interval in turn, the automatic multiplication digit by digit of one number representing time in minutes per mile for the ground speed over that fix interval, and a second number representing the number of miles in that fix interval. For example, a flight having a ground speed of 100 miles per hour, corresponding with the setting illustrated in Fig. 3, requires 0.60 minute to fly each mile, and the distance in miles for any fix interval multiplied by 0.60 will give the total flying time between these two fixes.

In the specific embodiment of the invention illustrated, this multiplication process is carried out by positive positioning electrically operated devices to definite digit positions in accordance with the selective energization of buses. The detail construction and arrangement of parts and circuits for performing these functions are more conveniently considered later in describing typical operations; but it may be helpful to outline briefly at this time the organization of the parts involved in this operation.

Figure 4:
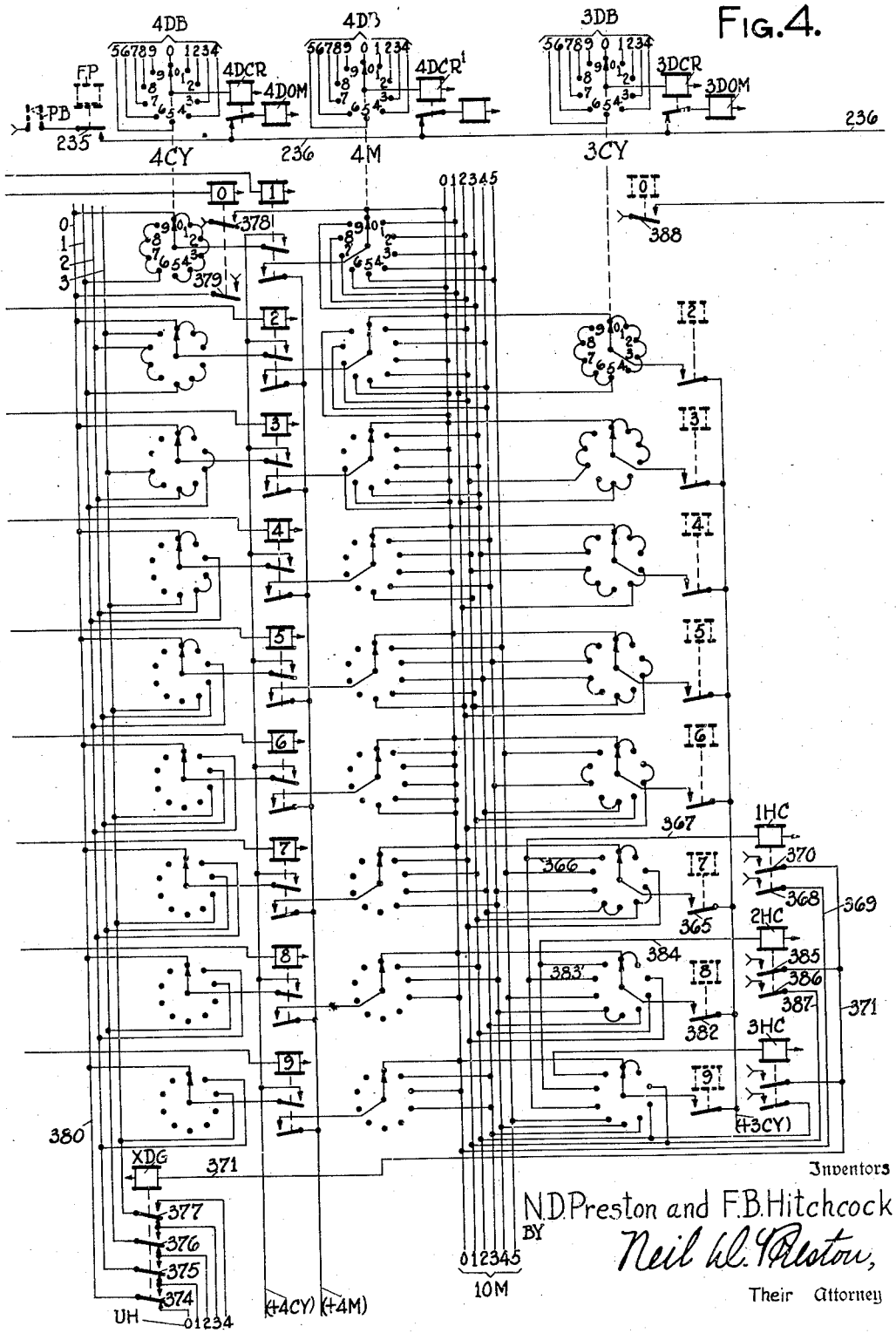
Figs. 4 and 5 illustrate the multiplier and carrier contactors, together with the various buses and circuit connections, constituting the principal means for carrying out the multiplying process characterizing the invention.
Figure 5:
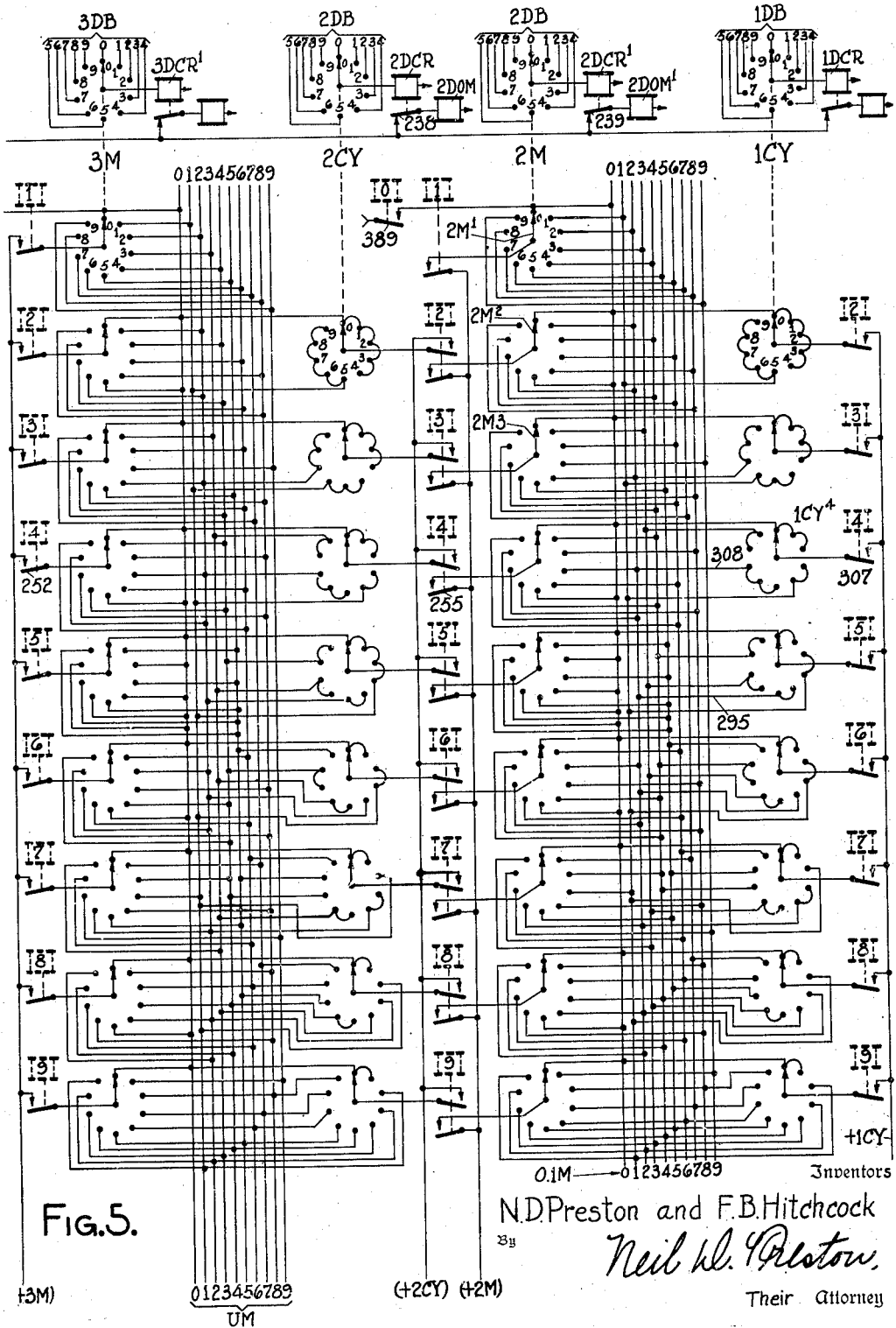

Referring to Figs. 4 and 5, the apparatus for energizing certain buses selectively in accordance with digit-by-digit multiplication comprises a plurality of multiple position circuit controlling units or contactors, conveniently considered as multiplier and carrier contactors and designated 2M, 3M, 4M and 1CY, 2CY, 3CY, 4CY. Each of these contactors, which may be a multiple level and multiple position step-by-step switch, such as shown in the patent to Brown No. 2,302,000 dated November 17, 1942, and commonly used in telephone selector systems and the like, or an equivalent structure, is illustrated conventionally as comprising a number of contact arms, such as 2M$^1$, 2M$^2$, 2M$^3$, etc. for multiplier 2M, movable together to any one of a number of different positions by suitable means, such as by the intermittent energization of an operating magnet DOM in a manner similar to that descirbed for the changeable indicator of Fig. 12A.

The different arms of each of these multiplier and carrier contactors relate respectively to different digits of a time quantity, and the different positions of these arms relate to the different digits of a distance quantity. The multiplier contactors have contact arms 1 to 9, while the carrier contactors have arms 2 to 9, for reasons that will be apparent as the description progresses.

Referring to the multiplier unit 3M in Fig. 5 as typical, the contact points for the respective arms 3M$^1$, 3M$^2$, 3M$^3$ etc. are connected to buses UM for unit minutes marked 0 to 9, in accordance with the digit in the first or lowest place of the product of the distance number represented by the position of these arms and the time number represented by the particular arm. For example, the arm 3M$^2$ in position 1 is connected to bus 2, in position 2 to bus 4, and in position 3 to bus 6, and so on, in accordance with the digit of the first or units place of the products resulting from multiplying the number 2, represented by this arm 3M$^2$, by numbers 1, 2, 3, etc. corresponding to the positions of this arm. Similarly, the arm 3M$^4$ for digit 4 in position 1 is connected to bus 4, in position 2 to bus 8, in position 3 to bus 2, and so on, to correspond with the digit in the lowest or units place of the product of $4 \times 1$, $4 \times 2$, $4 \times 3$, etc.

Each of the carrier contactors 1CY, 2CY, 3CY and 4CY is arranged to control the energization of buses in a similar manner, but the contact points of a carrier unit relating to a given digit place of the distance quantity are connected to the buses belonging to the multiplier contactors for the next higher digit place, and in accordance with the number to be carried as a result of the multiplication process. Referring, for example, to the carrier contactor 3CY in Fig. 4 relating to the same distance digit as the multiplier contact 3M shown in Fig. 5, the contact points of this carrier contactor 3CY are connected to the buses 10M relating to tens of minutes of the next higher denomination of time. The arm 3CY$^2$ of this carrier contactor is connected in each of its positions 5 to 9 to bus 1 of the group of buses 10M, since the multiplication of the number 2, corresponding with the contact arm 3CY$^2$ in question, by any number 5, 6, 7, 8 or 9, corresponding with these positions of such arm, calls for carrying 1. In the case of arm 3CY$^3$ for this carrier contactor relating to digit 3, it energizes bus 1 in positions 6 to 9, inclusive, since the number 3 multiplied by 4, 5, or 6 gives 1 to be carried, while 3 multiplied by any number from 7 to 9 inclusive gives 2 to be carried.

In short, the connections to the control buses UH, 10M, UM and 0.1M from the multiplier and carrier contactors are made up in accordance with the multiplication table, so as to provide for the energization of particular buses of two different sets or groups in accordance with the numbers in the two digit places of the product of any two numbers from 0 to 9, one of these numbers corresponding with the distance quantity being represented by the position of the arms, and the other number corresponding with the time quantity being represented by the particular arm involved.

In the particular arrangement assumed for calculating flying times for fix intervals, the maximum number of hours involved in such a calculated time interval for any given fix interval of ordinary length is necessarily limited; and hence the circuit connections shown as controlled by the carrier contactor 4CY are limited to those for the energization of a few buses marked 0 to 4, which provide for calculation of flying time intervals up to 5 hours.

In this connection, since the products of multiplication in this case correspond with time, and since the different denominations of time, i. e. minutes, tens of minutes, hours and tens of hours, are not organized on the decimal system, it is necessary to provide somewhat different arrangements of bus connections for the contactors relating to these different time denominations. For example, there are 60 minutes in an hour, and hence the bus connections for the multiplier and carrier contactors 4M and 3CY relating to and governing the energization of the buses 10M for tens of minutes are organized to multiply and carry on the basis of 6 rather than 10. For example, arm 4M² of multiplier contactor 4M in position 4, instead of being connected to bus 8 to correspond with 4×2, is connected to bus 2 to correspond with 8 minus 6, while the arm 3CY² for the associated carrier contactor in the same position provides for the energization of bus 1 to carry 1.

Also, certain numbers relating to the units minutes place have products exceeding the 60 minutes in an hour, i. e. 8×8, 9×7, 9×8, and 9×9, so that a special operation in the nature of a double digit carrying process is involved; and consequently, relays 1HC, 2HC, and 3HC are required for special double digit carrying for these particular cases, as later explained.

It may be pointed out here that the particular arrangement shown provides for determining and storing in an accumulator the first decimal place or tenths of minutes for the product. This is done in the interests of accuracy, even though no schedule of time involving a tenth of a minute is registered in a check display unit, because extra tenths of minutes involved in a plurality of different flying time intervals, when added together, may well represent one or more significant unit minutes. It is not considered necessary, however, to calculate or store the number for the second decimal place or hundredths of a minute, corresponding with the lowest digit place of the partial product resulting from multiplying the digit in the units place of distance by the digit in the second decimal place of time, namely, the number 0 resulting from multiplying 4×5 in the typical example shown in Fig. 14. Accordingly, there is no multiplier contactor associated with the carrier contactor 1CY.

Figure 8:
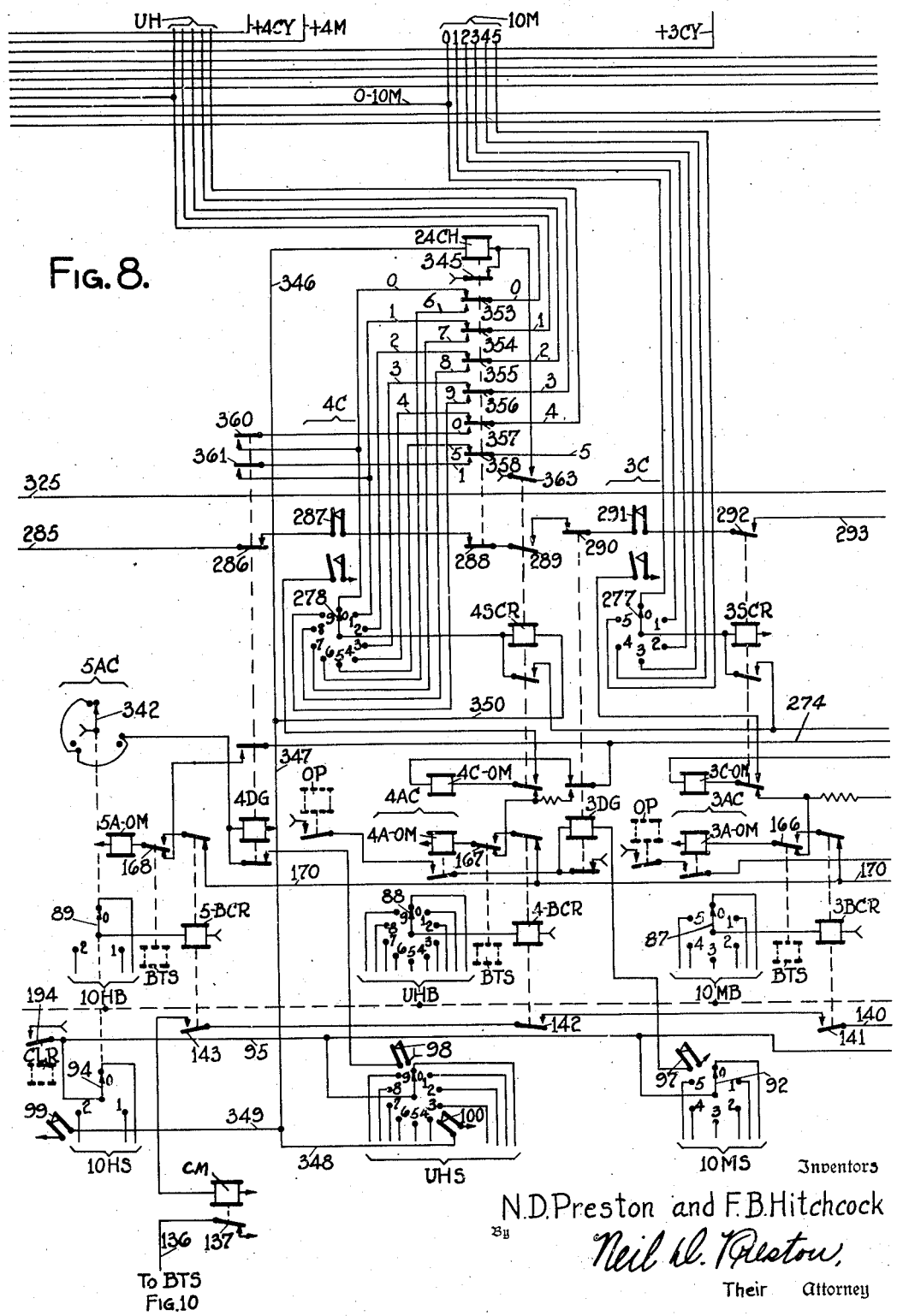

*Time accumulator.*—The calculated arrival times at the respective fixes in a designated route are set up in the time accumulator of Figs. 8 and 9 as a result of adding to the base departure time in succession the flying times for the successive fix intervals. In the particular embodiment of the invention shown, this time accumulator is also used to add together or accumulate in succession the various digits of the several partial products resulting from the digit by digit multiplication of the time and distance quantities.

Referring to Figs. 8 and 9, this accumulator comprises a group of five accumulator or storage units, conveniently designated 1AC, 2AC, etc. which relate respectively to the tenths of minute, unit minutes, tens of minutes, unit hours, and tens of hours denomination of time of a twenty-hour day. Each of these accumulator units 1AC, 2AC, etc. is in the form of an electrically operable counter or register, and comprises an operating or stepping magnet 1A—OM, 2A—OM, etc., a correspondence relay 1BCR, 2BCR, etc., and a contact structure for selectively closing contacts in the different active positions of these units. One type of device suitable for this purpose is similar to the indicator unit of Fig. 12A, except that no indicator drum is required, unless it is desired to designate visually the various positions of these indicator units for general observation, maintenance or the like.

Each of these accumular units 1AC, 2AC, etc. is provided with two sets of position contacts, illustrated diagrammatically as rotary contact arms 85 to 89 and 90 to 94 engaging contact points, and also includes special contacts 95 to 98 illustrated conventionally, which are momentarily opened by suitable cam action, similar to the empty-full contact of the indicator unit of Fig. 12A, during movement of the associated movable contact element from the last active indicating position to the zero position. The accumulator unit 5AC for tens of hours has a special contact 99 open in its position 2; and the accumulator unit 4AC for the unit hours digit has a similar additional contact 100, opened during movement from position 3 to position 4, for the special control required when changing from one day to the next, in the manner later explained.

The time accumulator as a whole also includes a plurality of control or impulse counting units 1C, 2C, etc. of a similar construction, comprising operating magnets 1C—OM, 2C—OM, etc. and correspondence relays 1SCR, 2SCR, etc. These control units 1C, 2C, etc. govern the impulsing or stepping of the accumulator units in accordance with the energization of the control buses UH, 10M, UM, and 0.1M for the time accumulator; but since the greatest partial product of flying time to be added into the accumulator will not exceed ten hours, it is not necessary to provide such a control or impulse counting unit for the tens of hours denomination of time.

In this connection, when an indicator unit such as shown in Fig. 12A is used for the respective accumulator units 1AC, 2AC, etc. and their associated control or impulse counting units 1C, 2C, etc., the number of teeth on the discs 25, 26 and collars 27, 28 and number of contact fingers as shown in Fig. 12A are chosen to provide for the proper number of active positions required which in the case of the unit minutes and unit hours denomination is ten, and in the case of the tens of minutes and tens of hours denomination is six and three respectively. The tens of hours accumulator unit 5AC and its associated control unit 5C even though it has only three active contact making positions, is preferably provided with teeth for 6, 9 or 12 positions, so as to facilitate the movement of these units to their three different significant positions by their respective operating magnets, said operating magnets causing two or more steps of these units to advance them from each active position to the next.

A digit carrying stick relay 1DG, 2DG, etc. is provided for each of the accumulator units, except for the highest or tens of hours denomination of time; and these relays serve to control the digit carrying operation in the manner more conveniently considered later in describing typical operations.

*Control relays and distributor.*—The calculator and accumulator operations in accordance with the embodiment of the invention shown are carried out in successive steps conveniently designated *a, b, c,* etc. as later explained in detail, including a special step *e* for adding to the calculated time any additional climb time for change in altitude that may have been set up on the climb time dials AB—CT, BC—CT. During these steps *a, b, c* etc. of the operation, a number of circuit connections have to be made and broken in certain particular combinations; and for this purpose five counting or stepping relays R*a*, R*b*, etc. shown in Fig. 7 are sequentially energized by the operation of a scanner or distributor DT, subject to the electrical control exercised by the operation of the multiplier and carrier contactors 4M, 4CY, etc. and the impulse counting units 1C, 2C, etc. of the accumulator. This distributor DT, which is illustrated diagrammatically in Fig. 7 may be any one of the well known types actuated from one active position to the next by the energization of a stepping magnet STM to cause energization of each of the five control relays Ra, Rb, etc., one at a time in turn during one complete revolution of the distributor, said distributor having a half-step position for each active control position.

*Typical operations*

The functions, mode of operation and circuits characterizing the invention are best understood by considering in detail certain typical operations. These various typical operations will be described generally as well as by the consideration of specific examples. In this connection, reference may be made to Fig. 16 which illustrates a typical sequence chart of a general nature adapted to show the sequence of the various device operations involved in a complete cycle of operation of the calculating organization. However, this sequence chart has not been made specific to a particular example where specific figures are involved, but has been organized on a general basis so as to give a general comprehension of the operation of the system as a whole. In most cases, where the system would vary in the number of steps suitable legends have been applied to the chart to indicate such conditions. Also, the operation of the accumulator has been abbreviated rather than showing all of the steps in order to condense and simplify the chart in its illustration of the overall functioning of the system. However, the complete operation of the accumulator and its associated impulse counting unit for specific numbers is illustrated by typical examples in Figs. 17 and 18 to which reference will be made as the description progresses. In this connection, it should be understood that Figs. 17 and 18 represent specific examples of operation which may occur for any one of the steps of calculation indicated as steps a, b, c, d and e in the chart of Fig. 16.

*Setting up a proposed flight route.*—As a simple example of this operation of the system, assume that a proposed flight with a rated or normal cruising speed of 175 miles per hour is to be scheduled from fix A to fix B for a distance of 125 miles, leaving fix A at 10:00 o'clock and flying at some designated altitude, such as 5000 feet.

The flight operator sets the dials FN—1 and FN—2 on the control panel in Fig. 2 for the flight identification number chosen to identify this flight, and the altitude dials A—ALT and B—ALT for the designated altitude of 5000 assumed. He also sets the direction key DRK to the right, and then actuates the fix identifying push buttons A—PB, B—PB for the fixes A and B in question.

The operator would ordinarily also at the same time position the cruising speed dial CSD, and base time dials 1BTD, 2BTD, etc., to conform with the rated cruising speed of 175 and proposed base departure time of 10:00 for the flight in question, although such settings have to do with the calculation of the time schedule for the proposed flight, as distinctive from setting up the route for this flight. Also, if the proposed flight is to take off from fix A, as assumed, or is to make a substantial change in altitude between fixes, the operator will also set the climb time dial AB—CT for the fix interval between fixes A and B in question to represent the additional climb time required for such take off or change in altitude, say 3 minutes.

Referring to Figs. 10 and 11, and assuming the flight number and altitude dials to have been thus positioned, the actuation of the push button A—PB energizes the fix relay AS over a circuit which may be traced in Fig. 10 from (+), through a back contact 105 of a calculating relay CLR, pick-up bus 106, contacts 45 of push button A—PB, and winding of relay AS to (—). The relay AS is maintained energized after release of the push button A—PB by a stick circuit which may be traced from (+), through normally closed contacts 107 of the cancel button CNB, cancel bus 108, contacts 46 of push button A—PB opened when it is pulled out, back contact 109 of a fix posting relay AP, front contact 110 of relay AS, and winding of relay AS to (—).

The energization of the relay AS and closure of its front contact 112 closes a pick-up circuit readily traced in Fig. 10 for the display operating relay A—DOP for the fix panel A in question; and the closing of the front contact 113 of this relay A—DOP connects a pulsing bus PB to an operating bus 114 for the check display unit in question.

This pulsing bus PB is intermittently energized by suitable means at time intervals most effective for operating the indicators of the type assumed and illustrated in Fig. 12A. In the organization diagrammatically illustrated in Fig. 10 for this purpose, a movable spring biased contact element 116 is shifted back and forth into engagement with a stationary contact 117 connected to the pulsing bus PB by a cam and roller device 118 operated at the desired rate by a motor 119. The shape of this cam and the speed of the motor 119 may be chosen to provide a relative duration of energization and deenergization of pulsing bus PB and a periodicity of such intermittent energization which are best adapted for the stepping operation of the indicators. In this connection, in order to provide special control for a relay IPC and for other purposes later explained, another stationary contact 120 is arranged to be engaged by the movable contact element 116 when it is moved to its biased open position shown and the pulsing bus PB is deenergized; and closure of contacts 116—120 energize a relay OP.

Thus, time spaced impulses are supplied from the pulsing bus PB to operating magnets OM through back contacts of associated correspondence relays FCR, ALCR of the various indicators for flight number, altitude and direction, for the purpose and in the manner more fully explained in our prior application, Ser. No. 528,926, filed March 31, 1944, previously mentioned.

For example, assuming the altitude dial A—ALT for fix A to be set in position 5 for the assumed 5000 foot altitude, upon energization of relay A—DOP current is supplied from (+), through pulsing contacts 116—117 to pulsing bus PB, thence through front contact 113 of relay A—DOP, operating bus 114, back contact 122 of correspondence relay ALCR, operating magnet OM of altitude indicator, to (—). The resultant intermittent energization of the operating magnet OM advances the indicator step by step from the blank position shown, until it reaches the position 5 corresponding with the assumed existing position of the altitude dial A—ALT, whereupon the correspondence relay ALCR is energized by a circuit from (+), winding of relay ALCR, position contacts of altitude indicator in position 5, control bus for this position, not shown but similar to those shown for positions 1 and 2, contact arm 124 of altitude dial A—ALT, wire 125, and front contact 126 of relay AS to (—), thereby disconnecting this operating magnet OM from the operating bus 114, and arresting and holding the indicator in this position.

The relays BS and B—DOP for fix panel B are energized upon actuation of the push button BPB by circuits the same as those already described for relays AS and A—DOP; and the flight number, altitude and direction indicators for the check display unit of fix panel B are automatically operated to conform with the flight data designated for fix B.

In this connection, the flight number and direction indicators for the check display units are controlled from master buses having their energization governed by the flight number dials FN—1, FN—2 and direction key DRK of the control panel, as explained in our prior application above mentioned.

In this way, the proposed route for the flight is displayed for visual inspection in the check display units of the fixes involved; and the operator may readily determine if he has actuated the push buttons for the proper fixes, selected the desired altitudes at these fixes, and identified the proper direction for the proposed flight. In the case of error, the proposed route may be cancelled as a whole by actuation of the cancel button CNB, which opens the stick circuits for relays AS and BS in the case assumed to restore these relays to their normal deenergized condition. This restores the indicators in the check display units to the blank positions in the following manner.

Referring to Fig. 10, the deenergization of relay AS opens at its front contact 112 the pick-up circuit for the check display operating relay A—DOP, but this relay is held up by a stick circuit through its front contact 128 and a stick bus 129 energized by the empty-full contacts 130, 131 in multiple of the flight number altitude and direction indicators. In other words, the relay A—DOP is held up by its stick circuit until all of these indicators are restored to the initial blank position. When relay AS is deenergized, it opens at its front contact 126 the circuit maintaining energized the correspondence relay ALCR for the altitude indicator, so that this relay drops to close its back contact 122 and connect the associated operating magnet OM through front contacts 113 of relay A—DOP to the pulsing bus PB. The energizing circuits (not shown) for the correspondence relays of the flight number and direction indicators are opened by the release of the relay AS in the same way, so that stepping operation of these indicators, as well as the altitude indicator, is initiated to restore them to their blank position.

With the relay AS deenergized and its back contact 132 closed, and with the relay A—DOP energized and its front contact 133 closed, a blanking bus 134 to which the position contact for the initial or blank position of each of these flight number, altitude and direction indicators is connected, is connected through these front and back contacts 132 and 133 to (—), so that as each of these indicators assumes its initial or blank position, its associated correspondence relay, such as ALCB, is energized to stop the indicator in this blank position. When all of these indicators have been restored to the initial or blank position and all their empty-full contacts, such as 130, 131 shown, assume the normally open position shown, the stick circuit for relay A—DOP is interrupted, and this relay is restored to its normal condition.

The indicators in the check display unit for fix panel B are automatically restored in the same way to the blank position upon release of the relay BS by actuation of the cancel button CNB.

Any desired part of the route, which has been set up by the actuation of the fix push buttons and is exhibited in the check display units of the fix panels, may be wiped out or cancelled by pulling out the appropriate fix identifying push button or buttons so as to release the associated fix relay or relays, while those for the other fixes remain energized. For example, if the operator has actuated the push button APB to include the fix A by mistake at the beginning or end of the proposed route, he can pull out this button to open the restoring contacts 46 and release relay AS, whereupon the indicators for the corresponding check display unit are restored to the blank positions in the same way above explained, and the fix A is also excluded from the time schedule calculating operation presently described.

*Setting the base departure time into the accumulator.*—After the proposed route has been thus designated, and the setting of cruising speed, base departure time, etc. has also been made, the operator actuates the calculating push button CAL to initiate the automatic operation of calculating and registering the arrival times for the proposed flight at the designated fix. The first step in this operation involves the setting of the base departure time set up on the base time setting dials 1BTD, 2BTD, etc., preparatory to the registration of this time in the check display unit of the fix panel for the first fix in a designated route with respect to the direction of flight defined by the position of the direction key DRK.

Considering this operation in detail and referring to Fig. 10, the actuation of the button CAL closes a pick-up circuit for the base time setting relay BTS which may be traced from (+) through back contact 135 of relay CLR, button CAL, wire 136 to Fig. 8, and through back contact 137 of a completion relay CM to (—). The energizing circuit for the relay CM may be traced from (+) through front contact 138 of correspondence relay 1BCR (see Fig. 9), front contact 139 of relay 2BCR, wire 140, and front contact 141, 142 and 143 in series of relays 3BCR, 4BCR and 5BCR in Fig. 8, and winding of relay CM to (—).

The relay BTS is maintained energized after the button CAL is released by a stick circuit which may be traced from (+), through the normally closed contacts 107 of the cancel button CNB, wire 144, front contact 145 of relay BTS, winding of this relay, and wire 136 through the back contact 137 of relay CM the same as for the pick-up circuit.

The energization of the relay BTS and closure of its front contact 146 supplies current from (+), to an energizing bus 147 for the fix repeater relays ASP, BSP; and assuming the relays AS and BS to be energized, circuits readily traced through the upper windings of the repeater relays ASP and BSP are closed through the front contacts 148, 149 of these relays AS and BS, thereby energizing the repeater relays ASP and BSP to close front contacts 150, 151 and connect (—) to a pick-up bus 152 for the relay CLR which is then connected to (+) by a circuit connection readily traced on the drawing through the front contact 153 of the relay BTS.

Each of the repeater relays ASP, BSP thus energized for the designated fixes is held up by a stick circuit connected to the cancel button CNB through a back contact of an associated repeater relay ARG and BRG. This stick circuit for repeater relay ASP may be traced from (+), through normally closed contacts 107 of cancel button CNB, wires 144 and 155 to a bus 156, back contact 157 of relay ARG, front contact 158 of relay ASP, and lower winding of this relay to (−).

The calculating relay CLR is held up by a stick circuit from (+), through normally closed contacts 107 of cancel button CNB, wires 144, 155, bus 156, front contact 160 of relay CLR, winding of this relay and its energizing bus 152, through front contacts 150, 151 in multiple for the repeater relays such as ASP and BSP, and also front contacts 162, 163 of register relays such as ARG and BRG for all of the fixes involved in the proposed route, so that this calculating relay CLR is held up until the calculating and accumulating operation has been completed for the entire designated route.

Considering now the setting of the base departure time into the accumulator units, and referring to Figs. 8 and 9, the energization of the base time setting relay BTS shifts contact fingers 164 to 168 associated with each of the respective accumulator units 1AC, 2AC, etc., these contacts being shown for convenience in different positions on the drawings in conjunction with a representation of the relay BTS in dotted outline. These contact fingers 164 to 168 are included in the energizing circuits for the operating magnets 1A—OM, 2A—OM, etc., so as to initiate stepping operation of the accumulator units and cause them to assume positions corresponding with the selective energization of the groups of setting buses 1OHB, UHB, 1OMB and UMB controlled by the contacts of the base time setting dials 1DTD, 2DTD, etc. shown in Figs. 2 and 7, and relating to the corresponding tens of hours, unit hours, tens of minutes and unit minutes denominations of time.

Considering this operation more in detail, the pulsing bus PB which is intermittently energized by the operation of a movable contact finger 116 into engagement with a stationary contact 117 by a suitable motor or other power mechanism as shown diagrammatically, is connected to the operating magnets, such as 1A—OM, 2A—OM, etc. through the front contacts 164 to 168 of the relay BTS, and a back contact of the associated correspondence relay 1BCR, 2BCR, etc. This circuit for the operating magnet 2A—OM associated with the unit minutes accumulator unit 2AC, which is typical of those for the other units, may be traced (see Fig. 9) from (+) through pulsing contacts 116—117, operating bus 170, back contact 171 of the correspondence relay 2BCR, front contact 165 of relay BTS (now energized), and winding of operating magnet 2A—OM to (−).

The movable contact elements for the various accumulator units 1AC, 2AC, etc., are thus all stepped around by the intermittent energization of their operating magnets 1A—OM, 2A—OM, etc. from whatever position they may happen to have, until such stepping operation is stopped by the energization of the associated correspondence relay 1BCR, 2BCR, etc. Considering the circuit for the correspondence relay 5BCR as typical of the others (except for relay 1BCR later explained) the contact arm 89, to which this correspondence relay 5BCR is connected, engages position contacts connected to the group of buses 1OHB selectively energized by the contact element 174 connected to the corresponding tens of hours base time setting dial 1BTD, as shown in Fig. 7. Assuming this base time setting dial 1BTD to be in position 1, corresponding with the time of 10:00 assumed, then as soon as the arm 89 for this accumulator unit 5AC has been stepped around from its existing position, whatever that may be, to the position 1, the correspondence relay 5BCR is energized by a circuit which may be traced from (+), winding of relay 5BCR, contact arm 89, bus 1 of group 1OHS and contact element 174 of the base time dial 1DTD of Fig. 7 in its set position 1, front contact 178 of relay BTS, to (−), this energization of relay 5BCR opening its back contact 171 to disconnect the operating magnet 5A—OM from the pulsed bus 170 and stop this accumulator unit in this position.

For reasons previously noted, provision is preferably made to accumulate and register tenths of minutes although such decimal fractions of a minute are not displayed in the check display units, nor set up on the base departure time dials. Accordingly, there are no buses for controlling the energization of the correspondence relay 1BCR for the tenth of minute accumulator unit 1AC; and in order to set this unit from its existing position to the zero position, a front contact 179 of the relay BST connects (−) to the zero position contact for this unit, so as to cause energization of the correspondence relay 1BCR when this unit is restored to its zero position.

When all of the accumulator units 1AC, 2AC, etc. have thus been positioned and stopped to conform with the energization of the setting buses 1OHB, UHB, etc. for the existing positions of the base time setting dial 1BTD, 2BTD, etc., all of the correspondence relays 1BCR, 2BCR, etc. are energized and close their front contacts 138 and 139, 141, 142 and 143 in series in the energizing circuit for the completion relay CM, so that this relay is energized and opens at its back contact 137 the stick circuit for the relay BTS in Fig. 10, thereby restoring this relay BTS to its normally deenergized position.

This release of relay BTS (see Fig. 10) supplies current from (+), through a back contact 153 of relay BTS and a front contact 180 of relay CLR (now energized) to the contact 181 operated by the direction key DRK, and thence over a chain stitch or hunting circuit relating to the direction designated to provide for the energization of fix interval relays and register relays in the proper sequence, to cause calculation and accumulation of the arrival times for the various fixes and the registration of such arrival times in the check display units of the associated fix panels.

*Registration of the base departure time.*—The first step in this operation, which occurs prior to any calculation and accumulation of flying times, involves the registration of the designated base departure time into the check display unit of the first fix in the proposed route for the selected direction.

Considering this operation more in detail for the typical example assumed, the direction key DRK in Fig. 10 is set to the right to conform with a direction of flight from fix A to fix B, and the fix repeater relay ASP is energized. Under these conditions, current is supplied from (+), through back contact 153 of relay BTS, front contact 180 of relay CLR, direction contact 181 to the right, front contact 182 of relay ASP, winding of register relay ARG to (−). Relay ARG when thus energized, opens its back contact 157 in the stick circuit for relay ASP to release this relay; but the register relay ARG is maintained energized by a stick circuit including its own front contact 184 and a bus 185 energized through the back contacts such as 186, 187 in multiple of the correspondence relays for various denominations of time, such as the relays TCR—1, TCR—2 shown. The time indicators in the check display units for the various denominations of time are constructed and controlled alike, and on account of space limitations only two of these indicators relating to tens of hours and unit hours are illustrated for the check display units for fixes A and B in Figs. 10 and 11.

The energization of relay ARG and closing of its front contact 190 connects the bus 114, now connected through front contact 113 of relay A—DOP to the pulsing bus PB, to the bus 191 for operating the time indicators of this check display unit, this operating bus 191 being connected to the operating magnets for these time indicators through back contacts, such as 192, of the associated correspondence relay TCR—1. In this way, the operation of the time indicators is initiated for the check display unit of the first fix in the designated route.

In the case of the tens of hours time indicator, for example, (+) is connected through a front contact 194 of relay CLR in Fig. 10 to a bus 195, through the contact arm 94 of the accumulator unit 5AC to bus 1 of the group of setting buses 10HS, corresponding with the time of 10:00 assumed; and after the operating magnet OM has advanced the corresponding time indicator in the check display unit for fix A under consideration from the blank position shown to the position 1, correspondence relay TCR—1 is energized to open its back contact 192 and stop further intermittent energization of this operating magnet. In the case of the base departure time of 10:00 assumed, the time indicators for the other denominations of time stop when moved from the blank position to the zero position.

When the correspondence relays such as TCR—1, TCR—2 for all of the time indicators are energized to open their back contacts 186, 187, the stick circuit above traced for the register relay ARG is broken, and its pick-up circuit having been broken by the previous release of the fix repeater relay ASP, this register relay ARG drops and extends the supply of current from (+) over the hunting circuit through back contact 132 of relay ASP, back contact 196 of relay ARG, wire 197, front contact 198 of fix interval relay A—B (now energized for reasons presently explained) to a start bus 200 connected to the relay STC in Fig. 7, and to (—), thereby initiating operation of the distributor DT to carry out the successive steps in the operation of calculating and accumulating the flying time between fixes A and B later explained.

In this way, following the positioning of the accumulator units in accordance with the designated base departure time, the time indicators of the check display unit in the first fix for the route and direction designated are automatically positioned by the energization of the associated register relay such as ARG to conform with this base departure time.

*Method of calculation of the flying time for a fix interval.*—The next step in the typical operation under consideration of scheduling a flight involves the automatic calculation of the flying time for the fix interval of 125 miles between the fixes A and B, and then adding this flying time to the base departure time standing in the accumulator, together with such additional climb time as may be set on the climb time dial AB—CT in Fig. 2 for the fix interval A to B.

In accordance with this invention, this calculation is carried out by multiplying the distance in miles for the fix interval A to B in question by a time quantity representing the decimal fraction of minutes per miles for the particular ground speed for this fix interval. In this connection, it is assumed that the distance quantity cannot exceed three digit numbers, and that two decimal places for the time quantity corresponding to the ground speed will be sufficient for the desired accuracy; but it will be apparent that the principles and organization of means characterizing this invention may be applied to computations involving numbers having any desired number of digit places.

Generally speaking, each digit of the distance quantity, such as 125 in the example assumed, is multiplied by each digit of the time quantity such as .34 corresponding with the ground speed in the example assumed; and the various partial products of such multiplying operations are added together into the accumulator, with due regard to the place value of the different digits of these partial products, thereby increasing the time standing in the accumulator by successive increments of time to give the arrival time for the next fix.

This digit by digit multiplication and accumulation of the resultant partial products in the embodiment of the invention illustrated, is carried out in four steps, conveniently designated $a$, $b$, $c$, and $d$, as diagrammatically indicated in Figs. 14 and 15 for the typical example of multiplying 125×.34.

It should be understood, however, that the particular sequence of multiplication and accumulation indicated in Fig. 15 is merely illustrative of the nature of the invention, and that various other sequences may be employed.

Referring to Figs. 8 and 9, the digits of the partial products to be added into the accumulator are represented by the selective energization of sets of buses relating to tenths of minutes, unit minutes, tens of minutes and unit hours denominations of time, and conveniently designated 0.1M, UM, 10M and UH respectively. The energization of these sets of buses is governed by the multiplier and carrier contactors 2M, 3M, etc., and 1CY, 2CY, etc. of Figs. 4 and 5, in accordance with the position which the arms of these contactors are set to conform with the different digits and their place value for the distance quantity and the particular time relay T1, T2, etc. then energized by the time buses TB of Fig. 3 to conform with the time quantity for the ground speed.

The place value of the different digits of the partial products is maintained for governing the energization of the appropriate sets of time control buses 0.1M, UM, 10M and UH by selecting the multiplier and carrier contactors to be effective in controlling these buses, and also by shifting the digits of the distance quantity with respect to the setting of the multiplier and carrier contactors. The various conditions under which the buses UH, 10M, UM and 0.1M are energized for controlling the operation of the accumulator units are schematically indicated in the sequence chart or diagram of Fig. 15 for the several steps $a$, $b$, etc.

*Designation of time and distance quantities for the fix interval.*—Considering this calculating operation more in detail for the typical example assumed, when the register relay ARG is energized as previously explained to register the base departure time in the check display unit of fix panel A, current is supplied over the hunting circuit above pointed out through contact 181 of direction key DRK, a front contact 202 of relay ARG, wire 203, and a front contact 204 of the fix relay BS now energized, to the winding of the fix interval relay A—B for a flight from A to B, and thence to (—).

The closing of the front contact 205 of this fix interval relay A—B completes a stick circuit for this relay from a stick bus 206 extending to the distributor DT in Fig. 7, where it is connected to (+) through a contact 207 associated with this distributor and opened momentarily as this distributor moves from its last half-step position back to the initial position. In other words, the relay A—B is maintained energized until the distributor DT has made one complete revolution in connection with the operation of computing the flying time for the fix interval between the fixes A and B.

Referring to ground speed apparatus of Fig. 3, the energization of the fix interval relay A—B renders the speed correction factor dial AB—SCR for this particular fix interval and direction effective to govern the position of the ground speed shaft GS in the manner previously explained. Assuming this particular speed correction dial to be set in the (—1) position as illustrated, the ground speed shaft GS is shifted relative to the cruising speed shaft CS to correspond with a speed of one mile per hour less than the cruising speed.

In the case of the cruising speed of 175 miles per hour assumed in the typical example under consideration, the difference in time per unit of distance for this speed correction of one mile per hour is so small that there is no change in the second decimal place of the time quantity; but for slower cruising speeds and for larger correction factors, a similar shifting of the ground speed shaft GS relative to the cruising speed shaft would change the position of the contact arms 77 and 78 cooperating with the divided contact rings so as to energize different time buses TB.

In this connection, it can be seen that the cruising speed shaft CS is positioned by the engagement of the stop member 48 with a notch in the lock collar 49 to a particular one of the various separated positions nearest the manually selected position of the speed dial. Similarly, the ground speed shaft GS is shifted relative to such distinctive speed positions of the cruising speed shaft CS by predetermined angular increments determined by the spacing of the contact points cooperating with the contact arm 6.5 carried by the gear 63. In this way, the contact arms 76, 77 and 78 cooperating with the divided contact rings take positions for the various speeds sufficiently distinct and separated to assure that only one insulated contact strip and time bus will be energized. Also, while the speed dials are indicated as graduated for settings to the nearest mile per hour, any desired number of miles per hour may be made the basis for differentiating between the various ground speeds desired.

When this operation of setting the ground speed shaft GS is completed, and the relay MCR in Fig. 3 is energized to close its front contact 210, then current is supplied from (+) through this contact 210 over wire 211 to a front 212 of the calculating starting relay STC in Fig. 7, and thence to a contact point for the initial position of the distributor DT, so that if or when the relay STC is energized, as presently explained, the distributor is set into operation.

The circuit for energizing the stepping magnet STM for this initial movement may be traced through the contact arm 214 of the distributor DT, front contact 215 of relay CLR (now energized), winding of stepping magnet STM, and its own back contact 216 to (—). This energization of the stepping magnet STM raises a pawl 218 to a new engaging position with relation to a ratchet wheel 219, so that the subsequent deenergization of the stepping magnet STM, due to the opening of its circuit by its own contact 216, shifts the various contact arms 214, 220, and 221 for the distributor from the initial or zero position shown to the right or clockwise, in the direction indicated by the arrow, to the first half step position intermediate the initial position and the first active position designated a. The distributor DT is advanced from this half step position by the energization of another control circuit after the desired operations have occurred, in the manner to be now explained.

When the arm 221 of the distributor DT has thus been advanced to its first half step position, it engages a contact segment (see Fig. 7) to apply current to a wire 250 which extends to Fig. 3 and there applies current to a distance setting relay ISD to cause the distance quantity for the fix interval between fixes A and B under consideration to control the multiplier 2M, 3M, etc. and carrier contactors ICY, 2CY, etc. at the proper denomination value for the first partial product.

Figure 6:
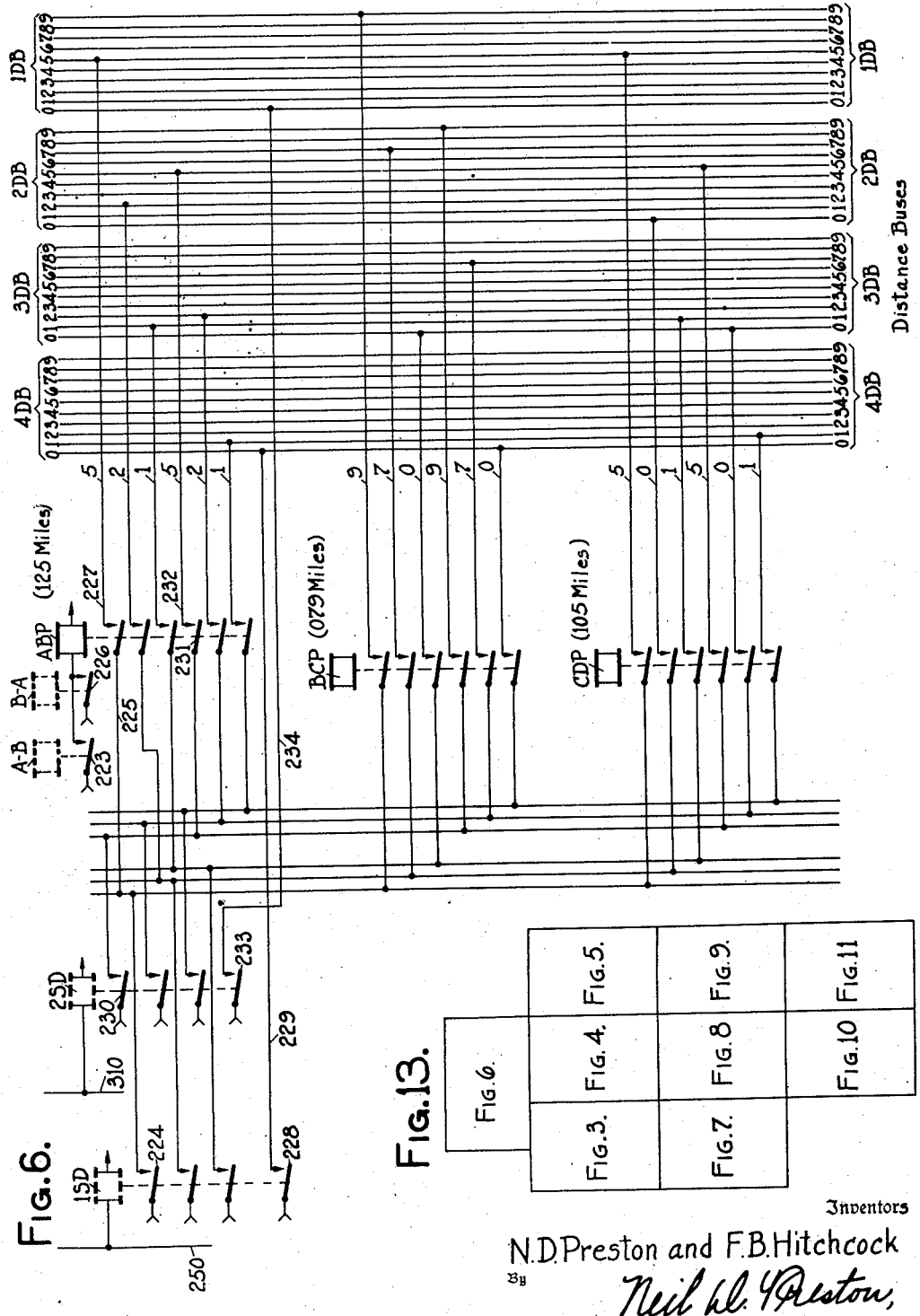
Fig. 6 shows how sets of distance buses, governing the multiplier and carrier contactors of Figs. 4 and 5, are controlled in accordance with the distances between the various fixes in the particular route designated for a proposed flight.

The energization of the fix interval relay A—B also governs the energization of the groups of distance buses IDB, 2DB, 3DB and 4DB to conform with the distance between the fixes A and B in the manner indicated in Fig. 6. The energization of relay A—B and closure of its front contact 223 in Fig. 6 picks up a repeater relay ABP by an obvious circuit, and with the distance setting relay ISD energized (see Fig. 6), the bus 5 of group IDB, for example, is energized through a front contact 224 of relay ISD, bus 225, front contact 226 of repeater relay ABP, and wire 227 to bus 5 of group IDB, to correspond with the number 5 in the last of units place of the distance quantity 125 belonging to the fix interval in question. In a similar way, buses I and 2 of the groups 3DB and 2DB respectively are energized to conform with the other digits 1 and 2 in this distance quantity. The zero bus of the group 4DB is energized through a front contact 228 of the relay ISD and wire 229.

At other times, when the other distance setting relay 2SD is energized, as later described, circuits analogous to those described, are completed to provide for the energization of buses I, 2 and 5 respectively of the groups 4DB, 3DB and 2DB. For example, bus 5 of group 2DB is energized through front contact 230 of relay 2SD, front contact 231 of relay ABP, and wire 232. The zero bus of group IDB is energized through the front contact 233 of the relay 2SD and wire 234. In other words, upon energization of the second distance setting relay 2SD, the different digits of the distance quantity 125 are applied to multiplier and carrier contactors relating to the next higher digit, as diagrammatically indicated in Fig. 15.

In connection with this distance setting feature, it may be explained that the particular distance quantities belonging to the different fix intervals are designated or represented by the particular electrical connections to the groups of distance buses 1DB, 2DB, etc. which are built into the machine in conformity with the distances between the particular fixes involved, and which are closed when a repeater relay APB, BCP or CDP for such fix interval is energized by the energization of an associated fix interval relay A—B, B—A, B—C, C—B, etc. for the selected direction for that fix interval. There are two sets of such connections for the same distance quantity for each fix interval; and one set of these connections is rendered effective when the first distance setting relay 1SD is energized so as to apply this distance quantity to the multiplier and carrier contacts in the appropriate digital relation for the first partial product, while the other set of such connections is subsequently rendered effective when the other distance setting relay 2SD is energized, so as to apply the same distance quantity to different multiplier and carrier contactors in a way to provide the proper digital relation for the second partial product of the next higher order.

The energization of the fix interval relay A—B opens at its back contact 204 the energizing circuit for the relay FP in Fig. 3; and referring to Fig. 4, it can be seen that this relay FP in closing its back contact 235 connects the pulsed bus PB to an operating bus 236 for positioning all of the multiplier and carrier contactors 4CY, 4M, 3CY, etc. to conform with the existing distance bus energization.

Considering the setting of the multiplier contactor 2M and carrier contact 2CY in Fig. 5 as typical, current is supplied from the intermittently energized operating bus 236 to the operating magnets 2DOM and 2DOM' for these contactors through back contacts 238, 239 of the associated correspondence relays 2DCR, 2DCR'; and hence each of these contactors 2M and 2CY is advanced step by step until these correspondence relays are energized to stop the operation. In the case assumed, the bus 2 of the group 2DB is energized to correspond with the digit 2 of the distance quantity 125, and hence all of the contact arms for both the multiplier and carrier contactors 2M and 2CY are moved from the zero position shown to the position 2.

In a similar way, the carrier contactor 1CY is set into position 5, and the multiplier contactor 3M of Fig. 5 and the carrier contactor 3CY of Fig. 4 are set in the position 1, in conformity with the digits in the units and hundreds place of the distance quantity 125 under consideration.

The multiplier and carrier contactors 4M and 4CY in Fig. 4 are not moved from the normal 0 position, since the correspondence relays 4DCR and 4DCR' for these contactors are energized over the 0 bus of group 4DB as soon as the fix interval relay A—B picks up (see Fig. 6), and before the relay FP in Fig. 3 releases and closes its back contact 235 in Fig. 4 to apply pulses to the operating bus 236.

When the arms of the various multiplier and carrier contactors have thus been properly set to conform with the distance quantity, all of the correspondence relays 4DCR, etc. are energized, and a circuit shown in Fig. 7 is closed to supply current from (+), through a back contact 240 of a relay IPC, front contact 241 of a relay SL, through the front contacts 242 to 248 in series for all of the correspondence relays 4DCR, 4DCR', 3DCR, etc. to the contact point for the first half step position of the distributor DT (which it now occupies), through contact arm 214 to energize the stepping magnet STM and advance the distributor arms 214, 220 and 221 to the first active or step a position.

In short, if and when the distance quantity has been properly set up on the appropriate multiplier and carrier contactors, ready for the first step a of the multiplying operation, the distributor DT is advanced to a position a.

The arm 221 of the distributor DT in position a (see Fig. 7) connects (+) to a wire 250 leading to Fig. 3, where it is connected to the selector arm 81 on the ground speed shaft GS, so that current is supplied to the contact segment 83 and appropriate auxiliary arm 78 for the ground speed setting under consideration, so as to energize time bus 4 and pick up the time digit relay T4 in Fig. 4, in conformity with the number 4 in the second decimal place of the time quantity .34 for the ground speed in the example assumed.

The arm 220 of the distributor DT in position a closes the circuit readily traced to pick up the relay Ra in Fig. 7; and the energization of this relay Ra operates contacts to perform a number of different functions to be now considered.

*Step a of calculation.*—The closure of the front contact 251 of the relay Ra connects (+) to a bus +3M extending to Fig. 5 and supplying current to the set of contacts of the time digit relays T1, T2, etc. belonging to the multiplier contactor 3M, including the contact 252 of the relay T4 now energized in the example assumed. Since all of the contact arms of this multiplier contactor 3M are in the position 1 for the distance of 125 miles assumed, the bus 4 of the group 10M is energized under these conditions through a circuit path which may be traced from (+), through front contact 251 of relay Ra, bus +3M, front contact 252 of the time digit relay T4, contact arm 3M' of the multiplier contactor 3M in position 1, and a wire connection to the bus 4 of group UM.

In a similar way, closure of the front contact 254 of relay Ra energizes a bus +2M supplying current to the set of contacts of the time digit relays T1, T2, etc. relating to the multiplier contactor 2M, including a front contact 255 of the time digit relay T4 now energized in the example assumed. This multiplier contactor 2M being set in position 2 to conform with the tens digit of the distance of 125 miles assumed, the bus 8 of the group UM is energized by a circuit connection analogous to that above described and readily traced on the drawings, so as to conform with the units digit of the product of 4 times 2 equals 8.

For reasons previously discussed, and in view of the particular limitations of the quantities involved, there will be no unit digit of products to be applied to the groups of buses UH and 10M. For reasons presently discussed, however, it is necessary to have a circuit closed and energized for each of the groups of buses UH, 10M, etc. controlling the accumulator units 1AC, 2AC, etc. of Figs. 8 and 9, in order that the progressive steps in the calculating operation may occur; and the closure of front contacts 256 and 257 of relay Ra energize buses 0—UH and 0—10H connected with the zero buses of the groups UH and 10M, so as to exercise a control upon the associated accumulator units by bus energization corresponding with a zero quantity.

In this way, in response to the energization of the relay Ra for step a of the multiplying operation, a particular selected bus of each of the group of control buses UH, 10M, UM and 0.1M for the accumulator units 1AC, 2AC, etc. is energized in conformity with the lowest or units digit of the partial products of each of the digits 1, 2, and 5 of the distance quantity multiplied by the digit 4 in the second decimal place of the time quantity of .34 assumed, i. e. buses designated 0, 0, 4 and 8 respectively in these groups in the example assumed, as indicated schematically in Fig. 15.

*Operation of accumulator units.*—The next phase of the operation involves operation of the accumulator units. At the same time the selective energization of the control buses UH, 10M, UM and 0.1M is accomplished by the energization of the relay Ra, a back contact 259 of this relay Ra opens a normally closed energizing circuit for a slow-release relay SL in Fig. 7 readily traced on the drawings; and after a time sufficient for the desired operations to occur, this relay SL closes a back contact 260 to permit an impulse control relay IPC to be energized the next time the intermittently operated impulse contact 116 of Figs. 9 and 13 shifts to its right-hand or open position into engagement with the contact 120 to pick up relay OP, the energizing circuit for the relay IPC being traced from (+) in Fig. 9, front contact 261 of relay OP, wire 262 extending to Fig. 7, winding of relay IPC, and back contact 260 of relay SL to (—). This energization of relay IPC closes its own front contact 263 to complete a stick circuit for maintaining this relay energized until the relay SL is again restored to its normal energized condition.

Referring now to Fig. 9, the energization of relay IPC and closure of its front contact 275 supplies time spaced pulses from the pulsing contacts 116—117 to an operating bus 276, which supplies current pulses to the operating magnets for the accumulator and impulse counting units, such as 1A—OM and 1C—OM, 2A—OM and 2C—OM, etc., which are assumed to be of the same type as the indicator unit shown in Fig. 12A, as previously noted.

Generally speaking the purpose of each of the impulse counting units 1C, 2C, etc. is to cause the associated accumulator unit 1AC, 2AC, to advance as many steps as called for by the particular bus of the associated group of control buses 0.1M, UM, etc. then energized, and thereafter assume its initial 0 position, ready for the next operation. As a result of such advance of the accumulator units 1AC, 2AC, etc. from their existing positions, it may become necessary to carry a digit; and a digit carrying relay 1DG, 2DG, etc. is associated with and controlled by each of the accumulator units, except the one for the highest or tens of hours digit.

Referring to Fig. 9 and taking the operation of the accumulator unit 2AC for the unit minutes as typical, the operating magnet 2C—OM of the impulse counting unit 2C is intermittently energized in series with the operating magnet 2A—OM for the corresponding accumulator unit 2AC from the operating bus 274, through a front contact 267 of the digit carrying relay 1DG, wire 268, operating magnet 2C—OM, wire 269, back contact 270 of the correspondence relay 2—SCR, wires 271 and 272, back contact 165 of relay BTS, wire 273, winding of operating magnet 2A—OM to (—).

Accordingly, the contact arms 86 and 91 for the accumulator unit 2AC in question are stepped around or advanced from their existing position in synchronism with the step-by-step movement of the arm 276 of the impulse counting or control unit 2C in response to the intermittent energization of the operating bus 274; and this operation continues until the contact arm 276 of the control unit 2C connects with the particular bus of the group UM then energized, i. e. bus 4 in the case assumed, whereupon the correspondence relay 2SCR is quickly energized to cut off at its back contact 270 the supply of further pulses to the operating magnet 2A—OM. Thus, the contact arms 86 and 91 of the accumulator unit 2AC are advanced 4 spaces beyond the position existing at the time the operation was started.

The energization of the correspondence relay 2SCR connects the operating magnet 2C—OM for the control unit directly to (—) through contacts 280 illustrated diagrammatically and closed except when the arm 276 is in the initial or zero position. Consequently, the intermittent operation of the stepping magnet 2C—OM continues until the arm 276 of this impulse counting unit has been restored to the initial zero position, and the contacts 280 open to break the circuit through the operating magnet 2C—OM. The correspondence relay 2SCR is maintained energized in the meantime by a stick circuit through its own front contact 281 and a stick bus 282, which is connected to (+) through a front contact 283 of the impulse control relay IPC.

The other accumulator units and associated impulse counting units are operated in a similar manner to add into the accumulator as many units in the different denominations of time as called for by the energization of the control buses; and the circuits involved in such operations are similar to those already explained.

The governing circuits for the accumulator units 3AC, 4AC and their associated control units 3C and 4C, which are shown in Fig. 8 and relate to the tens of minutes and unit hours time denominations respectively, are the same as those described for the unit minutes accumulator unit 2AC and its control unit 2C. In the particular example assumed, however, the 0 bus of the associated buses UH and 10M are energized as previously pointed out, and hence the associated correspondence relays 4SCR and 3SCR are picked up before the first pulse is applied to the operating bus 274 by the energization of the relay IPC, so that there is no operation of these accumulator units 3AC and 4AC or their associated control units 3C and 4C.

The governing circuits for the tenths of minutes accumulator unit 1AC and its associated control unit 1C differ slightly from those described for the units 2C and 2AC, in that there is no contact of a digit carrying relay like the contact 267 of relay 1DG involved in these circuits, but the mode of operation is the same and need not be further explained.

Since the calculated flying times will not call for a change in the tens of hours accumulator unit 5AC of Fig. 8, because of flying time for any reasonable fix interval distance will not amount to ten hours, this accumulator unit 5AC does not have any control or impulsing counting unit associated with it; and its operating magnet 5A—OM is only energized in connection with a digit carrying operation later explained.

When this accumulating operation for step a is completed, the distributor DT is advanced to the next half-step position by the energization of a completion circuit including wire 285 which is connected to all the contact positions a, b, etc.

for the arm 214 controlling the stepping magnet STM (see Fig. 7). This completion circuit includes in series, as illustrated in Figs. 8 and 9, the various contacts 287, 291, 295 and 298, shown diagrammatically for each impulse counting unit and closed only if this unit is in the initial or zero position; a plurality of front contacts 289, 292, 296 and 299 of the correspondence relays 4SCR, 3SCR, 2SCR and ISCR; and a plurality of front contacts 286, 290, 294 and 297 for the digit carrying relays 4DG, 3DG, 2DG and IDG; and a front contact 288 of a relay 24CH. It can be readily seen that this completion circuit checks that all the desired accumulating operations have been completed, more particularly that the correspondence relays have all been energized by circuits including control buses, that the impulse counting units are all restored to their initial position, and that any digit carrying relay IDG, 2DG, etc. which may have been deenergized has been restored to its normal condition. All these operations must be completed before this completion circuit is established and the distributor is advanced.

This operation of the distributor DT drops the relay Ra to close its back contact 259 in the energizing circuit for the relay SL, which picks up and breaks at its back contact 260 the stick circuit for the relay IPC. The release of the relay IPC opens at its front contact 283 (see Fig. 9) the stick circuits for the correspondence relays ISCR, 2SCR, etc., at the same time the front contact 275 of this relay IPC cuts off the supply of pulses from the pulsing contacts 116—117 to the operating bus 274. Also, when the relay IPC drops, a circuit is completed from (+), through its back contact 240, front contact 241 of relay SL, and wires 300 and 301 to the contact point for the second half-step position of the distributor DT, thereby energizing the stepping magnet STM to advance the distributor arms to the next active or b position, in which arm 220 energizes the control relay Rb, while arm 221 keeps wire 259 energized.

*Step b of calculation.*—The energization of the control relay Rb connects (+) through its front contacts 302, 303, 304 to buses +ICY, +2CY and +3CY relating to the sets of contacts on the time digit relays supplying current to the carrier contactors ICY, 2CY, and 3CY. The front contact 305 of relay Rb energizes the wire 0—UH connected to the zero bus of the group UH as shown in Fig. 8. The groups of control buses IOM, UM, and 0.IM for the accumulator units are now energized in accordance with the numbers to be carried as a result of a multiplication of the various digits of the distance quantity 125 by the digit 4 of the time quantity.

In the example assumed, bus 2 of the group 0.IM is energized by the carrier contactor ICY since 4×5 gives 2 to carry, the circuit connections for supplying (+) to this bus 2 being readily traced in Fig. 5 from the bus +ICY, through front contact 307 of the time digit relay T4, corresponding contact arm ICY⁴ in position 5, and circuit connection 308 to the bus 2 of the group 0.IM. Similar circuit connections, which are readily traced on the drawing and need not be specifically pointed out, provide for the energization of the zero buses in the groups UM and IOM in the case assumed, since there is nothing to be carried for the partial product of 4×2 and 4×1, as indicated in Figs. 14 and 15.

The energization of the control relay Rb for step b releases relay SL (Fig. 7) and causes energization of the impulse control relay IPC to initiate operation of the accumulator and impulse counting units in the same way described for step a; and when this operation is completed, the completion circuit above described is closed to advance the distributor DT to the next half-step position.

In the particular example assumed, as indicated in Fig. 15, during step b there is only the number 2, in the tenths of minutes place to be added into the accumulator; but it is obvious that other time and distance quantities might well result in adding one or more units into the accumulator for unit minutes and tens of minutes, as well as tenths of minutes.

*Step c of calculation.*—Referring to Figs. 14 and 15, it can be seen that the two steps a and b cover the determination and accumulation of the product of the distance quantity 125 as a multiplicand and one digit 4 of the time quantity as a multiplier; and it can be appreciated that, in addition to changing to the other digit 3 of the multiplier, it is necessary to adjust for the different place value or significance of the partial products resulting from using this other digit 3 as a multiplier. In the specific embodiment of the invention illustrated, this adjustment for place value is made by transferring the different digits of the distance quantity, i. e. 125 in the example assumed, represented by selected positions of contact arms, to different multiplier and carrier contactors controlling the buses representing the next higher place value, as schematically illustrated in Fig. 15.

Considering this operation more in detail, and referring to Fig. 7, it will be noted that the arm 221 of the distributor DT in moving from position b to the next half-step position disconnects (+) from the wire 250 connecting to the selector arm 81 in Fig. 3, which energizes the time buses in accordance with the number 4 in the second decimal place of the time quantity, and connects (+) to the wire 310 leading to the distance setting relay 2SD in Fig. 3, in multiple with the arm 76 on ground speed shaft GS. Consequently, the energization of the time buses is changed to conform with the first decimal place, i. e. 3 in the example assumed; and at the same time the other distance setting relay 2SD in Fig. 6 is energized to change the connections to the distance buses.

Referring to Fig. 6 the energization of the distance setting relay 2SD establishes connections through its front contacts such as 230 through other front contacts such as 231 of the relay ABP over a wire such as 232 to buses 1, 2, and 5 for the sets of buses 4DB, 3DB and 2DB respectively, while supplying (+) through front contact 233 and wire 234 to the zero bus of the set IDB.

This operation may be said to involve shifting the distance quantity one digit place to the left with respect to the groups of buses UH, IOM, UM, and 0.IM, so as to provide the desired adjustment for the different place values of the numbers represented by the energization of these groups of buses from the multiplier and carrier contactors.

The way in which the contact arms of the multiplier and carried contactors are automatically positioned in conformity with the particular bus of the associated group then energized has been pointed out above; and for the same reasons previously explained, when this operation is completed and the various correspondence relays IOCR, IDCR[1] etc. are picked up, the distributor DT is advanced from the half-step position under consideration to the next full-step position for step c. The energization of the control relay Rc and the closing of its front contacts 312, 313, 314 energizes the buses +2M, +3M and +4M in the same manner previously explained to cause the accumulator units to be operated to add to the time therein 036.5 minutes resulting from the calculation characterizing step c as indicated in Fig. 15, the front contact 315 of relay Rc energizing wire 0—UH for 0 bus of the group of buses UH.

*Step d of calculation.*—When this operation for step c is completed, the distributor DT is advanced to the next half-step position, and then to the step d position as soon as relays SL and IPC are restored to normal. In this step d position, the control relay Rd is energized to close contacts 318, 319 and 320 to energize the buses +2CY, +3CY and +4CY to render the carrier contactors 2CY, 3CY and 4CY effective to govern the energization of the buses UM, I0M and UH in accordance with the electrical connections which are established with the arms of these contacts in positions 5, 2, and 1 respectively for the distance 125 assumed, and with the time relay T3 energized to conform with the digit 3 of the time quantity.

In the particular example assumed and as indicated in Fig. 14, the digits to be carried during this step d are 0, 0 and 1 respectively for the unit hours, tens of minutes and unit minutes denominations of time; and consequently, the accumulator unit 2AC for the unit minutes denomination is advanced one space in the manner previously explained to add this one minute into the accumulator. It can be seen, however, that other time and distance quantities might well call for the carrying of various other digits for these denominations of time by the action of the carrier contactors.

When all of the accumulator units have been set in accordance with the existing energization of the groups of buses UH, UM, etc., and with the closure of a front contact 321 of the relay Rd acting to provide energization of the 0 bus for the group 0.IM, all of the correspondence relays ISCR, 2SCR, etc. are then energized to close their contacts 299, 296, 292, 288; and consequently, the completion circuit including their front contacts is established to supply current to the wire 285 extending to Fig. 7, and through the arm 214 to front contact 215 of relay CLR and stepping magnet STM to operate the distributor DT from its step b position to the next half-step position.

After the resultant deenergization of the relay Rd and restoration of the relays SL and IPC to normal, current is supplied over wire 300, and arm 214 in this half-step position to advance the distributor to the step e position, during which the climb time, if any, is added into the accumulator in the manner now to be described.

*Adding additional climb time intervals.*—As already pointed out previously, it is expedient to add to the flying time, calculated on the basis of speed and distance only, such additional time interval as the operator may designate, so as to compensate for the extra time required for a plane to climb to higher altitudes, either during its take-off from the ground, or in connection with a climb to a higher cruising altitude between the fixes. The step e is provided on the distributor DT for adding into the accumulator such additional time as may be called for by the setting of the climb time dial, such as AB—CT, which relates to the fix interval for which the distributor is then operated.

Considering this operation in detail, and referring to Fig. 7, the control relay Re is energized when the arm 220 of the distributor DT is in position e. The closure of the front contact 324 of this relay Re energizes a climb time bus 325 extending to Fig. 9 for rendering a particular climb time dial, such as the dial AB—CT effective, dependent upon the particular fix interval relay, such as A—B, then energized. With the fix interval relay A—B energized for the example assumed, a circuit connection is established from the bus 325 through a front contact 326 of this relay A—B to the movable contact element 327 of the climb time dial AB—CT. Assuming this dial to be set in position 3 as shown in Fig. 9, then the bus 3 of the unit minutes group UM is energized by the circuit connection 328 as readily traced on the drawings, so that the associated accumulator unit 2AC is automatically advanced 3 spaces to add to the time then standing in the accumulator, the 3 minutes assigned by the operator for additional flying times.

In connection with this operation, the energization of the relay Re in Fig. 7 closes front contacts 333, 334, 335, to energize wires designated 0—UH, 0—I0M and 0—0.IM, which are connected to the 0 buses of the groups of buses UH, I0M and 0.IM respectively. Consequently, the accumulator units for unit hours, tens of minutes and tenths of minutes denominations of time are not changed, except perhaps as required for digit carrying operation later discussed. This particular arrangement is illustrated on the assumption that the additional climb time will not exceed 9 minutes, and may be added into the accumulator by the control of the unit minute buses UM alone. In can be readily seen, however, that the buses I0M for the tens of minutes denomination may be selectively energized in a similar manner in accordance with the setting of a climb time dial, so as to provide for the accumulation of climb times longer than 9 minutes.

When this operation of the accumulator to add into it the designated climb time during step e has occurred, the completion circuit is closed in the same way and for the same reasons previously explained, to advance the distributor DT to its last half step position between position e and its normal or initial position. The next succeeding operation of restoring the distributor DT to its initial position is conveniently considered later, in connection with the explanation of the operation of registering the calculated arrival time in the check display unit for the next fix B.

It should be understood that the addition of a climb time during step e does not always occur, because the flight may maintain a substantially uniform cruising altitude over one or more fix intervals. In such a case, where there is no additional time required for climbing to a higher altitude to be added, the climb time dial, such as the dial BC—CT for the fix interval in question is in the 0 position. Consequently, when the distributor DT is operated to the position e in connection with the calculation of flying time for such fix interval, the 0 bus of the group UM is energized, as well as the 0 buses for the other groups UH, TM and 0.IM; and since the resultant energization of the correspondence relays ISCR, 2SCR, etc. occurs immediately following the energization of the control relay Re, the distributor DT is quickly advanced by the completion circuit to its last half step position, ready to be restored to its initial position in the manner later discussed.

*Digit carrying.*—At this point it is convenient to consider the digit carrying operation of the accumulator. It can be readily seen that, as various time intervals are added into the accumulator, it will be necessary from time to time to carry digits for one or more of the denominations of time. For example, when the accumulator wheel for unit minutes is advanced 4 steps from the 0 position, and then another 6 steps, during steps a and c of the calculation for the example illustrated in Fig. 15, it is necessary to operate the accumulator wheel for the next regular higher tens of minutes denomination one additional space to carry 1.

This digit carrying function is accomplished by normally energized digit carrying stick relays IDG, 2DG, 3DG and 4DG, respectively associated with each of the accumulator units except 5AC for the highest, or tens of hours, denomination of time. Also, associated with each of these accumulator units are normally closed contacts 95 to 98, illustrated conventionally, which are temporarily opened as the movable contact element of the corresponding accumulator unit is moved from its last active position to its 0 position. With the type of registering device contemplated and similar to the indicator unit shown in Fig. 12A, this movement from the next active position to the zero position occurs in two movements resulting from the energization of the operating magnet during a pulse and the subsequent deenergization of this magnet upon cessation of such pulse; and the digit carrying contact 97 is preferably arranged to be operated during the movement occurring after cessation of the operating pulse, so that regardless of the speed of response of the digit carrying relay 3DG, the energization of the operating magnet of the accumulator unit 5AC for the next higher denomination is for the full duration of the next succeeding operating pulse. This digit carrying contact 97 for the tens of minutes accumulator 3AC in Fig. 8 is opened during its movement from position 5 to position 0, since there are 60 minutes in an hour; but the contacts 95, 96, 98 for the other accumulator units IAC, 2AC, 4AC are opened during the movement from position 9 to position 0. The digit carrying relays IDG, 2DG, etc. operate in substantially the same way for the various denominations of time; and an explanation for one will suffice for all.

As a typical example of such digit carrying operation, assume that tenths of minutes are added to those standing in the tenths minutes accumulator IAC in Fig. 9, so as to operate its movable element 90 past position 9 to or beyond the position 0. During this movement, the contacts 95 are mechanically opened to break a stick circuit for the digit carrying relay IDG, which may be traced from (+), front contact 338 of relay IDG, winding of this relay, through contacts 95, to (—). This relay IDG, which is quick acting for reasons later explained, quickly releases its armature to divert the next operating pulse from the operating bus 274 through its back contact 267, wires 339 and 272, back contact 165 of relay BTS, and wire 273 to the operating magnet 2A—OM, so that the operating magnet 2A—OM for the accumulator unit 2AC is operated, while the operating magnet 2C—OM for the associated impulse counting unit 2C remains unchanged.

Thus, the movement of the counter or register for the accumulator unit IAC to its 0 position, calling for the carrying of a digit, causes the counter for the next higher or unit minutes denomination to be advanced one step by energization of its operating magnet 2A—OM independently of the energization of the operating magnet 2C—OM for the associated impulse counting unit 2C, and likewise independently of the associated correspondence relay 2SCR. If and when the operating magnet 2A—OM is thus operated by the digit carrying circuit to produce the desired effect of carrying 1, the closure of its front contact 340 provides a pick up or restoring circuit for the digit carrying relay IDG from front contact 341 of relay OP, which is energized during the next succeeding open period of the pulsing contacts, that is, when the contact element 116 is in the right-hand position to engage contact 120 connected to the relay OP. In this connection, it is assumed that relay OP is quick acting and that the pulsing contact element 116 will be shifted quickly from the engagement with contact 117 into engagement with contact 120, so that the relay IDG will pick up during the release time of the operating magnet 2A—OM. In other words, the release time of the operating magnet 2A—OM is just sufficient to allow for the operation of relays OP and IDG in succession before the front contact 340 becomes opened. Since this pick-up circuit for the relay IDG as well as its stick circuit has been closed in the meantime due to the reclosure of contacts 95, the relay IDG is restored and held in its normal condition, and permits subsequent pulses from the operating bus 274 to act upon both of the operating magnets 2A—OM and 2C—OM in series, until the accumulator unit 2AC has been advanced as many spaces (in addition to the space required for digit carrying) as may be necessary to conform with the existing energization of the control buses UM.

In other words, whenever an accumulator wheel is moved to or beyond its 0 position, its digit carrying stick relay is released to apply a single pulse to the accumulator unit for the next higher denomination; and after this digit carrying has occurred, the digit carrying relay is restored during the next deenergized interval of the pulsing bus, ready to utilize the next succeeding pulse for operating both the accumulator unit and impulse counting unit synchronously, and for as many other pulses thereafter as may be necessary.

A similar operation is involved in carrying the digits from unit minutes to tens of minutes, and from tens of minutes to unit hours; and the same plan of operation characterizes the carrying of a digit for unit hours to tens of hours, except that the digit carrying relay 4DG is preferably restored in a somewhat different way. An extra contact arm 342 (see Fig. 8) for the tens of hour accumulator 5AC, which co-operates with fixed contacts shown diagrammatically at points in the operation of this distributor unit just before it reaches each of its active indicating positions acts to close the restoring circuit for relay 4DG, instead of a contact of the operating magnet 4A—OM. This special provision for the restoration of the digit carrying relay 4DG which may be used for the other accumulator units, if desired, is provided because this counter or register for tens of hours has only three active positions, i. e. 0, 1, and 2, and more than one energization of its operating magnet 5A—OM would be preferably used to advance such counter one whole space between an indicating position and the next. By using the auxiliary arm 342 to restore the relay 4DG, any desired number of pulses and energizations of the operating magnet 5A—OM may be used for advancing the movable element of this accumulator element 5AC from one indicating position to the next.

A digit carrying operation, such as described for tenths of minutes accumulator unit 1AC, may occur for two or more denominations of time in succession. For example, if one minute is added to the time 09:59 standing in the accumulator, the digit carrying relays 2DG, 3DG and 4DG are all released in succession to carry 1 and change the contact arms for the accumulator units 3AC, 4AC and 5AC one space each to exhibit the proper resultant time of 10:00.

In this connection, it should be noted that the completion circuit above mentioned for advancing the distributor DT includes in series the front contacts 286, 290, 294 and 297 of the digit carrying relays 4DG, 3DG, 2DG and 1DG, respectively. These contacts 286, 290, etc. prevent improper mutilation or curtailment of a digit carrying operation by a premature actuation of the distributor DT, and the resultant deenergization of the impulse control relay IPC. For example, in the case just mentioned, where 1 minute is to be added to the time of 09:59, a number of successive digit carrying operations are required, in spite of the fact that the correspondence relays 4SCR and 3SCR may be energized at the time the digit carrying process starts.

Briefly outlining the time sequence of this operation of successive digit carrying for the typical example assumed, the accumulator unit 2AC has to be moved one space to add the one minute in question before the correspondence relay 2SCR is energized to close its contact 296 in the completion circuit; and during this movement of this accumulator unit 2AC one space, the contacts 96 are mechanically opened to release the digit carrying relay 2DG, which opens its front contact 294 to make a break in the completion circuit at the time or before this completion circuit is closed at the front contact 296 of relay 2SCR to thereby maintain continuity in the open condition of the completion circuit. The relay 2DG is not restored until the operating magnet 3A—OM of the accumulator unit 3AC for the next higher denomination is operated to close its front contact; and during such operation, the contacts 97 for this accumulating unit 3AC are opened to release the digit carrying relay 3DG and break the completion circuit at its front contact 290 before the existing break in this circuit is closed by the energization of the relay 2DG. Similarly, the digit carrying relay 4DG is released by the opening of the contacts 98 of the accumulator unit 4AC to keep open the completion circuit until the accumulator unit 5AC for tens of hours has been advanced one space from 0 to 1. Then, when the relay 4DG is restored to close its front contact 286, the completion circuit is finally intact, and the distributor DT is advanced to the next half-step position.

In other words, when successive digit carrying is required, as in the assumed example of adding one minute to the time 09:59 to give 10:00, the completion circuit is held open by the front contacts of the digit carrying relays 2DG, 3DG and 4DG, while the accumulator units 3AC, 4AC and 5AC are being successively advanced one space, so as to prevent premature operation of the distributor DT and curtailment of the digit carrying operation.

Also, the digit carrying arrangement of this invention which may be said to involve injecting an extra operating pulse into the accumulator unit for the next higher denomination, is effective as soon as an accumulator unit is operated to the 0 position, irrespective of what additional movement may be called for by the energization of its control buses, and without interfering with the regular function of the accumulator for the next higher denomination in adding the number called for by the energization of its control buses. In other words, the digit carrying operation may occur at any time in the operation of the several accumulator units, without interfering with the operation of other units and their associated impulse counting or control units. Consequently, the various accumulator units for the different denominations may be set into operation simultaneously, rather than successively one at a time as each completes the movement called for by the energization of its control buses, and as each accomplishes such digit carrying as may be needed. Such simultaneous operation of the accumulator units for the different denominations, as distinctive from a sequential operation of these units, affords a desirable saving in operating time.

As illustrative of these operating characteristics of the digit carrying means of the invention, assume a time of 00:54 is to be added to the time of 01:57 in the accumulator. In connection with the operation of the accumulator under such conditions, reference should be made to Fig. 17, which represents a sequence chart for the operation involved in adding the 54 minutes to the existing accumulator setting of 01:57. It should of course also be understood in this connection, that the operation is typical of the operation which may occur for any one of the steps in the calculation, such as steps a, b, c, d, or e indicated in the sequence chart of Fig. 16. Considering the operation with respect to the successive operating pulses from the operating bus 274, the first pulse advances the accumulator units 2AC and 3AC, together with their control units 2C and 3C one space, so that the time indicated is 01:08. The accumulator unit 4AC in Fig. 8 is not changed, because there is nothing to be added to unit hours and the relay 4SCR is energized. The operation of the accumulator unit 3AC from position 5 to position 0 operates its contacts 97 to release relay 3DG (see Fig. 8).

Consequently, the next or second operating pulse advances the accumulator unit 4AC one space by energization of its operating magnet 4A—OM by a circuit through the back contact of relay 3DG, even though the correspondence relay 4SCR is energized; and this second pulse also advances the accumulator units 3AC and 2AC another step, so that the accumulator now indicates 02:19. When this second pulse ceases and relay OP is energized, the restoring circuit for relay 3DG is closed.

During the next third pulse, the accumulator unit 3AC is moved from position 1 to position 2, while the accumulator unit 2AC is moved from position 9 to position 0, causing the accumulator to indicate 02:20. This movement of the accumulator 2AC to the 0 position operates the contacts 96 and releases relay 2DG (see Fig. 9), so that the fourth pulse is diverted to the accumulator unit 3AC of Fig. 8 alone, leaving its impulse counting or control unit 3C in its existing position 3.

This fourth pulse also advances the accumulator unit 2AC and its control unit 2C another space, so that at the end of the fourth pulse the accumulator indicates 02:31. At this time, since the impulse counting unit 2C has been moved four spaces by these four pulses, its position corresponds with the bus 4 of group UM energized to conform with the unit minutes of the time 00:54 assumed to be added; and consequently, relay 2SCR is energized to stop further operation of the accumulator unit 2AC.

During the deenergized period of the pulsing bus PB following the fourth pulse, the relay OP is energized and relay 2DG is restored; and the fifth and sixth pulses act to advance the accumulator unit 3AC and its control unit 3C synchronously, whereupon the correspondence relay 3SCR is energized to stop further operation of this accumulator unit 3AC.

In this connection, it can be seen that the relay 3SCR is not energized until after the sixth pulse, although the energization of the control buses 10M only calls for 5 minutes, because one of these pulses was diverted to the accumulator unit 3AC by the deenergization of relay 2DG for digit carrying purposes, and did not act upon the operating magnet 3C—OM to move the impulse counting unit 3C.

Thus, after the sixth pulse, the accumulator units are set for the correct time of 02:51. The control unit 2C continues its movement until it assumes the initial 0 position and its contacts 28 open to break the circuit through its operating magnet 2C—OM. The control unit 3C is similarly restored to its initial position.

From this explanation it can be seen how the digit carrying relays 1DG, 2DG, etc., and their associated controlling contacts and circuits, cooperate to provide for carrying digits for any one or more of the denominations of time (except of course the highest denomination of tens or hours) either one at a time, or in succession, as may be required for the proper addition of various time intervals to any one of the various times that may then be standing in the accumulator.

*Digit carrying for different days.*—In the type of system contemplated, the advance scheduling of a proposed flight during the closing hours of a day may well give one or more arrival times belonging to the next succeeding day; and consequently, the accumulator may be called upon to store times relating to different days. Since a day includes only 24 hours, however, rather than 30 hours or some other even multiple of 10, special provision is required to advance the unit hours accumulator unit artificially in changing from one day to another.

Generally speaking, this digit carrying for different days is accomplished by a special 24-hour change relay 24CH, which is controlled by the accumulator units 4AC and 5AC for the unit hours and tens of hours denominations, so as to artificially add six hours to the unit hours accumulator unit. For example, as the time in the accumulator reaches 23:59, and another minute is added, the digit carrying relays 2DG and 3DG will function in the regular way to change the 59 minutes to 00 minutes, and the unit hours from 3 to 4; but the special control exercised by the relay 24CH is required to artificially add six hours to change the 24 hours to 00 hours.

Considering this operation more in detail, and referring to Fig. 8, assume that the time of 23:59 stands in the accumulator and one additional minute is added. The digit carrying relay 2DG is deenergized in the manner previously explained to add one unit to the tens of minute accumulator 3AC, and the relay 3DG in turn is operated to advance the unit hours accumulator wheel 4AC from position 3 to position 4. During this movement of the unit hours wheel 4AC its extra contact 100 is opened; and the tens of hour accumulator arm being in the 2 position, the extra contact 99 associated therewith is also open. Under these conditions, the stick circuit for the relay 24CH is broken. This circuit may be traced from (+), through front contact 345 of relay 24CH, wires 346 and 347 to (—) over either of two multiple paths, one of these paths including wire 348 and contacts 100 of the accumulator unit 4AC, and the other circuit path including wire 349 and contacts 99 of accumulator unit 5AC. Under the circumstances being considered, i. e. with this accumulator unit 5AC set for 20 hours, and accumulator unit 4AC moved from position 3 to position 4, both of the contacts 99 and 100 are open.

In addition to the deenergization of the relay 24CH in this way, the correspondence relay 4SCR for the unit hours impulse counting or control unit 4C is also released if it should be energized at the time, as in the particular example assumed, or is prevented from picking up in other cases where one hour or more is to be added into the accumulator. This is because the winding of this relay 4SCR, instead of being connected directly to (—) as in the case of the other correspondence relays, is connected to (—) over wire 350 to wire 347 and the multiple circuit paths above mentioned, both of which are now broken by the contacts 99 and 100.

Generally speaking, the deenergization of the relay 24CH under these conditions acts in effect to shift the connections between the group of unit hour buses UH and the contact points on the impulse counting unit 4C, so as to add artificially six hours to the time in hours represented by the existing energization of one of the buses UH. In this connection, such bus shifting has been shown applied to only a bus 5 in addition to the few of the buses of group UH shown in Fig. 4, on account of the limitation on the maximum number of hours usually involved in the calculated flying time for any fix interval of the ordinary length, as previously explained.

More specifically, it has been considered sufficient to provide for a maximum flying time of four hours (and any added minutes), so that only the buses numbered 0 to 4 have been completely shown for the unit hours group UH. But, it should be understood that more unit hour buses might be provided for added capacity if desired; and these added buses, if provided, would be controlled as shown for the bus designated 5. Since this extra bus 5 has not been shown as connected to the multiplier unit 4CY, it thus may be considered as a spare to be used if increased capacity is desired. It is convenient, however, in the description to consider this bus 5 as belonging to the unit hours buses UH so as to describe the conditions relating to such added buses.

To provide the desired bus shifting, the relay 24CH has six contact fingers 353 to 358 to which are connected the buses of group UH identified for convenience by the figures 0 to 5 associated therewith. The front contacts of these contact fingers 353 to 358 are directly connected to the contacts for positions 0 to 5, inclusive, of the impulse counting or control unit 4C, these connections being also identified for convenient reference by figures 0 to 5. The back contact of the contact finger 353, relating to the 0 control bus of group UH, is connected to a position contact for a time six hours later, i. e. to position contact 6. Similarly, the back contacts of fingers 354, 355 and 356 are connected to contacts for positions 7, 8 and 9 respectively.

However, the connections from the back contacts of the other contact fingers 357 and 358 of the relay 24CH, which belong to buses 4 and 5 of group UH and which relate to position contacts 0 and 1 for a time six hours later, are connected to these position contacts 0 and 1 through back contacts 360 and 361 of the digit carrying relay 4DG, for reasons presently explained.

As a typical example of the operation of this organization for governing the accumulator in conformity with the times relating to the different days, assume that a base departure time, or a scheduled arrival time, relating to a fix should be in the closing hours of a day, say at 23:10, and that an additional flying time, such as 55 minutes, is to be added into the accumulator. In such a case, the arrival time for the next fix will relate to the next day, i. e. 00:05; and in addition to regular digit carrying, it is necessary to provide a special control for the unit hours accumulator for AC to change to times for the next day. The sequences of the operations involved in the addition of 55 minutes to the existing accumulator setting of 23:10 have been indicated in the sequence chart of Fig. 18 to which reference should be made as the description progresses. Since this operation is typical and could occur during the addition of any partial product to the accumulator setting, it should be understood that Fig. 18 merely represents the typical operations which might occur for any one of the calculation steps a, b, c, d or e previously described and also illustrated in the typical chart of Fig. 16. In this example assumed, the accumulator unit 2AC for unit minutes is operated in the regular way to add the 5 minutes of the flying time of 55 minutes assumed. The other accumulator unit 3AC for tens of minutes, when operated 5 spaces from position 1, is moved to the 0 position and operates the contacts 97 to release the digit carrying relay 3DG. This causes the accumulator unit 4AC to be moved by a digit carrying operation from its position 3 to position 4, during which movement contacts 100 are opened to deenergize the relays 24CH and 4SCR.

After such digit carrying operation and restoration of the relay 3DG, the accumulator unit 4AC and its associated impulse counting unit 4C are operated synchronously by the energization of their operating magnets 4A—OM and 4C—OM in series from the pulses on the operating bus 276 in the regular way. In the case assumed, the 0 bus of the group UH is energized, since the time to be added is less than an hour; but upon deenergization of the relay 24CH, this 0 bus is connected through back contact 353 of this relay to the position contact 6 of the impulse counting unit 4AC. Consequently, pulses are delivered to the accumulator unit 4AC until that unit and its impulse counting unit 4C have been moved 6 spaces, whereupon the relay 4SCR may be energized, the contacts 100 of the accumulator 4AC having been closed in the meantime. In other words, due to the bus shifting action of the relay 24CH, six hours are artificially added to the unit hours accumulator 4AC, in addition to the hour added by reason of digit carrying.

As the unit hours accumulator unit 4AC is thus actuated to the 0 position to conform with the time for the next day in the example assumed, the contacts 98 of this accumulator unit are mechanically opened, and the digit carrying relay 4DG is released to cause the tens of hour accumulator 5AC to be advanced one space from its existing position 2 to the position 0 for the next day.

The 24-hour change relay 24CH is restored to its normal energized condition when correspondence relay 4SCR is energized to close its front contact 363, which in effect provides a shunt for the stick contact 345 of this relay 24CH, and thus permits its energization by a pick-up circuit similar to the stick circuit previously pointed out.

If the time to be added should happen to be more than an hour, such as 01:55, instead of only 55 minutes, the operation will be substantially the same as described, except that the bus 1 of group UH would be energized under these conditions, and the release of the relay 24CH would activate the contact for position 7 of the impulse counting unit 4C, so that this unit would have to be advanced 7 spaces before the correspondence relay 4SCR is energized to stop operation of the accumulator unit 4AC Consequently, this accumulator unit 4AC would be operated 7 spaces to position 1. The same plan of operation would apply to various other time intervals.

If the sum of this artificial six hours and the time represented by the energization of the buses UH should exceed 9, as for example, if the bus 5 of group UH should be energized and such sum is 11, the proper position for the unit hours accumulator 4AC would be position 1; but the connection through back contact 358 of relay 24CH cannot be made directly to position 1 of the impulse counting unit 4C, otherwise the correspondence relay 4SCR is energized as soon as this unit 4C has moved one space, and before a sufficient number of impulses have been transmitted to the accumulator unit 4AC to operate it to the proper position. Consequently, as previously noted, the connection from back contact 358 of relay 24CH to position 1 of the impulse counting unit 4C includes a back contact 361 of the digit carrying relay 4DG; and hence the correspondence relay 4SCR cannot be energized until the accumulator unit 4AC has moved at least six spaces from its position 4 and far enough to operate the contacts 98 and release the relay 4DG. In this connection, the contacts are arranged to open and deenergize the relay 4DG as previously explained, after the cessation of the pulse advancing the accumulator unit 5AC from its position 9, so that the accumulator unit 4AC is moved from the zero to the one position desired during the next succeeding pulse advancing the accumulator unit 5AC for the tens of hours denomination. Also, as previously noted, the accumulator unit 5AC for the tens of hours denomination is preferably arranged for operation in six or more steps, so that two or more operating impulses are required to advance this accumulator unit from one active position to the next and cause restoration of the digit carrying relay 4DG. Similarly, if bus 4 of group UH is energized, the connection from the corresponding back contact 357 of relay 24CH includes a back contact 360 of relay 4DG.

In other words, the back contacts 360 and 361 of the relay 4DG prevent a premature and improper energization of the correspondence relay 4SCR for those cases where the time to be added to an artificial six hours is 4 or more hours, and assure that the accumulator unit 4AC for unit hours will be advanced at least six hours, and the contacts 98 operated for digit carrying purposes.

*Special digit carrying.*—Since the type of calculator for the particular purpose disclosed deals with the denominations of time, in which 60 minutes constitutes an hour, special provision is made for what may be termed double digit carrying, where the product of certain numbers relating to the unit minutes place exceeds the 60 minutes in an hour. These critical numbers are 7×9, 8×8, 8×9, 9×7, 9×8 and 9×9, since the product of these numbers exceeds 60.

When these particular numbers are involved in multiplication operation, a special digit carrying relay 1HC, 2HC or 3HC is controlled by the carrier contactor 3CY in Fig. 4 to control the operation of an extra digit carrying relay XDG for the unit hours buses UH, as well as the energization of the buses 10M.

As a typical example illustrating this double digit carrying operation, assume the distance of 90 miles is to be multiplied by a time quantity of .75. Referring to Figs. 14 and 15, it can be seen that during the step d of the multiplying operation, digit carrying for the product of 7×9 for the tens of minutes place is involved; and since this product of 63 represents 1 hour and 3 minutes, the number to be carried is in effect a 10. Similarly, the number to be carried for 8×8 is 10; but for 8×9 is 11 for 1 hour and 10 minutes, and for 9×9 is 12.

Considering how 10 is carried for the example of 7×9 during step c, arm 3M⁷ of the multiplying contactor 3M in the position 9 acts, when time relay T7 closes its front contact and the bus +3M is energized, to energize bus 3 of the group UM in the regular way. During the next step d, the arm 3CY⁷ of the carrier contactor 3CY in position 9 acts to establish an energizing circuit for the relay 1HC which may be traced from bus (+) 3CY now energized by closure of front contact 319 of relay Rd, through contact 365 of time relay T7, contact arm 3CY⁷ in position 9, wires 366 and 367 and winding of relay 1HC to (—). This energization of relay 1HC and closure of its front contact 368 supplies (+) over wire 369 to the 0 bus of the group 10M; and the closure of front contact 370 of relay 1HC energizes the pick-up bus 371 for the special digit carrying relay XDG.

This relay XDG operates contacts 374 to 377 to shift the connections between the set of buses 380 conveniently marked 0 to 3, which are connected with the position contacts of the carrier contactor 4CY, to the group of buses UH, in such a way as to energize a bus of the group UH for the next higher number when relay XDG is energized.

In other words, with the relay XDG in the normally deenergized condition shown, the 0 bus of the group 380 having its energization governed by the carrier contactor 4CY is connected through back contact 374 of relay XDG to the 0 bus of group UH; and similarly bus 1 of group 380 is connected to bus 1 of group UH, and so on, for as many buses as the range of calculation requires. When the relay XDG is energized, however, the 0 bus of group 380 is connected through the front contact 374 of relay XDG to a different bus 1 of group UH; and similarly, bus 1 of group 380 is connected to bus 2 group UH, and so on. Consequently, when the accumulator unit 4AC is positioned in accordance with the energization of a bus in group UH, and the relay XDG is then energized, said accumulator unit will be operated one more space than otherwise called for by the control of the buses by the carrier contactor 4CY, thereby in effect adding or carrying 1 into the unit hours denomination.

In this way, when the time and distance digits 7 and 9 are involved for a product of 63 exceeding 60, the higher carrying digit relay 1HC and the extra digit carrying relay XDG are energized and co-operate to carry 1 two places, so to speak, into the unit hours denomination, while providing for the energization of the 0 bus for the tens of minutes denomination. The same operation occurs when the relay 1HC is energized by similar circuits for the product of 8×8 or 9×7.

A product of 8×9 or 9×8, corresponding with 72 minutes, represents 1 hour and 10 minutes; and a different relay 2HC is employed for the double digit carrying functions. When arm 3CY⁸ is in position 9 and time relay T8 is energized the relay 2HC is energized by a circuit from bus (+) 3CY, front contact 382 of relay T8, arm 3CY⁸ in position 9, wires 383 and 384 and relay 2HC to (—). The energization of this relay 2HC and closure of its front contact 285 energizes bus 377 to pick up the relay XDG to carry 1 hour in the same way described; but the closure of its front contact 386 supplies (+) over the wire 387 to the bus 1 of the group 10M, corresponding to the ten minutes to be added. Relay 2HC is energized in a similar manner with the arm 3CY⁹ of the carrier contactor 3CY in position 8 and the time relay T9 energized.

In a similar manner, the relay 3HC operates to carry 1 hour and 20 minutes for the product of 9×9.

In connection with this double digit carrying operation, it will be noted that the extra digit carrying relay XDG is energized immediately following the energization of the particular high digit relay HC then being energized by its control relay Rd. This happens before the impulse control relay IPC picks up to close its front contact 283 (see Fig. 9) to provide a stick circuit for the correspondence relay 4SCR in Fig. 8, since relay SL of Fig. 7 is slow in releasing. Thus, a shifting of the bus connections by the relay XDG is effective to drop the correspondence relay 4SCR, if it should happen to be energized from the 0 bus of the carrier contactor 4CY, as would usually be the case for the time and distance quantities likely to be involved.

Such release of the relay 4SCR causes the associated impulse counting unit 4C and the accumulator unit 4AC to be operated one or more steps as required to reestablish correspondence along with the operation of the other counting and accumulator units when relay IPC is picked up.

*General characteristics of the computing organization.*—From the foregoing detailed description of the operation of the various parts and circuits for certain typical examples, it is believed that it can be understood how these parts and circuits will operate in a similar manner for other quantities representing the distance between fixes and other time quantities relating to different ground speeds. In this connection, all of the circuit connections are shown in Figs. 4 and 5 for governing the energization of the groups of buses UH, 10M, etc. in accordance with the product of any two distance and time quantities within the range assumed, i. e. three digit places of distance and two decimal places of time. Consequently, if so desired, the multiplier and carrier contactors may be assumed to be set to positions representing any distance quantity and any time relay assumed to be energized, and then the circuit connections may be traced for providing the energization of the appropriate bus in each of the groups UH, 10M, and 0.1M.

With reference to the characteristic of these circuit connections in Figs. 4 and 5 for the multiplier and carrier contactors, it will be noted that the various contact arms of each of the multiplier and carrier contactors will act, when in the 0 position shown, to energize the 0 bus of the associated group of buses, regardless of time relay T1, T2, etc. that may be energized. Similarly if a 0 time bus in Fig. 3 is energized, either for the first or second decimal place of the time quantity, the energization of the associated time relay T—0 closes front contacts 378, 379, 388 and 389 for supplying (+) to the 0 bus of the several groups of buses, regardless of the existing positions of the contact arms of the multiplier and carrier contactors. These circuit connections are provided because the product of 0 by any other number is 0.

The various circuit connections for the different positions of the multiplier and carrier contactors of Figs. 4 and 5, except perhaps those for the control of the higher digit carrying relays 1HC, 2HC and 3HC, may be considered as made in accordance with the ordinary multiplication table; and their symmetry in this regard can be readily observed, bearing in mind that there are 60 minutes in an hour, and hence the multiplier contactor 4M and carrier contactor 4CY have circuit connections for multiplying and carrying on the basis of six rather than on the basis of ten.

The steps or stages in which the multiplying process is carried out, as indicated in Figs. 14 and 15, may be modified without departing from the invention. For instance, it is obvious that the time quantity may be taken as the multiplicand, just as well as distance. However, the proposed sequence of operations illustrated serves to reduce the number of positioning operations for the multiplier and carrier contactors. Also, in the arrangement illustrated, provision is made for the simultaneous operation of accumulator units for the different denominations of time. For example, one setting of the multiplier and carrier contactors for the distance quantity serves for both steps $a$ and $b$ of the multiplying process as indicated in Figs. 14 and 15; and during each of these steps, the various accumulator units 1AC, 2AC, etc. may be simultaneously operated as required. Steps $c$ and $d$ are in effect the same as steps $a$ and $b$ but carried out for a different digit of the time quantity as a multiplier, and with the distance quantity shifted one digit place, so to speak.

The slow release relay SL in Fig. 7, which is responsive to the energization of any one of the control relays Ra, Rb etc. for the various steps $a$, $b$, etc., and the associated impulse control relay IPC, serve to provide a suitable operating time for energizing correspondence relays and performing like functions, prior to initiating stepping operation of the accumulator units, so as to avoid any improper actuation of such units when the 0 bus of the associated group is energized. Incidentally, in this connection, the relay IPC is arranged to be energized during the open period of the pulsing contacts, so that the first energization of the operating bus 274 for the accumulator units in Figs. 8 and 9 will be a stepping pulse of the full duration, regardless when the relay SL may happen to release.

The control or impulsing counting units 1C, 2C, etc. in effect serve to determine the number of operating pulses to be delivered to the associated accumulator unit 1AC, 2AC, etc. dependent upon the particular bus of the associated group then energized; and in order to perform this impulse counting function correctly, each of the impulse counting units 1C, 2C, etc. must be restored to its 0 position at the beginning of the operation. This restoration is preferably accomplished by continued motion in the same direction, in the manner disclosed, rather than by a reversal in the direction of movement, or by the use of return springs or the like, since the same means will serve continued motion in the same direction, and requires no additional reversing means or holding devices. The restoration is checked by the contacts 287, 291, 295 and 298 of these impulse counting units in the completion circuit which governs the operation of the distributor DT.

Finally, as indicated hereinbefore, the organization disclosed for digit carrying permits concurrent operation of the accumulator units, and thus affords a substantial saving in operating time.

*Registration of calculated arrival time.*—From the foregoing explanation it can be appreciated how the flying time for a particular flight is automatically calculated for the first fix interval of any desired route and direction of flight, and how this flying time, together with such additional climb time interval as desired, may be added to any selected base departure time to give the arrival time of the proposed flight at the next fix involved in the proposed route for this flight. In the example assumed, the flying time between fixes A and B for the selected cruising speed and speed correction factor is calculated at 42.5 minutes, and the addition of a climb time of 3 minutes gives an elapsed time of 45.5 minutes, which added to the base departure time of 10:00, gives an arrival time of 10:45 in the fix B, the .5 minute being disregarded with respect to posted arrival times.

When this calculating and accumulating operation is completed at the end of step $e$, and the distributor DT in Fig. 7 is advanced to the last half-step position, the contacts 207 associated with this distributor, and indicated diagrammatically in Fig. 7, are opened to deenergize the stick bus 206 supplying current to the stick circuit of the fix interval A—B relay in Fig. 11. The pick-up circuit for this relay AB over wire 203 from Fig. 10 is open at this time, because the relay ARG was deenergized when the base departure time standing in the accumulator was registered in the check display unit for fix panel A. Consequently, when the distributor DT assumes its last half-step position and opens contacts 207, the fix interval relay A—B is released, and opens its front contact 198 to deenergize the starting bus 200 extending to the relay STC in Fig. 7. The deenergization of relay STC and closing of its back contact 390 supplies (+) over wire 391 to the last half-step position contact to advance the distributor DT from this last half-step position to the initial position, where it remains until the relay STC is again energized to close its front contact 212. The contacts 207 opened with the distributor DT in its last half-step position are closed when the distributor assumes its normal initial condition, and energizes the stick bus 206 ready to hold up any fix interval relay that may be subsequently energized.

The deenergization of the fix interval relay A—B also closes its back contact 198 to extend the chain-stitch or hunting circuit (see Fig. 11) through the front contact 393 of the fix repeater relay BSP, through the winding of the register relay BRG to (—). The resultant energization of the register relay BRG causes the time indicators for the check display unit for fix panel B to assume positions in accordance with the existing positions of the movable contact elements of the accumulator units, due to selective energization of the check display control buses, in the same way described for fix A. In the example assumed, the time indicators in the check display unit for fix panel B are operated to display the arrival time of 10:45.

The energization of the register relay BRG opens at its back contact 394 the stick circuit for the lower winding of the fix repeater relay BSP through its own front contact 395, but at the same time the relay BRG closes a front contact 163 to maintain a connection to (—) from the bus 152 included in the stick circuit for the calculating relay CLR in Fig. 10. When the operation of registering the arrival time in the check display unit of fix panel B is completed, and the register relay BRG is released for reasons previously explained in connection with the operation of the relay ARG the opening of the front contact 163 of relay BRG breaks the connection from (—) to the bus 152 in the stick circuit for the calculating relay CLR; and since the fix B is the last fix in the designated route assumed in the typical example under consideration, the calculating relay CLR is thus deenergized, and all parts are restored to the normal condition ready for the next calculating operation.

*Calculation and registration of arrival times for various routes.*—In accordance with the same principles and mode of operation, which have hereinbefore been explained in detail for one typical example of a proposed flight from fix A to fix B, the arrival times at any number of fixes in any desired route, and for either desired direction of flight over the airways of a control area under the jurisdiction of the operator, may be automatically calculated and registered in turn in the check display units for such fixes.

In this connection, the fix repeater relays, such as ASP, BSP and their associated register relays ARG, BRG, together with the fix interval relays for opposite directions of movement, such as relays A—B and B—A, are included in the sequence circuit organization of Figs. 10 and 11 to conform with the sequence or order in which the corresponding fixes and fix intervals are included in the various routes afforded by the layout of the airways, so that the chain-stitch or hunting circuits for opposite directions of movement are effective to control the energization of these relays in the proper order. In other words, the arrangement on the register relays ARG, BRG, etc. and the fix interval relays A—B, B—A, etc. in the sequence relay group, on the basis of the order in which the fixes will be encountered by flights travelling the available routes, determines the order in which the flying times for the fix intervals shall be calculated and added into the master accumulator.

The chain-stitch or hunting circuit functions to pick up the register relay, such as relay ARG, for the first fix in the designated route, so as to register the base departure time in the check display unit for this fix panel. For example, referring to Figs. 10 and 11, if the fix B should happen to be the first fix in a designated route for movement from left to right, the relay ASP is deenergized, and current applied to the left-to-right hunting circuit from contact 181 of direction key DRK, flows through back contact 182 of this relay ASP, back contact 196 of relay ARG, wire 197, back contact 198 of relay A—B, through front contact 393 of relay BSP to pick up the register relay BRG. In short, if the fix B should happen to be the first fix in the designated route, its register relay BRG would be the one energized to register the base departure time in its corresponding check display unit.

As soon as relay BRG is energized, current is supplied through its front contact 398 to a wire 399 extending to a fix repeater relay (not shown but similar to relay BS) for the next fix C, and through a front contact of such relay to a fix interval relay (not shown but which would be relay B—C) for the fix interval between fixes B and C and movement from left to right. Thus, a relay for the fix interval from B to C is energized to condition the calculator to make a calculation on the basis of the correct ground speed and distance belonging to such fix interval.

There is in effect a chain-stitch or hunting circuit for each direction of movement in the sequence relay group of Figs. 10 and 11. The hunting circuit for movement left to right from fix A to fix B has been pointed out in detail. Assuming the direction key DRK to be positioned for the opposite direction of movement and its contact 181 is in the left-hand or dotted line position, *current* is supplied from (+), through back contact 153 of relay BTS, front contact 180 of relay CLR, contact 181 of direction key DRK to the left, wire 400 to Fig. 11, through the various back contacts of relays belonging to fixes not shown but located to the right of fix B, such back contacts being represented diagrammatically by the crosses 401, to the contact 402 of the fix repeater relay BSP. Assuming the relay BSP to be energized, this circuit provides for the energization of the register relay BRG through front contact 402 of relay BSP; and the current is also conducted through front contact 403 of relay BRG, wire 404 (Fig. 10), front contact 405 of relay AS, and wire 406 to the fix interval relay B—A. The energization of this fix interval relay B—A selects the proper speed correction factor dial AB—SCL for the direction of flight and fix interval in question so as to control the apparatus illustrated in Fig. 3 in the manner previously explained and position the contact speed shift GS and energize the time buses TB in conformity with the proper ground speed for the direction in question. Although the direction of flight is different, the distance is the same; and the fix interval relay B—A causes energization of the relay ABP (see Fig. 6) to cause the energization of the groups of distance buses the same as when relay A—B is energized.

When the registration of arrival time is completed and relay BRG drops, current over the hunting circuit above traced is supplied through back contact 402 of relay BSP, back contact 407 of relay BRG, through front contact 408 of relay B—A to the bus 200 energizing the relay STC in Fig. 7 for starting calculating operation. When the calculating operation is completed, and relay B—A is released, current is conducted from this hunting circuit through back contact 408 of this relay B—A, wire 409, through front contact 410 of relay ASP (Fig. 10) to relay ARG, so as to register the calculated arrival time in the check display unit for the fix panel A.

The apparatus is automatically restored to the normal condition after completion of the calculating and accumulating operation, irrespective of the number of fixes involved. At the time the calculating operation starts, the bus 152 in the stick circuit for relay CLR is connected to (—) through a front contact of each of the fix relays of the route, such as contact 150 of the relay ASP; and as each register relay is energized to release its fix repeated relay, it closes a front contact, such as the front contact 162 of relay ARG, to connect (—) to this bus 152. When the time indicators have been properly positioned, each regtister relay is released. This same sequential operation continues until the last fix of the designated route is reached; and when the register relay for this fix drops at the completion of the registration operation, the bus 152 is wholly disconnected from the (—), and relay CLR is released to mark the determination of the calculating operation.

From the foregoing it can be understood that the system of this invention enables one master computing unit and accumulator unit to be used successively for any desired number of fixes in either direction. Such selective control to incorporate the proper base departure time, speed correction factors, climb time, and distance quantities into the automatic control of the master calculator and accumulator, is accomplished by the sequence relay group of Figs. 10 and 11, together with associated parts. It is evident that such repeated operation of a master calculator in conjunction with a master accumulating device greatly simplifies and reduces the equipment that would be otherwise required for computing arrival times for both directions over all of the various possible routes afforded by the airways of a control area.

*Posting a flight schedule.*—When the proposed flight schedule, as set up in the check display units, has been checked against prior uncompleted flight schedules posted in the fix panels, either visually, or by the operation of an automatic detecting means, as disclosed in our prior application, Ser. No. 528,926, filed March 31, 1944, this approved flight schedule is automatically posted from each check display unit into an appropriate vacant space in the posting portion of the fix panel below this check display unit. In the system disclosed in our prior application above mentioned, this posting of flight data in the fix panels is carried out one panel at a time; and certain indicators relating to scheduled time and assigned altitude for each check display unit are restored to the blank position when such posting operation is completed for the associated fix panel, while the flight number and direction indicators controlled by master setting devices are not restored to the blank position until after the entire posting operation is completed.

All of this features are fully explained in our prior application above mentioned; but it may be expedient to explain here how the indicators in the check display units are restored to the normal blank position after such posting operation, more particularly with regard to the time indicators which are controlled somewhat differently in accordance with this invention than in the system of our prior application above mentioned.

Referring to the indicators for the check display unit for fix panel A in Fig. 10, and assuming these indicators to be positioned to display the flight number, direction, assigned altitude, and scheduled time for an approved flight, the automatic posting operation, which may be initiated by manual actuation of the button PST on the control panel Fig. 2 involves the energization of a relay AP in Fig. 10 by a circuit not shown, but disclosed in our prior application. The energization of the relay AP breaks at its back contact 109 the stick circuit for the fix relay AS, but the relay AP at the same time closes a front contact 412 to keep the wire 125, contact arm 124 and altitude control buses energized.

At the end of the posting operation for fix panel A, relay AP drops, and with the relay AS in the normal deenergized position, the front contact 126 of relay AS and front contact 412 of relay AP are both open, thereby deenergizing the control buses for the altitude indicator. This releases the correspondence relay ALCR and connects the operating magnet for the altitude indicator to the pulsed operating bus 114 through the front contact 113 of the relay A—DOP maintained energized by its stick circuit. When the altitude indicator is stepped around to the initial blank position, the correspondence relay ALCR is energized to stop further movement by a circuit including blanking bus 134 connected to (—) through a front contact 133 of the relay A—DOP and a back contact 132 of relay AS.

Considering now the restoration of the time indicators, when the relay AP drops at the end of the posting operation, a restoring relay ARS is energized by a circuit which may be traced from (+), through an empty-full contact 414 for each of the indicators connected in multiple to a bus 415, winding of relay ARS, back contact 416 of relay AP and back contact 417 of relay AS to (—). The energization of the restoring relay ARS and closure of its front contact 418 connects the operating bus 191 for the time indicators to the pulsing bus PB through the operating bus 114 and front contact 113 of the relay A—DOP.

The operating magnets for all the time indicators are thus intermittently energized, and as each indicator assumes its normal blank position, its associated correspondence relay is energized by a connection to the blanking bus 134. After all of the indicators have assumed the blank position, and their empty-full contacts 414 have assumed the normal open position, the relay ARS is deenergized.

The flight number and direction indicators, which are preferably controlled by master buses, are not restored to the blank position until after the posting operation is completed, whereupon deenergization of the master buses causes these indicators to be operated to the blank position in a manner similar to that already explained; and when these various indicators have assumed the blank position and their empty-full contacts 130, 131 are all open, the stick circuit for the relay A—DOP is broken, and this relay assumes its normal deenergized position.

*Cancellation.*—A similar restoring operation of the various indicators in the check display units occurs if the operator for some reason should actuate the cancel button CNB after calculation and registration of arrival times in the time indicators for one or more check display units. In this case, the actuation of the button CNB deenergizes the stick bus 198 and releases the fix relays AS, etc. to cause the same blanking operation above described. In this case, however, a front contact 419 of the restoring relay ARS maintains energized the stick circuit for relay A—DOP until all of the time indicators, as well as flight number, altitude and direction indicators have been restored to the blank position.

In this connection, if the cancel button CNB should be operated for some reason while the distributor DT in Fig. 7 is in an intermediate position, the release of the calculating relay CLR connects the stepping magnet STM through a back contact 215 of this relay CLR to contacts 422 opened only when the distributor DT is in the initial or zero position. Consequently, the distributor is quickly stepped around by a self-propelling circuit to the initial position.

*General operating characteristics.*—From the foregoing it can be appreciated that the method of computation in accordance with this invention is performed by the positive electrical actuation of contactors of a conventional type to a few distinctive and definite positions, i. e. 0 to 9 in most cases, as distinctive from mechanically operated computing devices involving the relative displacement of parts to varying degrees by cams, gearing and the like. The electrically operated contactors relating to the digits having different place values are constructed and controlled in the same manner, so that the position of these contactors in response to the energization of control buses and the selective closure of circuits by such contactors is just as definite and accurate for a digit having the lowest place value as for one having the highest place value. For example, the setting of the carrier contactor ICY and positioning of the accumulator unit IAC for tenths of minutes is just as precise as the setting of the carrier contactor 4CY and the position of the accumulator unit 4AC for unit hours. Further, each of these different digits for the various denominations of time is represented by a definite contact position of a movable contact element, which is separated by substantial distances from adjacent contact positions sufficiently to distinguish positively between such different digits.

Accordingly, this type of calculating and accumulating means affords a high degree of accuracy, because its operating elements are actuated positively to a limited number of prescribed positions in the same manner for the digits of different place value. In this connection, although the organization has been disclosed for calculating flying times to one decimal place for a limited range of speeds and distances, it is obvious that similar structural organizations involving the same principles and mode of operation may be utilized for the multiplication and accumulation of quantities or numbers of any form, and to any desired number of significant figures and decimal places.

Another important characteristic of the automatic computing means of this invention is that the parts and circuits for carrying out the operations are organized so as to check the proper performance and automatically betray any apparatus or circuit failure that would otherwise produce an erroneous computation. The foregoing explanation of the operation shows how the complete calculating and accumulating operation with respect to a given fix interval, including the setting of multiplier and carrier contactors and the positioning of accumulator units, is carried out in a series of successive stages or steps, and how the changeable circuit controlling devices, control relays and circuits involved in each of the steps of the series must function properly and become stabilized before the next step can occur. Consequently, bad contacts, broken wires and other operating failures are at once manifested by the stalling of the system, and its failure to complete the prescribed operating cycle.

Considering more in detail this feature of automatic detection of failures, and starting with the operation of positioning the accumulator units IAC, 2AC, etc. of Figs. 8 and 9 to conform with the position of the base time setting dials IBTD, 2BTD, etc. in Fig. 7, it can be readily seen in view of the foregoing explanation, that each of these accumulator units must assume the position called for by the energization of the associated group of base time setting buses 10HB, UHB, etc., in order to energize the associated correspondence relay IBCR, 2BCR, etc. All of these correspondence relays IBCR, 2BCR, etc. must be energized to close their front contacts 138, 139, etc. to energize the completion relay CM, release the base time relay BTS in Fig. 10, and thereby supply current through its back contact 153 to the chain-stitch or hunting circuit for initiating the next step in the operation.

In a similar way, when the distributor DT in Fig. 7 is moved to the first half-step position to energize the distance setting relay ISD and activate the distance buses IDB, 2DB, etc. in Fig. 6, in accordance with the distance fix interval in question, all of the multiplier and carrier contactors of Figs. 4 and 5 must assume the positions called for by the energization of these distance buses, in order to energize the correspondence relays 4DCR, 3DCR, etc. and complete the circuit shown in Fig. 7 for energizing the stepping magnet STM thereby advancing this distributor from its first half-step position for the next phase of the operating cycle.

After the setting of the multiplier and carrier contactors, the control relay Ra must pick up and close its contacts 251, 254, 256 and 258 to energize the buses +3M, +2M, etc. in order that the groups of control buses UH, UM, etc. may be energized. Also, the appropriate time relay, such as T4, must be energized and close its front contacts, such as 307, in order that such energizatiton of the buses of groups UH, UM, etc. may occur. Assuming such energization of a bus of each group UH, 10M, etc., and also energization of the relay IPC to start stepping operation of the accumulator and impulse counting units has occurred, each of these impulse counting units IC, 2C, etc. must be advanced to the position called for by the energization of the bus in its associated group, and further the circuit connections and contacts must be intact, in order to energize the associated correspondence relays ISCR, 2SCR, etc. All of these correspondence relays must be energized and also the digit carrying operation completed and all impulse counting units restored to normal, before the completion circuit is established to advance the distributor DT. During the operation of the impulse counting units IC, 2C, etc., the operating magnets 1A—OM, 2A—OM, etc. for the associated accumulator units IAC, 2AC, etc., which are in series with the operating magnets of said impulse counting units, are likewise energized to advance the accumulator units a like number of spaces.

The same plan of operation is true for the other steps in the calculating and accumulating process; and it is not until the devices and circuits for each one of the various steps have functioned properly that the distributor DT can complete its operating movement and open its contact 207 to release the fix interval relay, such as A—B, then energized for the calculating operation in progress, so as to pass on the hunting circuit to the registration relay, such as BRG to register the calculated time.

In this way, apparatus and circuit failures cause the system to stall and at once indicate a failure condition. Also, the step or stage in the operation at which the stalling occurs is very helpful in locating the trouble.

This feature of automatically detecting failures and improper operation avoids the need for any repeated computation or other check for accuracy as is required for other types of computing devices. Further, the self-betraying feature of this invention facilitates locating and remedying the cause of failures; whereas the repeat computation commonly used for check purposes merely indicates some error without giving any clue as to the cause of the mistake.

A further important characteristic of this invention is the facility with which the arrival times for any proposed route may be determined and registered by merely identifying the fixes to be involved in the route, direction of flight, the normal cruising speed, and proposed base departure time. The equipment automatically selects the speed correction factor to be applied for each of the fix intervals involved for the direction designated. These various correction factors are manually adjusted from time to time as flying conditions change; and being an operation separate from identifying the route, cruising speed and departure time for a proposed flight, such manual adjustment can be handled by a separate operator.

The same master calculator and accumulator may be used for as many different fix intervals as desired; and an installation once made may be readily adapted to changes in the number of fixes or distances between fixes by relatively simple changes in the circuit connections.

The sequential operation of devices and circuits characterizing the invention may occur as quickly as the circuit controlling devices, relays and other parts can respond, and independently of variations in temperature and battery voltage, because each phase or stage of such sequential operation must be completed before the next can start, as above explained.

Moreover, all of the functions of the system are performed by relatively simple changeable indicators and circuit controlling devices of conventional design, together with the appropriate circuit connections; and the system does not employ complicated devices of an unusual character, or require special design of cams, gearing or the like for different installations.

The specific organization and arrangement of parts and circuits shown and described merely represents one typical embodiment of the invention; and it should be understood that various additions, adaptations, and modifications may be made in the system as disclosed without departing from the invention.

What we claim is:

1. In an airway traffic controlling system for scheduling flights over the fix interval between a pair of fixes of a control area, speed setting means operable to represent the selected speed of a proposed flight in units of distance per unit of time, changeable time elements conditioned in accordance with the reciprocal relationship with respect to said speed setting means to indicate the time quantity required for a proposed flight to fly a unit of distance at the speed represented by said speed setting means, distance elements conditioned to indicate the distance quantity of the fix interval, sets of time buses for the different denominations of time, and calculator means governed by said time and distance elements for multiplying the indicated time quantity by the indicated distance quantity to give the flying time of the proposed flight between said pair of fixes at the selected speed, said calculator means acting to selectively energize said sets of time buses in accordance with the flying time for the proposed flight.

2. In an airway traffic controlling system for scheduling flights over the airways of a control area having a plurality of spaced fixes, speed setting means, a master base departure time setting means operable to indicate the proposed departure time of a proposed flight from any given fix of the control area, changeable time indicators for each of said fixes, means for defining any desired route by identifying the fixes included in that route, said means also acting to designate the distance between each pair of fixes in the defined route, calculator means controlled by said speed setting means and by said base departure time setting means and acting in accordance with the designated distance between the pairs of fixes of a defined route for actuating said time indicators for the fixes involved in that route in accordance with the calculated arrival times of the proposed flight at the respective fixes, and manually controlled means for causing said changeable time indicators to be restored to normal blank indicating positions when desired.

3. In a system for automatically calculating and posting the arrival times for a proposed flight at a plurality of fixes of an airway, time setting means for designating the desired base departure time for the proposed flight from a given fix, speed setting means for defining the speed of such flight, fix identifying means for designating the fixes involved in a given route originating at said given fix, a distance element for each fix interval representing the distance between the corresponding fixes, a master electrically operable calculating means having its computing operation dependent upon the existing condition of said speed setting means and the particular distance element then effective, said calculating means determining the flying times for the fix intervals between successive pairs of fixes of said airway in turn in accordance with the speed defined by said speed setting means and the length of such fix intervals, a time accumulator having a movable circuit controlling element for each of the denominations of time, sequencing means for automatically positioning the elements of said accumulator to conform with the base departure time established by said time setting means, said sequencing means initiating successive operations of said calculating means and rendering effective during each successive operation the distance element for the respective fix intervals in turn in the route designated by said fix identifying means, said sequencing means including apparatus for operating said elements of said accumulator to add in succession to said base departure the flying times for said fix intervals as successively determined by said calculating means to give the arrival times for the several fixes, a time indicator for each of said fixes and including a movable indicating element for each of the denominations of time, and circuit means controlled by said sequencing means and governed by the circuit controlling elements of said time accumulator following each of their successive operations to cause the indicating elements of the time indicator of the appropriate fix to be correspondingly positioned, whereby said time indicators for the several fixes display the time schedule of the proposed flight in actual clock time.

4. In an airway traffic controlling system for scheduling flights over the selected fix intervals between the spaced fixes of a control area, time setting means operable to any desired starting time for a proposed flight, means operable to designate the fixes included in any desired route, speed setting means operable to represent the speed of a proposed flight, changeable time elements conditioned by said speed setting means in accordance with the time required for a proposed flight to fly a unit of distance at the speed represented by said speed setting means, distance elements for each fix interval for represening the distance between the associated pair of fixes, sets of time buses for the different denominations of time, calculator means governed by said time elements and those distance elements for the fix intervals of a designated route for selectively energizing said sets of time buses in succession in accordance with the flying times of a proposed flight over said fix intervals, and a time accumulator having registering means for each denomination of time for twenty-four hours and governed by said sets of time buses after having been initially set to the desired starting time in accordance with the condition of said time setting means.

5. In a system for scheduling flights at the various fixes of the airways in a control area, a flight progress board including changeable time indicators associated with each fix and operable to show the calculated arrival time at that fix, setting means for designating the base departure time and the fixes involved in a route for a propose flight and the flying speed of such flight, a master accumulator having a set of movable circuit controlling elements for the different denominations of time, calculating means for determining the flying times for the proposed flight between the fixes involved in the designated route, means governed by said setting means for operating said movable elements of said accumulator initially in accordance with said base departure time and for subsequently operating said movable elements to add into said accumulator in succession the flying times for the fix intervals in the designated route, and electric control circuits for positioning the time indicators for said designated fixes in turn in accordance with the positions of said movable elements of said accumulator after each of said operations.

6. In a traffic controlling system for airways, a flight progress board comprising a check display unit for each of the various fixes of a control area, each of said check display units including a changeable time indicator for each denomination of time, means including sets of control buses for operating the changeable time indicators for designated check display units one at a time to positions dependent upon the particular control bus of the associated set then energized, an accumulator having movable contact elements for the different denominations of time for selectively governing the energization of said control buses, setting means including circuit controlling elements for designating the base departure time and the fixes involved in the route for a proposed flight, a calculator governed in accordance with the speed of a proposed flight and the distances between said fixes for giving the flying times between the fixes, and means for automatically positioning said contact elements of said accumulator first in accordance with the designated base departure time and then successively in accordance with the calculated flying times to give the arrival times at said designated fixes, whereby the time schedule for a proposed flight is displayed by the time indicators of the check display units for the designated fixes.

7. In a system for scheduling flights over a control area having a number of routes including fixes, a flight progress board including a plurality of changeable time indicators for each fix operable to display the different denominations of a scheduled time for a proposed flight at that fix, a set of control buses associated with the various indicators belonging to each of the different denominations of time, setting means including selectable circuit elements for designating a base departure time and the fixes involved in a route for a proposed flight, means including an automatic master calculator governed by the selected circuit elements of said setting means for selectively energizing one bus out of each of said sets of control buses at successive time intervals in accordance with said base departure time and the calculated arrival time of said proposed flight at the designated fixes, and control circuit means effective after each of said time intervals for automatically positioning the time indicators for the corresponding fix in accordance with the energization of the associated sets of buses.

8. In a system for scheduling flights over the airways of a control area having a plurality of spaced fixes, a speed dial manually operable to different positions representative of various cruising speeds, base departure time dials manually operable to different positions to represent the different times of a twenty-four hour day, fix identifying buttons on a diagram of the control area one button for each fix and each button being operable to designate that fix as included in the route for a proposed flight, a group of time indicators for each of said fixes in the control area, means controlled by the setting of said speed dial and the actuation of said buttons for two or more fixes involved in a route for a proposed flight for automatically calculating the time required for a plane to fly between each pair of the designated fixes at the speed indicated by said speed dial, automatic means including a plurality of circuit controlling devices for adding each of said flying times in successive accumulation to a base departure time for such plane as set up on said base departure time dials to give the calculated arrival times for the successive fixes of the defined route, and circuit means including a set of time buses for each denomination of time and each set extending to the corresponding time indicators of said groups for posting said base departure time and the successively calculated arrival times in the respective groups of time indicators for the designated fixes for the proposed flight.

9. In a system for scheduling flights over the airways of a control area having a number of spaced fixes, a flight progress board including changeable time indicators for each fix for showing the calculated arrival time of a proposed flight at that fix, setting means for designating the base departure time and the fixes involved in the route for a proposed flight and the flying speed for such flight, a master electrically operable calculating means for calculating the flying time of the proposed flight for the fix intervals between the fixes designated by said setting means, said calculating means including apparatus for representing the flying speed as set up by said setting means in terms of distance for a unit of time, said calculating means including electrical circuits controlled by said apparatus and also in accordance with the distance for a given fix interval designated by said setting means to selectively energize terminal means for different denominations of time in accordance with the flying time for such fix interval, a time accumulator having movable elements for the different denominations of time, and sequence means for initially operating the movable elements of said accumulator in accordance with the base departure time designated by said setting means and for subsequently rendering said calculating means effective to operate said movable elements to add into said accumulator in succession the flying times for the fix intervals in the designated route, said sequence means also automatically positioning said time indicators for the designated fixes in accordance with the existing position of said movable elements of said accumulator after each of said operations.

10. In a system for scheduling flights over the airways of a control area having a plurality of spaced fixes, means for defining any desired route by identifying the fixes included in that route, speed setting means operable to indicate the effective speed of a proposed flight, electro-responsive time means energizable to indicate the different denominations of a range of times, circuit means controlled by said speed setting means for energizing said electro-responsive means in accordance with the time required for a plane to travel a unit of distance at the speed indicated by said speed setting means, distance setting means operable to indicate the distance between any selected pair of fixes of the control area, means for causing the successive pairs of fixes of a defined route to be selected one pair at a time, a group of time buses for each denomination of a range of times, there being one bus in each group for each digit of the corresponding denomination, circuit means controlled by said electro-responsive time means and said distance setting means for each selected pair of fixes to energize a selected bus of each group of said time buses to give the different denominations of a traveling time for a proposed flight to travel between that pair of fixes at the indicated speed, a group of changeable indicators for each fix, and means including a time accumulator for effecting the control of the changeable indicators for each fix of a defined route to conform with the arrival time of a plane at that fix by adding together the successive traveling times given by the selective energization of said groups of time buses.

11. In a system for scheduling flights over airways having spaced fixes, speed setting means operable to a distinctive condition to represent the speed for a proposed flight, distance representing buses selectively energizable to represent a desired distance, master calculating means including circuit controlling devices governed by said distance buses and said speed setting means for determining the flying time at the speed defined by said speed setting means for a distance represented by the selective energization of said distance buses, means for designating the fixes involved in the route for a proposed flight and a relative direction of movement over such route, and sequence means for governing the selective energization of said distance buses at successive time intervals to conform with the distances of successive fix intervals and their order designated for the route and direction of the proposed flight.

12. In a system for automatically calculating flying times for flights between the spaced fixes of airways, a time accumulator having a movable circuit controlling element for each denomination of time, sets of control buses for certain of said elements including a bus for each digit of the corresponding denomination, setting means for designating the ground speed and distance quantities for each of the intervals between the fixes in the route of any given proposed flight, electrical calculating means governed by said setting means and acting when rendered effective to selectively energize a bus of each of said sets to conform with a flying time to be added into said accumulator, operating means governed by the selective energization of said buses for advancing said movable elements of said accumulator a number of digit spaces corresponding with the respective buses then energized, and automatic sequencing means for rendering said calculating means responsive in succession to the speed and distance quantities associated with each fix interval of the route for the proposed flight and at the same time rendering said calculating means effective to selectively energize said buses in accordance with the flying time for that fix interval, said sequencing means also rendering said operating means for said accumulator effective after such successive operation of said calculating means to add the calculated flying time for that fix interval into said accumulator.

13. In a system for scheduling flights over the airways of a control area for a plurality of spaced fixes, a speed setting means operable to different positions for designating the various cruising speeds of airplanes, a master base departure time setting means operable to different positions to represent the different times a proposed flight may leave any given fix of the control area, a group of changeable time indicators for each of said fixes, fix designating means for identifying the different fixes included in any desired route in the control area, distance elements governed by said fix designating means for representing the distances between any pair of identified fixes, a master calculator means controlled by said speed setting means and said distance elements representing the distances between the fixes of the designated route in turn as operatively connected to said calculator for successively calculating the flying times between such designated fixes of the desired route of the control area, an accumulator means initially governed by said base departure time setting means and subsequently governed after each successive operation of said calculator for adding the calculated flying times in turn to the said base departure time to give in succession calculated arrival times for the respective fixes of the identified route, sequencing means operated after said speed setting means, base departure time setting means and said fix identifying means have been set for governing the sequential operation of said accumulator and calculator with respect to the fix intervals involved, said sequencing means acting to operatively connect said distance elements of the respective fix intervals in turn to said calculator and initiate an operation of said calculator for each fix interval, said sequencing means initiating an operation of said accumulator prior to any operation of said calculator to set up in the accumulator the base departure time and a further operation of said accumulator after each operation of the calculator for the respective fix intervals, and circuit means governed by said accumulator means and rendered effective by said sequencing means after each operation of the accumulator for actuating the time indicator for each of the identified fixes in turn in accordance with the respective calculated arrival times for such fixes as manifested by said accumulator.

14. In a system for scheduling flights at spaced fixes of an airway, time indicating means for each of said fixes for displaying the arrival time of a proposed flight at that fix, speed setting means operable through uniform increments of calibration to select the different speeds of a range of speeds used by planes, a number of time buses, each representing a different unit of time, circuit means associated with each calibrated position of said speed setting means and acting when said speed setting means is in that position to energize that one of said time buses representing the unit of time required for a plane to fly a unit of distance at the speed represented by the position of said speed setting means, distance elements including circuit connections characteristically associated with the different pairs of successive fixes for defining the distance between the spaced fixes of said airway, a calculator governed by the energization of said time buses and by said distance elements for automatically and successively calculating the arrival times of a proposed flight at said fixes, and posting apparatus controlled by the successive operations of said calculator for operating said time indicating means for the several fixes to display their respective arrival times.

15. In a system for scheduling flights at the spaced fixes of an airway, a group of time indicators having one indicator for each denomination of time and associated with each of said fixes, master control buses for governing the operation of said groups of time indicators, a time accumulator having a movable circuit controlling element for each denomination of time for selectively energizing said control buses, positioning buses associated with said accumulator, calculating means for selectively energizing said positioning buses successively in accordance with the time intervals to be added in succession into said accumulator, operating means responsive to the selective energization of said positioning buses for advancing each of said movable elements of said accumulator a number of digit spaces conforming with the digit for the corresponding denomination of the time interval to be added into said accumulator, and automatic sequencing means acting with respect to each fix interval in succession for rendering effective in turn the operation of said calculating means, said operating means for the accumulator, and the operation of the group of time indicators for the leaving fix of such fix interval.

16. In a system for scheduling flights over the airways of a control area having a plurality of spaced fixes, means for designating any desired airway of the control area for use by a proposed flight by identifying the fixes of such airway, time indicators for each of said fixes for displaying the arrival time of a proposed flight at that fix, cruising speed setting means operable to designate any one of the various rated speeds of planes using the airways of the control area, speed correction factor setting means operable to designate with respect to each fix interval the speed correction to cruising speeds which may be required due to variable flying conditions, a set of time buses, circuit means governed jointly by said cruising speed setting means and a particular selected speed correction factor setting means for selectively energizing said time buses in accordance with the time required for a plane to fly a unit of distance at the speed resulting from the application of the designated speed correction factor to the designated rated speed, means for designating a base departure time for a proposed flight, an automatic calculator operable in response to a time quantity represented by the energization of said time buses and a selected distance quantity for determining the flying time of a proposed flight over a corresponding fix interval, a time accumulator governing the energization of circuits controlling the operation of the time indicators, and automatic sequencing means for setting said time accumulator in accordance with the base departure time and then causing successive operations of said calculator and said accumulator with respect to speed and distance quantities relating to the respective fix intervals between the identified fixes for a given proposed flight, said sequencing means also acting after each operation of the accumulator to select for operation the time indicators for such fixes in turn to conform with the time then registered in said accumulator.

17. In an airway traffic controlling system for scheduling flights over the airways of a control area comprising fix intervals between a plurality of fixes, a group of time indicators for each fix of the control area, means for designating the fix intervals included in a desired route by identifying the fixes of such rote, speed setting means operable to select any one of the different speeds of a range used by planes over the airways of the control area, a number of time buses, circuit means governed by said speed setting means for selectively energizing said time buses in accordance with the time required for a plane to fly a unit of distance at the speed selected by said speed setting means, a number of distance buses, circuit means governed by said fix interval designating means for selectively energizing said distance buses in accordance with the distance of each designated fix interval in turn for the desired route, calculator means governed jointly by the selective energization of said time and distance buses for multiplying the quantities represented thereby to give the flying time of a proposed flight over each fix interval of the desired route in turn, base time setting means for designating any desired base departure time for a proposed flight, an accumulator acted upon by said base time setting means and said calculator means for adding together said base departure time and the flying times as successively determined by said calculating means to give the successive arrival times, circuit means for transferring the successively accumulated arrival times to the groups of time indicators for the respective fixes in turn, and means for governing the sequence of operation of said calculating means, said accumulator and the groups of time indicators in turn so as to govern the time indicators for the first fix of the designated route in accordance with the base time and the time indicators for the successive fixes of such route in accordance with their calculated arrival times for a proposed flight travelling over such route.

18. In a system for automatically calculating the time schedules for flights over airways having a number of spaced fixes, speed setting means for identifying the rated cruising speed for a proposed flight, speed correction means for each fix interval for defining the correction to cruising speeds required to give the ground speed for that fix interval under the existing flying conditions, time buses, means governed by said speed setting means and a given speed correction means for selectively energizing said time buses in accordance with the time required for a flight to travel a unit of distance at the ground speed defined by the speed correction means then acting, distance buses, means for designating the fixes involved in the route for a proposed flight and its flying direction, sequence means for controlling the selective energization of said time buses and said distance buses in accordance with the ground speed and the distance for the particular fix intervals involved in the designated route in succession and in the order conforming with the designated direction for said flight, master calculating means responsive to the selective energization of said time buses and said distance buses for determining the flying time for the ground speed and distance represented by the existing energization of said buses, means for identifying the base departure time for the proposed flight, and means for determining the arrival times of said proposed flight at the successive fixes in the designated route by adding to said base departure time in succession the flying times for the fix intervals determined by said calculating means.

19. In a system for scheduling proposed flights at a plurality of spaced fixes of an airway, time indicators for each of said fixes operable to display a calculated arrival time, base departure time setting means, cruising speed setting means for designating the rated cruising speed for a proposed flight, a ground speed indicator, speed correction factor means for each fix interval for cooperating with said cruising speed setting means in succession to actuate said ground speed indicator and thereby determine the corrected ground speed to be indicated by said ground speed indicator for that fix interval under the existing flying conditions, a calculator governed by said ground speed indicator for automatically calculating the flying times for said fix intervals in succession on the basis of the respective corrected ground speeds and the respective lengths of said fix intervals, an accumulator for accumulating these flying times in succession with the base departure time to give the calculated arrival time at said fixes for the proposed flight, said calculator and said accumulator comprising electrically operable multi-position contacts and control circuits for providing energization of terminals for different digits of each denomination of time to represent time intervals, sequencing means for governing the sequential operation of said calculator and said accumulator for the respective fix intervals, said sequencing means acting to apply for each fix interval in turn the speed correction factor means to said ground speed indicator, and posting means controlled by said accumulator and said sequencing means for operating said time indicators for said fixes in the same succession in accordance with said calculated arrival times.

20. In an airway traffic controlling system for scheduling flights over the airways of a control area including a plurality of spaced fixes, base time setting means operable to manifest the starting time of a proposed flight from a first fix, cruising speed setting means operable through equal increments of speed to manifest the normal air speed of a proposed flight, speed correcting means operable through corresponding equal increments of speed to modify the speed represented by said cruising speed setting means so as to automatically indicate the resultant ground speed of a proposed flight, calculating means controlled by said speed setting and speed correcting means in accordance with the indicated resultant ground speed and the distance between a first and second fix as determined by circuit connections for automatically calculating the traveling time of the proposed flight between such fixes, and means controlled by said base time setting means and said calculating means for automatically adding said calculated traveling time to the starting time of the proposed flight to give the arrival time of such proposed flight at said second fix.

21. In a system for scheduling flights over the airways of a control area having a number of spaced fixes, time indicators for each fix operable to display a calculated arrival time at that fix for a proposed flight, speed setting means operable to identify the rated cruising speed for a proposed flight, a speed correcting means for each fix interval cooperating with said cruising speed setting means to render active a circuit element representing the corrected ground speed quantity for existing flying conditions over that fix interval, distance means for each fix interval representing its distance quantity, calculating means responsive to both said active circuit elements and said distance elements representing respectively the ground speed and distance quantities for fix intervals as successively applied thereto for automatically calculating and accumulating the flying times for such fix intervals to determine the arrival times at the associated fixes, control means for successively applying to said calculating means the ground speed and distance quantities as represented by the active circuit elements and distance means for the respective fix intervals in the particular route designated for the proposed flight, and means governed by said control means for posting the arrival times determined by said calculating means in the time indicators for the corresponding fixes in succession as such arrival times are calculated and accumulated.

22. In a system for scheduling flights over the airways of a control area having a plurality of fixes each pair of which is separated by a fix interval, a cruising speed setting means operable to designate the normal air speed of a proposed flight, a master base departure time setting means operable to indicate the proposed departure time of a proposed flight from any given fix of the control area, changeable time indicators for each of the fixes, means for designating the fix intervals comprising any desired route by identifying the fixes included in that route, direction selecting means operable to indicate the direction of flight over the desired route, speed correction means for each fix interval operable to define the speed correction factor to be made to the cruising speed for that fix interval for each direction of flight in accordance with the existing flying conditions, ground speed means controlled by said direction selecting means in accordance with the selected direction of the flight over the desired route to cause the correction factor for each fix interval for the corresponding direction to be applied to said cruising speed for each fix interval in turn to successively cause said ground speed means to give the resultant ground speeds for the fix intervals of that route, and calculator means controlled by said ground speed means and by said base departure time setting means and acting in accordance with the distances of the fix intervals of a desired route for actuating said time indicators for the fixes involved in that route in accordance with the calculated arrival times of the proposed flight at the respective fixes.

23. In an airway traffic controlling system for scheduling flights over the intervals between the spaced fixes of a control area, base departure time setting means, time indicators for each of the fixes of the control area, means for defining the fix intervals included in any desired route by identifying the fixes included in that route, speed setting means operable to represent the speed of a proposed flight, climb time setting means for each fix interval operable to represent the additional time required for a proposed flight to make a designated ascent while passing through the corresponding fix interval, a master electrically operable calculating means controlled by said speed setting means for automatically calculating successively the flying times required for a plane to travel over the fix intervals of a defined route, said calculating means energizing selectively buses for the different denominations of time to represent such flying times, a master accumulator having a set of circuit controlling elements for each denomination of time and automatically positioned dependent upon the existing bus energization established by said calculating means, said climb time means acting to control the energization of the buses governing the positioning of said accumulator elements and thereby cause said accumulator to include the climb time if any to the flying time calculated by said calculating means, sequencing means for controlling said calculating means and said accumulator to add the travelling time and the climb time if any for each fix interval of a defined route in turn to said departure time in successive accumulation to give the calculated arrival times of proposed flight at the several fixes in such route, and posting means controlled by said circuit controlling elements of said accumulator for successively setting the time indicators of the fixes of the defined route in accordance with the base departure time and the arrival times for the successive fixes.

24. In a system for automatically calculating and posting the arrival times for a proposed flight at certain fixes of an airway, a plurality of changeable time indicators for the different denominations of time associated with each of said fixes, setting means for establishing a base departure time and the flying speed for a proposed flight, calculating means controlled in accordance with the speed of the proposed flight and the distances between the fixes for giving the flying times between the fixes, a time accummulator governed by said calculating means for acting automatically during a series of successive operations for adding said flying times to said base departure time and determine the arrival times for a proposed flight at said fixes, said accumulator having a multiple-position electrically operable contactor for each denomination of time, means for positioning said contactor of said accumulator prior to the adding operation in accordance with a base departure time for the proposed flight, a checking circuit closed only if the contactor of said accumulator assumes the position required for said base departure time, and means requiring closure of said checking circuit for initiating operation of said calculating means, and sequencing means for governing the sequential operations of said calculating means and said accumulator and also controlling operation of said time indicators of said fixes in accordance with the arrival times determined by said calculating means, whereby faulty operation of said accumulator to register the base departure time is detected by failure of the system to complete its series of operations and post the calculated arrival times in said time indicators.

25. In an airway traffic controlling system for scheduling flights over the airways of a control area including a plurality of spaced fixes, means for defining any desired route by identifying the fixes included in that route, a changeable time indicator for each denomination of time associated with each fix of the control area, a set of time buses for each denomination of time associated with the corresponding indicators of each fix, means including circuit controlling devices for calculating successively the arrival time of a proposed flight at each designated fix of a defined route by a series of sequential operations each requiring the energization of a circuit before the next operation can be performed, said circuit controlling devices acting to selectively energize one bus of each set of time buses for a fix in accordance with the arrival time for that fix when it is calculated, means including said time buses for each fix and acting after the calculation of an arrival time for that fix to post such calculated arrival time in the changeable time indicators for that fix dependent upon the energization of a particular bus for each denomination of time, and means requiring the time indicators for all denominations of time for each of the fixes during a posting operation to assume positions corresponding with the respective buses then energized before said calculating means can operate to calculate the arrival time of the proposed flight at the next fix of the defined route, whereby the failure of an indicator is readily made apparent by reason of incomplete calculating and posting operations.

26. In a system for automatically calculating and posting the arrival times for a proposed flight at certain fixes of an airway, a group of changeable indicators associated with each of said fixes, calculating means acting automatically during a series of successive operations involving the selective energization of different sets of control buses to determine the arrival times for a proposed flight at said fixes, said calculating means including a plurality of multi-position devices operable to different positions and each having an associated set of control buses, checking means acting during each operation of the series to detect if the multi-position devices have assumed positions during such operation corresponding with the energized bus of the associated set of control buses for initiating the next successive operation of the series, and electrical circuit means for governing the time indicators of said fixes in accordance with their respective arrival times by the selective energization of their sets of control buses as determined by said calculating means, whereby the failure of a multi-position device to assume the required position results in the failure to post the calculated arrival times in said time indicators.

27. In an airway traffic controlling system for scheduling flights over the airways of a control area having a plurality of fixes, a flight progress board having a group of time indicators for each of the fixes of the control area, fix identifying means for designating the fixes involved in any desired route of the control area for a proposed flight and its direction of movement over the designated route, sequence means governed by the fix designating means for successively selecting the fix intervals involved in a designated route and acting to select such fix intervals in an order dependent upon the designated direction, a calculating organization controlled by said sequence means for calculating and accumulating the flying times in succession for the fix intervals of a proposed route as they are successively selected by said sequence means to give the arrival times at the successive fixes of that route for the designated direction of movement, said calculating organization including a master accumulator having electrically operable elements relating to the different denominations of time, said calculating organization also including an electrically operable computer of time for a designated flying speed and the distance of a selected fix interval, said sequence means controlling the operation of said computer and accumulator for the respective fix intervals designated by said fix identifying means to determine the calculated arrival times at the respective fixes for the direction of movement designated, and circuit means governed by said calculating organization for governing the operation of the time indicators for the designated fixes of such route to display their respective calculated arrival times.

28. In an airway traffic controlling system for scheduling flights over the airways of a control area comprising a fix interval between each pair of a plurality of fixes, a group of time indicators for each fix of the control area, means for designating the fix intervals comprising a desired route for a proposed flight by identifying the fixes in such route and the relative direction of the proposed flight, a time correction factor setting device for each fix interval of the control area operable to represent an additional time required for a flight to change its altitude in passing over that fix interval, sequence means governed by the fix identifying means for successively selecting the fix intervals involved in a designated route in an order determined by the designated direction of flight, an electrically operable calculator for determining the flying time in minutes for a given cruising speed of a designated fix interval, an electrically operable accumulator including elements relating to the different denominations of time for accumulating times from said calculator, said calculator and computer having their successive operation for the different fix intervals controlled by said sequence means, said calculator and accumulator acting to accumulate the flying time and the additional correction factor time if any for each fix interval in succession for that route as the fix intervals are successively selected by said sequence means to give the arrival times for the identified fixes, and means governed by said calculator means and said sequence means for governing the time indicators of the identified fixes to display their respective calculated arrival times.

29. In a system for calculating and posting the arrival times of proposed flights at spaced fixes of an airway, time indicators for each of said fixes operable to display a scheduled time for that fix, speed setting means operable to define a rated cruising speed for a proposed flight, speed correcting means for each fix interval governed by said speed setting means for determining the corrected ground speed quantity for that fix interval under the existing flying conditions, distance means associated with each fix interval and representing the distance quantity for that fix interval, calculating means responsive to the ground speed and distance quantities for the fix intervals applied thereto for calculating and accumulating the flying times for such fix intervals, a relay for each fix interval acting when energized to apply the ground speed and the distance quantities for that fix interval to said calculating means, sequence means including electrical circuit elements for sequentially energizing said relays for the fix intervals involved in the route designated for a proposed flight and in the order corresponding with the flying direction of such flight, and means including time buses for operating the time indicators for the fixes in the designated route in accordance with the accumulation of flying times up to that fix.

30. In a system for scheduling flights and spaced fixes of airways, time indicators for each fix operable to display a calculated arrival time at that fix for a proposed flight, speed setting means for identifying the rated cruising speed for the proposed flight, time setting means for designating the base departure time for such proposed flight, speed correction means for each fix interval adapted to be positioned manually and acting to determine in accordance with said rated cruising speed the corrected ground speed for the corresponding fix interval under the existing flying conditions, distance means for each fix interval representing a distance quantity for that fix interval, automatic calculating means responsive to the corrected ground speed and distance quantities for fix intervals applied thereto for calculating the flying times for these fix intervals and accumulating said flying times in succession with said base departure time to give the estimated arrival times at the associated fixes, a relay for each fix interval acting when energized to apply to said calculating means the ground speed and distance quantities for that fix interval, sequence means including circuit controlling devices for sequentially energizing said relays for the intervals between the fixes in the route designated for a proposed flight and the direction of flying for that flight, and posting means governed by said calculating means and said sequence means for operating the time indicators for the fixes involved in the proposed route in accordance with the arrival times determined by said calculating and accumulating means.

31. In an airway traffic controlling system for scheduling flights over the airways of a control area for a plurality of spaced fixes, a flight progress board having a group of time indicators for each of the fixes of a control area, fix identifying means for each of the fixes in the control area operable to define any desired route, base departure time setting means operable to indicate the starting time of a proposed flight from the first fix of any defined route, direction setting means operable to indicate the direction of the proposed flight over the defined route, speed setting means operable to indicate the speed of a proposed flight, calculator means including multiple position circuit controlling devices and acting with respect to each pair of fixes of a defined route to calculate the traveling time between that pair of fixes in accordance with the speed indicated by said speed setting means and the distance between such pair of fixes, sequence control means governed by said direction setting means for determining that said calculator means will act to calculate the traveling times for the pairs of fixes of a defined route in succession beginning at the first fix of the route for the selected direction, accumulator means governed by said calculator means and said sequence control means for automatically adding said traveling times in successive accumulation as they are calculated to the proposed starting time to give the arrival times for the proposed flight at each of the fixes of the defined route beyond the first, and means governed by said base departure time setting means and said accumulator means for posting said proposed starting time and the arrival times in the respective groups of time indicators for the fixes of the defined route, one fix at a time and in turn as selected by said sequence control means.

32. In an airway traffic controlling system for scheduling flights over the airways of a control area having a plurality of spaced fixes, a flight progress board having a group of time indicators for each of the fixes of the control area, speed setting means, base time setting means, fix identifying means for each of the fixes in the control area, a master calculator operating when rendered effective to automatically calculate the travelling time between any selected pair of fixes in accordance with the distance between those fixes and the speed manifested by said speed setting means, master accumulator means governed by said master calculator for successively adding to the base starting time manifested by said base time setting means the calculated traveling times for those pairs of fixes designated by said fix identifying means, thereby determining the estimated arrival times for the selected fixes beyond the first fix of the defined route, posting means including circuit elements associated with different fixes for controlling the group of time indicators for each of the selected fixes of the proposed route in succession to correspond respectively with the starting time as manifested by said base time setting means and the arrival times at the succeeding fixes calculated by said master accumulator means, and sequence control means operating to render the master calculator and said master accumulator means effective to determine and add the calculated traveling time for the next pair of fixes following the posting operation for each fix of the defined route one at a time in turn.

33. In an airway traffic controlling system for scheduling flights over the airways of a control area having a plurality of spaced fixes, a flight progress board having a group of time indicators for each of the fixes of the control area, speed setting means, base time setting means, fix identifying means including a manually operable push button and a stick relay for each of the fixes in the control area, each of said stick relays being initially energizable by operation of its respective push button, calculating means governed by said speed setting means and said stick relays for automatically calculating the traveling time between any selected pair of fixes in accordanc with the distance between that pair of fixes and the speed manifested by said speed setting means, accumulator means governed by said calculating means for adding to the starting time manifested by said base time setting means the calculated traveling time for each selected pair of fixes, sequence control means operating to successively select those pairs of fixes comprising a route for a proposed flight as defined by the selective energization of the respective stick relays for those fixes to thereby render said calculating means and said accumulator effective for each pair of fixes in turn one pair at a time, posting means governed by said sequence means for controlling the group of time indicators for each fix of the defined route in turn, said posting means acting first to control the time indicators for the first fix of the defined route in accordance with the starting time manifested by said base time setting means and thereafter control the respective time indicators for the successive fixes of the route in accordance with their respective arrival times, and means for causing the subsequent deenergization of the energized stick relays for the fixes of a defined route.

34. An automatic electrically operated computer for time schedules comprising, a time accumulator having a movable register element for each denomination of time of a twenty-four hour day, means including a set of control buses belonging to each of said accumulator elements for causing said accumulator to accumulate time quantities represented by the particular buses of said set then energized, distance quantity representing elements, time quantity representing elements giving the time required to travel a unit of distance at a selected speed, electrical calculating means governed in accordance with the digits of the time and distance quantities to be multiplied for controlling the energization of said sets of buses, said calculating means operating to energize a selected bus of the unit minutes set to conform with the digit in the units place of the product of the two digits of said quantities relating to this denomination, said calculating means also operating to energize a selected bus of the tens of minutes set to conform with digits less than six in the tens place of said product, and converting means effective when such digit in the tens place of said product is six or more for causing energization of a bus of the tens of minutes set representing the difference between that digit and the number six, said converting means also controlling the buses for the unit hours set to cause the accumulator element for units hours to advance one more space than required by the prior existing energization of its set of buses.

35. An electrically operated calculator for time schedules comprising, a time accumulator having a changeable register element for each denomination of time, means including a set of control buses associated with each of said accumulator elements for adding into said accumulator a time quantity represented by the particular buses of said sets then energized, a multiplier contactor and a carrier contactor each having a plurality of contact arms movable together to a number of different digit contacting positions, means for positioning the arms of said contactors and for selectively energizing a particular arm of each contactor to conform with the digits of two numbers to be multiplied, said multiplier contactor having circuit connections for energizing a selected bus of the set for the unit minutes denomination in accordance with the digit in the units place of the product of the numbers represented by the existing position of the arms of this contactor and the particular contactor then energized, said carrier contactor having circuit connections for energizing a selected bus of the set for the tens of minutes denomination in accordance with digits less than six in the tens place of said product, and converting means associated with said carrier contactor and effective when the digit in the tens place of said product is six or more for causing energization of a bus of the set for the tens of minutes denomination representing the difference between that digit and the number six, said converting means also controlling the buses for the unit hours denomination to cause the accumulator element for unit hours to advance one more space than required by the existing energization of its set of buses.

36. In a combination for calculating the traveling time between selected pairs of points, speed setting means calibrated by uniform increments in miles per hour operable to different positions for the different speeds of a range, a plurality of sets of buses relating to the different digits of time, circuit controlling elements shifted by the movement of said speed setting means to its different speed positions for energizing a particular bus of each of said sets of buses to conform with the different digits of time in minutes required to travel a unit mile for the existing position of the speed setting means, distance setting means calibrated in unit miles and having circuit controlling devices operable to different conditions for the different distances between different selected pairs of points, and multiplying means controlled by said energized time buses and said circuit controlling devices of distance setting means to give the traveling time between any two points separated by the distance set up by said distance setting means if a conveyance is travelling at the speed corresponding with the position of said speed setting means.

37. An electrically operated computer for multiplying a multiple digit multiplicand by a single multiplying digit comprising, an accumulator having a plurality of changeable elements electrically operable to different number positions, a group of control buses for each of said accumulator elements, means for advancing each of said accumulator elements from its existing position the number of spaces corresponding with the associated control bus then energized, a plurality of multiple position contactors associated with the different digits of the multiplicand and operable to different positions corresponding with the values of said digits, two of said multiple position contactors being associated with each digit of the multiplicand, circuit connections associated with each pair of multiple position contactors for energizing a selected control bus of the group for one accumulator element in accordance with the digit of the lower order of the partial product at one time and in accordance with the digit of the higher order of the partial product at another time, said circuit connections being made dependent upon the position of said contactors and the particular contactor then effective, and means governed in accordance with the value of the multipling digit for rendering one particular selected contactor of each pair effective to cause selective energization of its associated control buses at one time in accordance with the units digits of the partial product of the corresponding digit of the designated multiplicand multiplied by a single multiplier digit and at another time in accordance with the tens digits of said partial product.

38. In an organization for calculating the flying time of a plane over an airway, speed setting means operable to designate any one of a range of speeds used by planes over the airway, speed conversion means including contacts governed by said speed setting means for energizing circuit elements representing time per unit of distance corresponding with the speed designated by the speed setting means, distance setting means operable to represent the particular distance a proposed flight is designated to traverse over the airway, time buses for the different denominations of time, a plurality of circuit devices governed by said circuit elements and said distance setting means in accordance with the represented time and designated distance for controlling circuit connections to said time buses for selectively energizing said buses depending upon the time required for a plane to fly over the designated distance at the represented speed, and multiple position devices one for each denomination of time positioned in accordance with the selective energization of said time buses.

39. An electrically operated computer for time schedules operating on the basis of multiplying multiple digit numbers comprising, an accumulator having a plurality of changeable elements relating respectively to the different denominations of time of a twenty-four hour day and electrically operable to different number positions, electrical digit carrying means for advancing each of said accumulator elements except the one for the highest digit place one additional position whenever the element for the next lower digit place is operated to the zero position, a set of control buses associated with each of said accumulator elements and at all times governing the accumulating operation of that element from its existing position the number of positions corresponding with the associated control bus then energized, circuit controlling means for designating the various digits of the numbers to be multiplied, and means governed by said circuit controlling means and performing a multiplying operation by the energization of electrical connections to said buses of lower denominations for selectively energizing the buses of each of said sets at different times in accordance with the different digits of the partial products belonging to that denomination and making up the resultant product of the quantities being multiplied.

40. In an accumulator organization, a movable circuit controlling element operable to any one of a number of different digit positions and remaining in an operated position until changed, a plurality of control buses, means energizing a selected one of said buses in accordance with a quantity to be added, a control device operated to a digit position corresponding to the selectively energized control bus and then automatically restored to its initial position, and means for operating the movable circuit controlling element a number of digit positions corresponding to the number of digit positions said control device is operated in attaining the digit position to conform with said selective bus energization, said control device and said operating means each having an actuating winding energized in series for effecting said operations.

41. In a system of the character described, a time accumulator for registering a plurality of times relating to the same or different days comprising, a movable circuit controlling element for each of the different denominations of time for a twenty-four hour day including unit hours and tens of hours, means for successively advancing each of said elements individually from its existing position in accordance with the time intervals to be added into said accumulator, digit carrying means responsive to the operation of the circuit controlling element for each denomination, except the highest, to its zero position for advancing the element for the next higher denomination one additional digit space, and means effective when the elements for units hours and tens of hours are both operated to positions representing twenty-four hours for automatically advancing both of said elements such additional digit spaces as would be required to put them in their zero positions without interrupting the operation of the accumulator with respect to the time interval being added.

42. An electrically operated accumulator for calculating devices comprising, a plurality of independently movable circuit controlling elements operable to different digit positions, sets of buses associated with certain of said elements including a bus for each position of that element, calculator means for selectively energizing one bus of each set to conform with the quantity to be added into the accumulator, means governed by the energization of said buses for advancing said movable elements of said accumulator from their existing positions the number of spaces represented by the associated bus then energized, a normally energized digit carrying relay associated with each of said movable elements except the one for the highest decimal place and deenergized by the movement of that said element to the zero position, circuit means governed by each digit carrying relay when it is deenergized for operating one additional digit space the movable element for the next higher decimal place without interrupting the operation of the other movable elements to the positions called for by the energization of their associated buses, means acting upon each operation of a movable element to provide for the restoration of the digit carrying relay for the next lower decimal place, and circuit means responsive only to the restoration of said digit carrying relays to their normally energized condition for rendering said calculating means effective for the next accumulating operation.

43. In an electrically operated computer for time schedules operating on the basis of multiplying a multiple digit distance quantity by a multiple digit time quantity, a set of buses for each denomination of time of a twenty-four hour day having a number of buses corresponding with the number of digits of that denomination, an accumulator having a movable register element for each denomination of time governed by the selective energization of its associated buses, electrical multiplying means including changeable circuit controlling elements for selectively energizing connections to said sets of buses to conform with the proper denomination value of the different digits of the partial products of the distance quantity and a digit of the time quantity as then applied to said multiplying means, and sequencing means for applying to said multiplying means at one time one digit of the time quantity and all digits of the distance quantity in one digital relation to said sets of buses and at another time another digit of the time quantity and all digits of the distance quantity in a different digital relation to said buses, said sequencing means during each of said times rendering said multiplying means effective to energize said sets of buses at different times in accordance with the lower and higher order digits of the partial products of the distance and time quantities then involved and causing operation of the movable register elements of said accumulator to conform with the then existing energization of said sets of buses, whereby several partial products of the different orders are added into the accumulator at their proper denominational value in conformity with the selective energization of the sets of buses governing the register elements of the accumulator for the different denominations.

44. In a system for determining the time schedule for a proposed flight at the spaced fixes of an airway and acting at times to indicate arrival times relating to different days, a plurality of changeable indicators associated with each fix and including an indicator for each denomination of time, means including time buses for governing the operation of said time indicators, electrical accumulator means having a movable circuit controlling element for each denomination of time of a twenty-four hour day for governing the energization of said time buses, means including control buses for successively advancing said circuit controlling elements from their existing positions one space at a time in accordance with the intervals of time to be added into said accumulator means, and means effective when said circuit controlling elements for the unit hours and the tens of hours denomination are both operated to positions representing twenty-four hours for automatically advancing both of these elements six and one additional spaces respectively independently of the time intervals being accumulated to give a time relating to the next day.

45. In an accumulator organization, a movable circuit controlling element operable to any one of a number of different digit positions and remaining in an operated position until changed, a plurality of control buses, means energizing a selected one of said buses in accordance with a quantity to be added, a rotary control device operable to different digit positions corresponding to the different digit positions of said movable circuit controlling element, a pulsing bus energizable with time spaced impulses, operating means for said rotary device supplied with impulses from said pulsing bus to operate said control device from its initial position to a position corresponding to the energized control bus and then continuing its operation to restore it to its initial position, a checking circuit closed only if all of said rotary control devices are restored to their initial positions, and means effective only if said checking circuit is closed and controlled by said rotary control device for supplying impulses from said pulsing bus for operating said movable circuit controlling element a number of digit positions corresponding to the number of digit positions required to move said rotary control device from its initial position to the position corresponding to the selectively energized control bus.

46. In a system for determining the arrival times for a proposed flight at the fixes of an airway during any time interval for the same or different days, a time accumulator comprising a movable circuit controlling element for each denomination of time for a twenty-four hour day, means including control buses associated with certain of said elements for advancing said elements successively a number of digit spaces in accordance with the existing energization of said buses and corresponding with the flying times to be added into said accumulator, digit carrying means responsive to the operation of the element for each of said denominations of time, except the highest, to its initial zero position for advancing the element for the next higher denomination one additional digit space, and means responsive to the operation of the elements for the unit hours and tens of hours denominations to positions corresponding with twenty-four hours for acting on said control buses to shift their connections to automatically advance the element for unit hours denomination six digit spaces in addition to what may be actually called for by the energization of the associated control buses, whereby times in excess of twenty-four hours accumulated into the accumulator are automatically converted to times relating to the next day.

47. In a time accumulator organization, a movable circuit controlling element for each denomination of time operable to any one of a plurality of digit positions and remaining in the last operated position until changed, a control device for certain of said denominations of time and operable to any one of a plurality of digit positions, a set of control buses for each of said control devices, means selectively energizing one bus of each set in accordance with the time to be added, means for operating each control device from an initial position to the digit position corresponding to the energized bus of its associated set and then automatically restoring said control device to its initial position, operating means for advancing each of said movable elements the same number of digit positions as is required to operate its corresponding control device to the digit position having the energized bus, said control devices and said operating means for all of the movable elements for the different denominations of time being normally operated concurrently, digit carrying means for each movable element except for the highest denomination acting when in approach to its zero position during its operation for temporarily discontinuing operation of the control means for the next highest denomination and also during such time automatically advancing the movable element for such higher denomination one digit space independently of said control means whereby digit carrying operations are introduced as they become necessary during the simultaneous operation of the movable accumulator elements for the various denominations.

48. In an electrically operable computer for time schedules operating on the basis of multiplying a multiple digit distance quantity by a time quantity, a set of buses for each denomination of time of a twenty-four hour day corresponding in number to the number of digits in its denomination, calculating means including movable circuit controlling elements and electrical connections to said sets of buses for selectively energizing a bus of each set at different times in accordance with the denominational values of the higher and lower digit of the partial products of time and distance quantities then governing said calculator, means for governing said calculator from time to time in accordance with the distance and time quantities to be multiplied, a time accumulator having a movable register element for each denomination of time governed by a corresponding set of said sets of buses, means responsive to the selective energization of said buses at different times by said calculator for advancing the register elements of said accumulator one at a time a number of spaces corresponding with the bus of the associated set then energized, and digit carrying means associated with each of said register elements of the accumulator except for the highest denomination for automatically advancing one space the register element for the next higher denomination whenever the operation called for by bus energization advances a register element to its zero position.

49. In an electrically operated time schedule calculator, a set of buses for each denomination of time for a twenty-four hour day, the number of buses in each set corresponding with the number of digits of the associated denomination, means for designating a multiple digit distance quantity and a time digit quantity, calculating means governed by said distance and time quantities for automatically energizing a bus of each set at one time in accordance with the denominational value of each of the lower digits of the partial product of said distance and time quantities and at another time in accordance with the denominational values of each of the higher digits of said partial product, a time accumulator having multiple register elements for each denomination of time governed by a corresponding set of said buses, and means operating in response to each selected energization of said sets of buses by said calculating means for operating the register elements of said accumulator in accordance with the particular bus of the associated set of buses then energized, whereby the selected energization of said sets of buses adds into the accumulator the various digits of the partial product at their proper denominational value.

50. In an electrically operated computer for time schedules operating on the basis of multiplying a multiple digit distance quantity by multiple digit time quantity, a set of buses for each denomination of time of a twenty-four hour day corresponding in number to the digits of that denomination, an electrical calculator including a multiplier contactor and a carrier contactor for each digit of the distance quantity, each of said contactors having a plurality of movable elements operable to different digit contacting positions to establish electrical connections to said sets of buses, the multiplier contactor for a given denomination and the carrier contactor for the next lower denomination acting to energize the same set of buses, an electrically operable time accumulator having a movable register element for each denomination of time governed by the selected energization of a corresponding set of buses, and means for positioning said multiplier and carrier contacts in accordance with the respective digits of the distance quantity and thereafter energizing certain selected movable elements of said multiplier contactors and said carrier contactors in succession in accordance with one digit of the time quantity, thereby accumulating in succession the higher and lower order digits of the partial product of said distance quantity and one digit of the time quantity, said sequence means also operating to position said multiplier and carrier contactors in accordance with the respective digits of the distance quantity at the next higher digital value and again energizing selected elements of said multiplier contactors, carrier contactors in succession in accordance with the other digit of the time quantity, thereby accumulating at the proper denominational value the partial products of the distance quantity and the other digit of the time quantity.

51. In an electrically operated calculator for determining a time schedule on the basis of multiplying a multiple digit distance number by a time quantity representing minutes per unit of distance, a set of buses for each denomination of time corresponding in number to the digits of that denomination, a multiplier contactor and a carrier contactor for each digit of the distance number and each having a plurality of movable circuit controlling elements operable to different digit contacting positions, electrical connections for said movable elements of said multiplier contactors in their different contacting positions for selectively energizing the associated set of buses in accordance with the lower digit of the partial product represented by the particular movable element and its existing contacting position, electrical connections for said movable elements of said carrier contactors for selectively energizing the set of buses associated with the next higher denomination in accordance with the higher digit of the partial product represented by the particular movable element and its existing contacting position, said electrical connections being organized to give the appropriate value to the higher digit of the partial product in conformity with the particular denomination of time involved, an electrically operable time accumulator having a plurality of register elements belonging respectively to the different denominations of time and operated in accordance with the energization of a corresponding set of buses, means for automatically positioning said multiplier contactors and said carrier contactors in accordance with the respective digits of the distance number involved, and means for energizing selected movable elements of said multiplier contactors and carrier contactors in succession in accordance with the time quantity, and thereby causing accumulation in succession of the higher and lower order digits of the respective partial products at their appropriate denominational value.

52. In a system for scheduling flights over the various fixes of the airways in a control area, a master speed setting dial having uniformly spaced speed calibrations for identifying the rated cruising speed for any proposed flight, speed correction setting means for each interval between the various pairs of fixes of the airways, each speed correction setting means being operable to its uniformly spaced calibrations to represent the speed quantity required to be applied to the selected cruising speed to give the correct ground speed under existing flying conditions for its fix interval, a ground speed indicating means, electroresponsive devices governed by said ground speed indicating means and including mathematically arranged circuit connections for indicating the times required to travel a unit of distance for each of the different speeds indicated by said ground speed indicating means, calculating means controlled by said electro-responsive devices in accordance with the times indicated and the distances between the pairs of fixes for successively calculating the flying times of a proposed flight over the various fix intervals of any selected airway, and means governed by said master speed setting dial and said speed correction setting means for shifting said ground speed indicating means in accordance with the setting of said master speed setting dial and in accordance with the setting of speed correction setting means for the particular fix interval for which said calculating means is then acting to calculate the flying time of the proposed flight.

53. In a system for scheduling flights over the various fixes of the airways in a control area, a master speed setting dial for identifying the rated cruising speed for any proposed flight, speed correction setting means for each interval between the various pairs of fixes of the airways, each speed correction setting means including contacts for its different settings and being manually operable to represent the speed quantity required to be applied to the selected cruising speed to give the correct ground speed under existing flying conditions for its fix interval, a ground speed indicating shaft, means including a gear organization for shifting said ground speed shaft in accordance with the setting of said master speed setting dial, a motor-operated speed correction gear for acting through said gear organization to move said ground speed indicating shaft in accordance with the proper speed correction setting means then effective, circuit means for rendering the contacts for the several speed correction setting means associated with the fix interval of a selected route successively effective in turn to govern said motor, and calculating means controlled by said ground speed indicating shaft and the distances of each of the fix intervals included in the selected route of the proposed flight for calculating the flying time of such flight for each fix interval in turn as the speed correction setting means for those fix intervals are respectively rendered effective to set the ground speed indicating shaft.

54. In a system for scheduling flights over the fixes of an airway, a master speed setting dial calibrated in equally spaced increments of speed and operable to its different positions for identifying the rated cruising speed for any proposed flight, speed correction setting means having equally spaced positions to which it is operable to represent the speed quantity required to be applied to the selected cruising speed to give the correct ground speed under the existing flying conditions, a ground speed indicating means, a planetary gear organization for connecting said master speed setting dial and said speed correction setting means to said ground speed indicating means to thereby cause said ground speed indicating means to give the correct ground speed for the particular speed quantities designated, a plurality of sets of time buses one set for each digit of a number expressing time, and the buses of each set relating to the different numbers for that digit, contact means controlled by said ground speed indicating means to selectively energize said sets of time buses in accordance with the time required for a plane to travel a unit of distance at the ground speed indicated, and calculating means controlled by said sets of time buses to calculate the flying time of a proposed flight over different selected distances.

NEIL D. PRESTON.
FOREST B. HITCHCOCK.

REFERENCES CITED

The following references are of record in the file of this patent:

UNITED STATES PATENTS

| Number | Name | Date |
| --- | --- | --- |
| 1,590,050 | Muller | June 22, 1926 |
| 1,876,296 | Hofgaard | Sept. 6, 1932 |
| 2,062,119 | Bryce | Nov. 24, 1936 |
| 2,120,228 | Bryce | June 14, 1938 |
| 2,131,908 | Torkelson | Oct. 4, 1938 |
| 2,172,078 | Ziguelde | Sept. 5, 1939 |
| 2,176,930 | Smith | Oct. 24, 1939 |
| 2,176,933 | Smith | Oct. 24, 1939 |
| 2,178,064 | Bryce | Oct. 31, 1939 |
| 2,224,774 | Tauschek | Dec. 10, 1940 |
| 2,239,524 | Johnstone et al. | Apr. 22, 1941 |
| 2,316,520 | Lang | Apr. 13, 1943 |
| 2,328,610 | Bryce et al. | Sept. 7, 1943 |
| 2,332,304 | Davies | Oct. 19, 1943 |
| 2,338,206 | Shafer | Jan. 4, 1944 |
| 2,343,370 | Dickinson | Mar. 7, 1944 |
| 2,344,761 | Wight et al. | Mar. 21, 1944 |

(Other references on following page)

UNITED STATES PATENTS

| Number | Name | Date |
|---|---|---|
| 2,344,885 | Kozma et al. | Mar. 21, 1944 |
| 2,346,616 | Saxby | Apr. 11, 1944 |
| 2,351,814 | Holzner | June 20, 1944 |
| 2,352,027 | Smith | June 20, 1944 |

FOREIGN PATENTS

| Number | Country | Date |
|---|---|---|
| 340,988 | Great Britain | Dec. 29, 1930 |
| 345,952 | Great Britain | Mar. 30, 1931 |
| 405,030 | Great Britain | Jan. 29, 1934 |
| 115,674 | Australia | Aug. 5, 1942 |
| 629,156 | Germany | Apr. 27, 1936 |